US010852421B1

(12) United States Patent
Chartrand et al.

(10) Patent No.: US 10,852,421 B1
(45) Date of Patent: Dec. 1, 2020

(54) SPARSE PHASE UNWRAPPING

(71) Applicant: Descartes Labs, Inc., Santa Fe, NM (US)

(72) Inventors: Rick S. Chartrand, Los Alamos, NM (US); Matthew T. Calef, Los Alamos, NM (US)

(73) Assignee: Descartes Labs, Inc., Santa Fe, NM (US)

(*) Notice: Subject to any disclaimer, the term of this patent is extended or adjusted under 35 U.S.C. 154(b) by 0 days.

(21) Appl. No.: 16/751,161

(22) Filed: Jan. 23, 2020

Related U.S. Application Data

(60) Provisional application No. 62/828,183, filed on Apr. 2, 2019, provisional application No. 62/796,489, filed on Jan. 24, 2019.

(51) Int. Cl.
*G01S 13/90* (2006.01)
*G06K 9/62* (2006.01)
*G06K 9/00* (2006.01)
*G06T 3/00* (2006.01)

(52) U.S. Cl.
CPC ........ *G01S 13/9023* (2013.01); *G06K 9/0063* (2013.01); *G06K 9/6206* (2013.01); *G06T 3/0068* (2013.01)

(58) Field of Classification Search
CPC ... G01S 13/90; G01S 13/9021; G01S 13/9023
See application file for complete search history.

(56) References Cited

U.S. PATENT DOCUMENTS

| | | | | | |
|---|---|---|---|---|---|
| 6,111,535 | A | * | 8/2000 | Smith | G01S 7/2813 342/159 |
| 6,150,973 | A | * | 11/2000 | Pritt | G01S 13/9023 342/162 |
| 6,864,828 | B1 | * | 3/2005 | Golubiewski | G01S 13/9023 342/147 |
| 9,523,768 | B1 | * | 12/2016 | Rincon | G01S 13/9023 |
| 9,875,430 | B1 | | 1/2018 | Keisler | |
| 9,928,578 | B1 | | 3/2018 | Chartrand | |
| 10,089,554 | B1 | | 10/2018 | Chartrand | |
| 10,108,885 | B1 | | 10/2018 | Keisler | |
| 10,217,192 | B1 | | 2/2019 | Chartrand | |
| 10,248,663 | B1 | | 4/2019 | Keisler | |
| 10,282,821 | B1 | | 5/2019 | Warren | |
| 10,318,847 | B1 | | 6/2019 | Keisler | |
| 10,331,980 | B1 | | 6/2019 | Chartrand | |
| 10,489,689 | B1 | | 11/2019 | Keisler | |

(Continued)

OTHER PUBLICATIONS

Candes et al., Robust Uncertainty Principles: Exact Signal Reconstruction from Highly Incomplete Frequency Information, Jun. 10, 2004, pp. 1-39.

(Continued)

*Primary Examiner* — Peter M Bythrow
(74) *Attorney, Agent, or Firm* — Van Pelt, Yi & James LLP

(57) ABSTRACT

Sparse phase unwrapping is disclosed. A first image and a second image are received. The first image and the second image are coregistered. The first image and the second image comprise respective phase data. An unwrapped interferogram is generated, including by solving an optimization problem using a nonconvex penalty function, where minimizing the penalty function produces sparse minimizers.

21 Claims, 56 Drawing Sheets

(56) References Cited

U.S. PATENT DOCUMENTS

| | | | | |
|---|---|---|---|---|
| 2008/0007450 | A1* | 1/2008 | Yedidia | G01S 13/904 342/25 F |
| 2008/0231502 | A1* | 9/2008 | Allen | G06T 5/002 342/25 F |
| 2008/0231503 | A1* | 9/2008 | Allen | G06T 5/50 342/25 F |
| 2008/0231504 | A1* | 9/2008 | Sartor | G06T 5/50 342/25 F |
| 2008/0232709 | A1* | 9/2008 | Rahmes | G06T 5/50 382/260 |
| 2008/0234981 | A1* | 9/2008 | Sartor | G06T 5/50 702/190 |
| 2013/0082870 | A1* | 4/2013 | Chambers | G01S 13/90 342/25 A |
| 2015/0279082 | A1* | 10/2015 | Anderson | G01S 7/295 345/424 |
| 2015/0348235 | A1* | 12/2015 | Boufounos | G06T 3/4092 382/103 |

OTHER PUBLICATIONS

Chartrand et al., Restricted Isometry Properties and Nonconvex Compressive Sensing, Inverse Problems, 2008, pp. 1-14, vol. 24, No. 035020.

Chen et al., Two-Dimensional Phase Unwrapping with Use of Statistical Models for Cost Functions in Nonlinear Optimization, J. Opt. Soc. Am. A, Feb. 2001, pp. 338-351, vol. 18, No. 2.

David L. Donoho, Compressed Sensing, IEEE Transactions on Information Theory, Apr. 2006, pp. 1289-1306, vol. 52, No. 4.

David Sandwell, Open Radar Interferometry Software for Mapping Surface Deformation, Eos, Jul. 12, 2011, pp. 234-235, vol. 92, No. 28.

Gabay et al., A Dual Algorithm for the Solution of Nonlinear Variational Problems Via Finite Element Approximation, Comp. Math. Appl., 1976, pp. 17-40, vol. 2, No. 1.

Ghiglia et al., Minimum Lp-Norm Two-Dimensional Phase Unwrapping, J. Opt. Soc. Am. A., Oct. 1996, pp. 1999-2013, vol. 13, No. 10.

Ghiglia et al., Robust Two-Dimensional Weighted and Unweighted Phase Unwrapping that Uses Fast Transforms Iterative Methods, J. Opt. Soc. Am. A, Jan. 1994, pp. 107-117, vol. 11, No. 1.

Glowinski et al., Sur l'approximation, par elements finis d'ordre un, et la resolution, par penalisation-dualité, d'une classe de problems de Dirichlet non lineares, Revue Française d'Automatique, Informatique, et Recherche Opérationelle, 1975, pp. 41-76, vol. 9.

Magnus R. Hestenes, Survey Paper Multiplier and Gradient Methods, Journal of Optimization Theory and Applications, 1969, pp. 303-320, vol. 4, No. 5.

Osmanoglu et al., Time Series Analysis of InSAR Data: Methods and Trends, International Society for Photogrammetry and Remote Sensing, Inc., 2015.

Rick Chartrand, Nonconvex Compressed Sensing and Error Connection, IEEE International Conference on Acoustics, Speech and Signal Processing, 2007.

Rick Chartrand, Fast Algorithms for Nonconvex Compressive Sensing: MRI Reconstruction from Very Few Data, IEEE International Symposium on Biomedical Imaging: From Nano to Macro, 2009.

Rick Chartrand, Shrinkage Mappings and Their Induced Penalty Functions, IEEE International Conference on Acoustics, Speech and Signal Processing, 2014.

Schofield et al., Fast Phase Unwrapping Algorithm for Interferometric Applications, Optics Letters, Jul. 15, 2003, pp. 1194-1196, vol. 28, No. 14.

U.S. Appl. No. 16/239,976, filed Jan. 4, 2019.
U.S. Appl. No. 16/256,848, filed Jan. 24, 2019.
U.S. Appl. No. 16/285,077, filed Feb. 25, 2019.
U.S. Appl. No. 62/796,489, filed Jan. 24, 2019.
U.S. Appl. No. 62/828,183, filed Apr. 2, 2019.
U.S. Appl. No. 62/905,288, filed Sep. 24, 2019.

* cited by examiner

|  | Beowulf (2003) | Cray XE6 | Cloud |
|---|---|---|---|
| Copy | 1203.5 | 2612.0 | 1753.9 |
| Add | 1237.2 | 2591.7 | 1731.4 |
| Scale | 1201.8 | 2820.3 | 1923.3 |
| Triad | 1238.2 | 2857.9 | 1953.2 |
| BT | 321.2 | 1445.1 | 1275.0 |
| SP | 216.5 | 706.0 | 464.1 |
| LU | 404.3 | 1599.0 | 1697.2 |
| MG | 385.1 | 1134.0 | 830.2 |
| CG | 313.1 | 380.2 | 326.6 |
| FT | 351.0 | 767.5 | 844.6 |
| Linpack | 3.30 | 14.94 | 25.46 |

FIG. 3B

| 2015 Cost ($/s) | Unit | Description |
|---|---|---|
| $1.0 \cdot 10^{-8}$ | Gigabyte | Cloud Storage |
| $1.5 \cdot 10^{-8}$ | Gigabyte | Persistent Magnetic Disk |
| $8.4 \cdot 10^{-8}$ | Gigabyte | Node Solid State Disk |
| $8.9 \cdot 10^{-7}$ | Gigaflop/s | Linpack Floating Point |
| $1.7 \cdot 10^{-6}$ | Gigabyte | Node Memory |
| $1.7 \cdot 10^{-4}$ | Gigabyte/s | Local Network |
| $1.0 \cdot 10^{-2}$ | Gigabyte/s | To Wide Area Network |
| $2.8 \cdot 10^{-2}$ |  | Skilled Human Labor |
| $1.2 \cdot 10^{-1}$ | Gigabyte/s | To Public Internet |

FIG. 3C

```
Obtain list of images to download

Optional [
    filter list of images [
        obtain metadata for images
        apply filter to select images of a given type or in a given region
            or for a given period of time
        ]
    ]

# Download data
For each image in list:
   Check if we have already retrieved image
   If not [
      Download image
      copy image to long-term cloud storage
      if download or copy fails:
         retry until success
   ]
```

FIG. 13

```
# Pre-process data
For each new image in cloud storage:
      Tile image
      Optional [ interpolate / reproject / convert to reflectance ]
      Copy processed image tiles to cloud storage
      if anything fails:
           retry until success
      Put metadata entry in key/value store for each image tile
   ]
```

FIG. 14

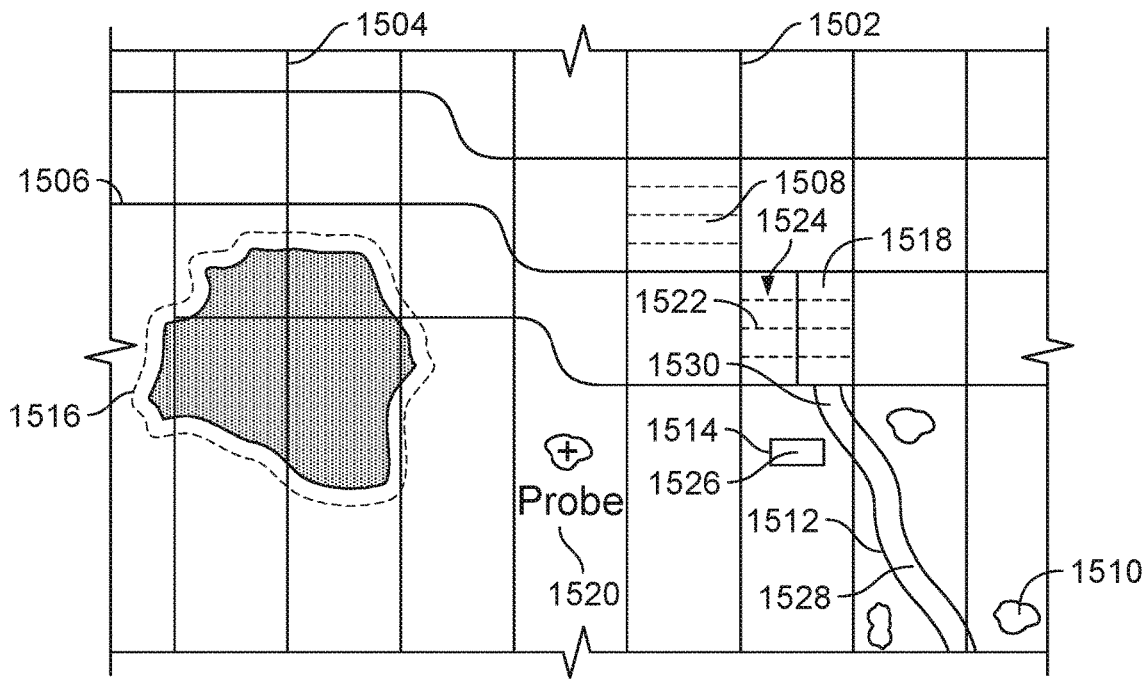
FIG. 15A
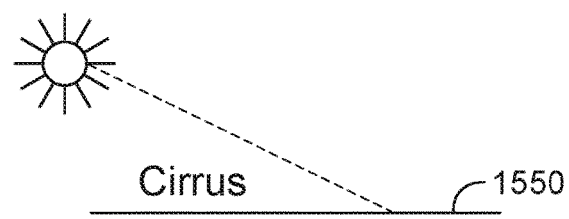
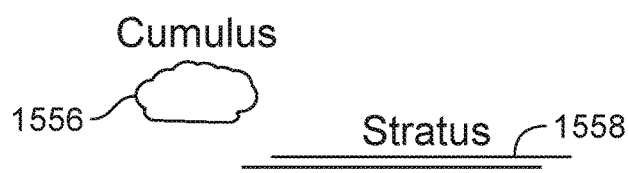
FIG. 15B
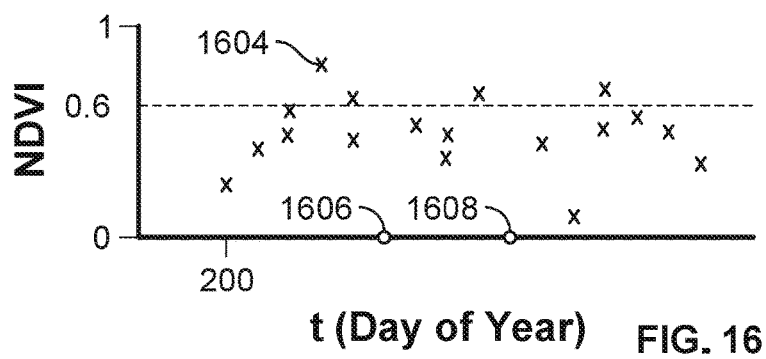
FIG. 16

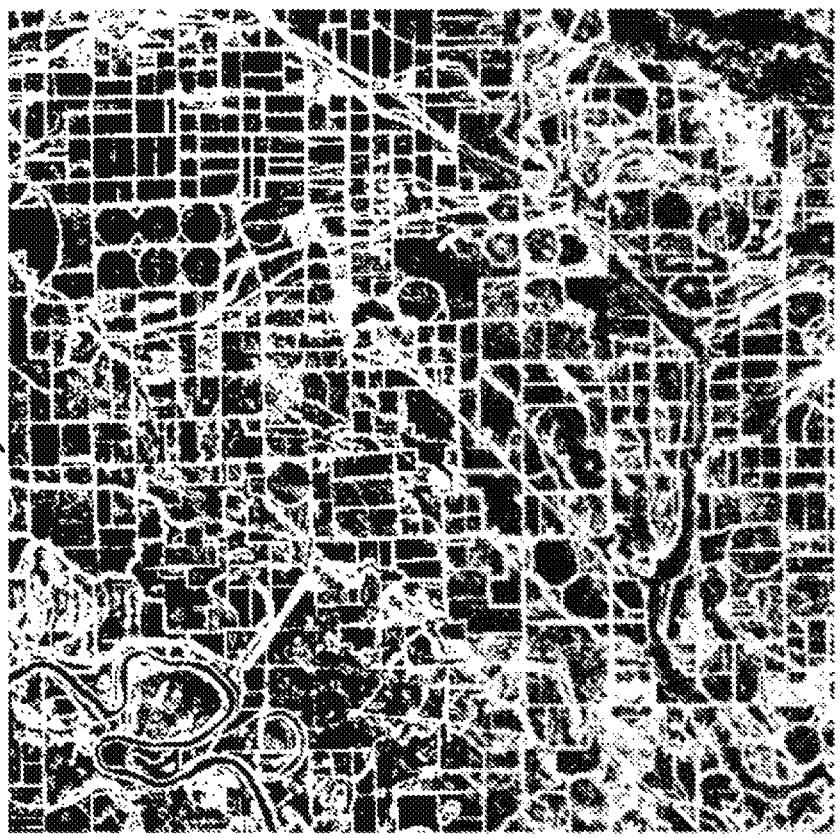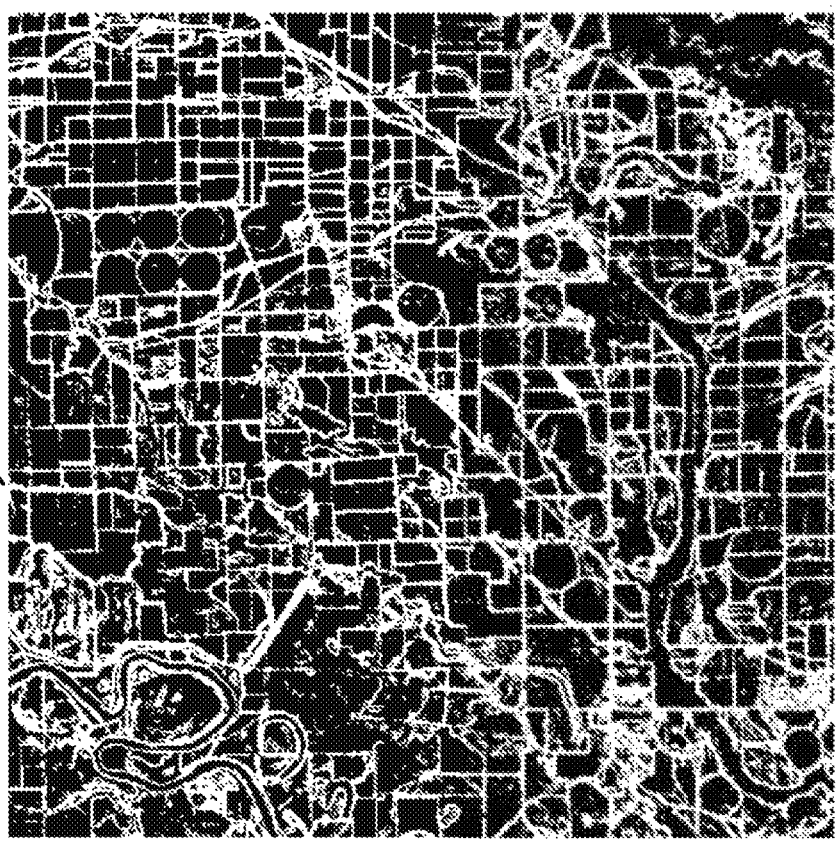
FIG. 21

3530

3500

```
initialize psi_x, psi_y to 0
initialize Lambda_x, Lambda_y to 0
initialize F_old to 0
for iteration from 1 to max_iter:
    # update unwrapped phase F, solving linear equation in Fourier domain
    RHS = Dx^T * (psi_x + fx - Lambda_x) + Dy^T * (psi_y + fy - Lambda_y)
    F = IFFT(FFT(RHS) / K)

# update auxiliary variable psi, with shrinkage function
    input_x = Dx * F - f_x + Lambda_x
    input_y = Dy * F - f_y + Lambda_y
    magnitude = sqrt(input_x ** 2 + input_y ** 2)
    shrunk_magnitude = max(0, magnitude - lambda**(2 - p) * magnitude ** (p / 2 - 0.5))
    psi_x = input_x * shrunk_magnitude
    psi_y = input_y * shrunk_magnitude update Lagrange multiplier Lambda
    Lambda_x += c * (Fx - fx - psi_x)
    Lambda_y += c * (Fy - fy - psi_y)

# check for adequate convergence
    change = max(|F - F_old|)
    if change < tol:
        break
    else:
        F_old = F return F
```

FIG. 49

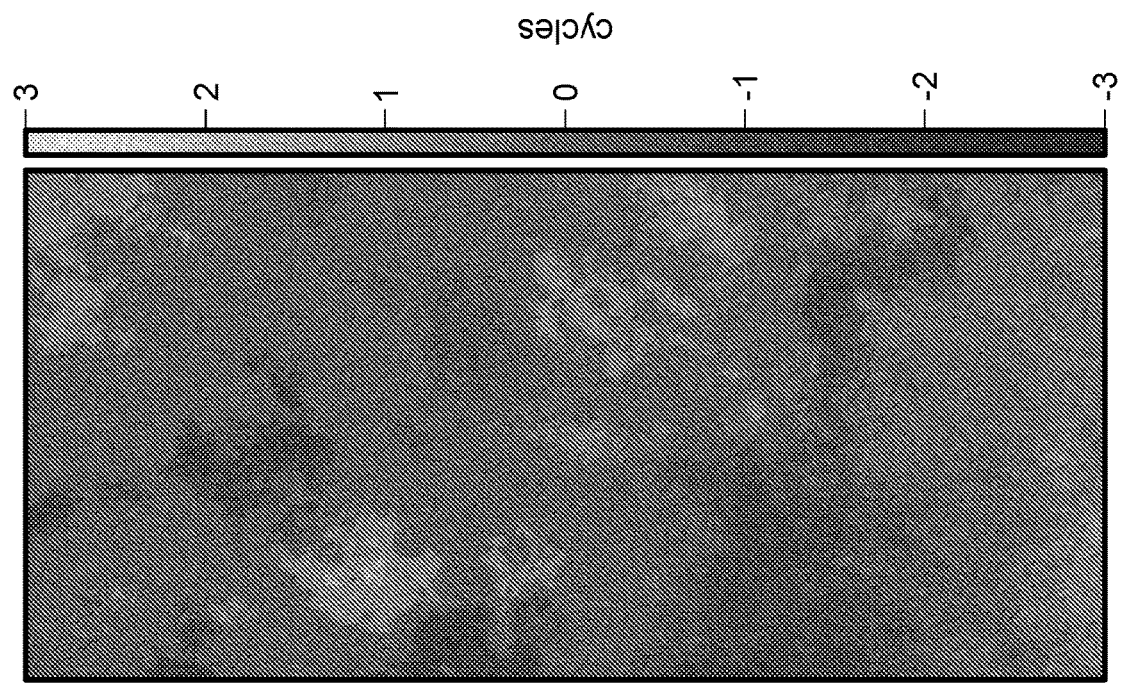
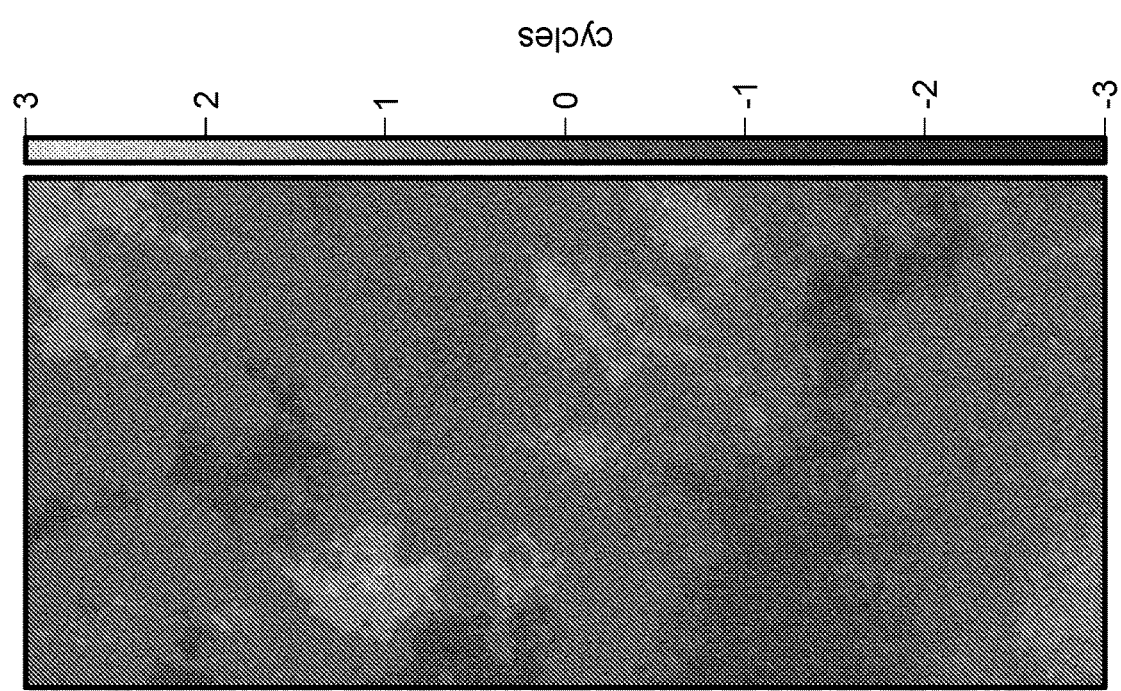
FIG. 52

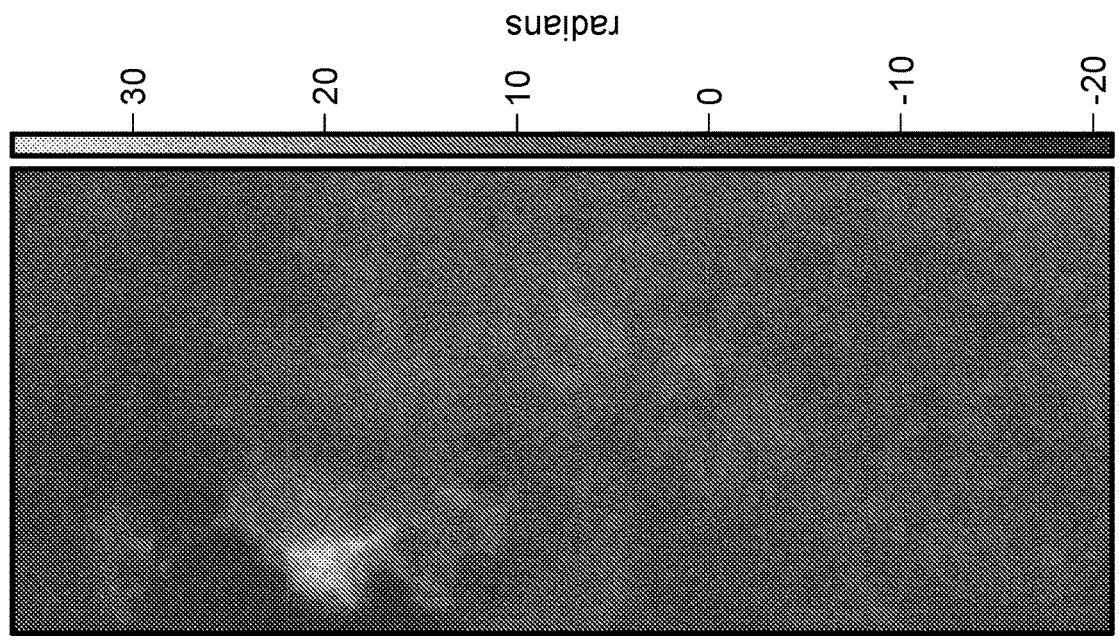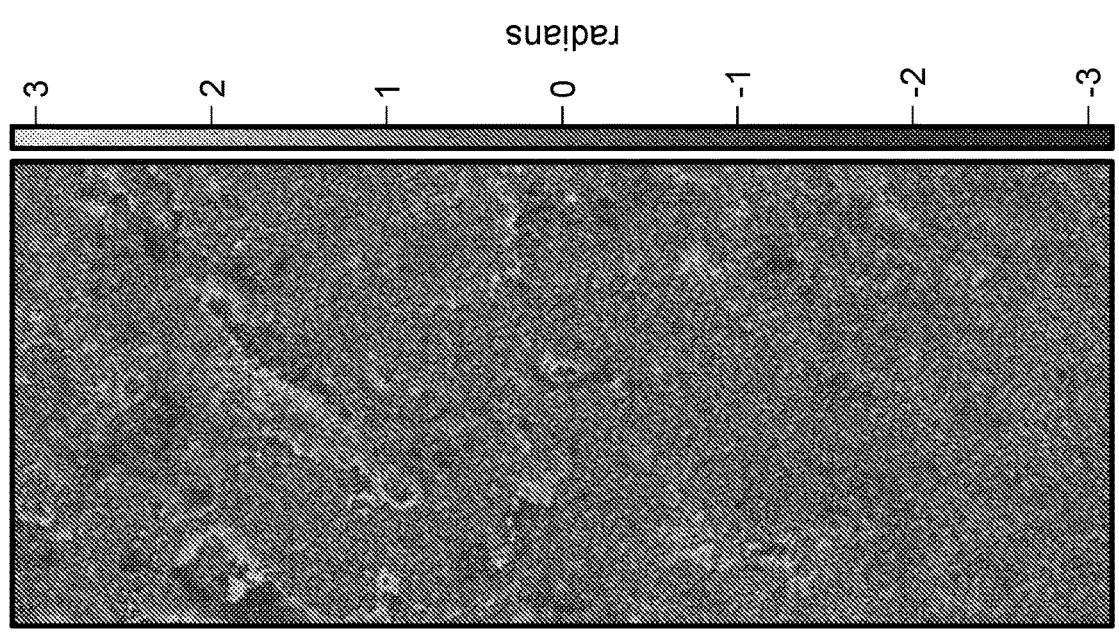
FIG. 53

```
seed=$1
stackversion="_2019-02-07"
redo=""
version="v0"
dltp='/opt/src/satin/insar/dltput.py'
${dltp} /opt/src/satin/satin/insar/scripts/make_scene_dem.sh ${seed} ${stackversion}
for swath in 1 2 3
do
    ${dltp} /opt/src/satin/satin/insar/scripts/baseline_analysis.sh ${seed} ${swath} ${stackversion} ${redo}
done
for swath in 1 2 3
do
    gsfest="/insar-scratch/${version}/${seed}/${swath}"
    swath_in=$gsfest/data_sm_swath.in
    ${dltp} -load 8 -filedep "/insar-scratch/${version}/${seed}/dem.grd", "$swath_in" /opt/src/satin/satin/insar/scripts/make_topo_ra.sh ${seed} ${swath}
done
for swath in 1 2 3
do
    gsfest="/insar-scratch/${version}/${seed}/${swath}"
    data_in=${gsfest}/data_sm_swath.in
    while [ ! -f $data_in ]
    do
        echo "Waiting for ${data_in}"
        sleep 60
    done
    /opt/src/satin/satin/insar/scripts/register_slc.sh ${seed} ${swath} ${stackversion}
done
# The following may block for a while
for swath in 1 2 3
do
    gsfest="/insar-scratch/${version}/${seed}/${swath}"
    intf_in=${gsfest}/intf.in
    topo_in=${gsfest}/topo_ra.grd
    while [ ! -f ${intf_in} ] || [ ! -f ${topo_in} ] ;
    do
        echo "Waiting for ${gsfest}/{intf.in,topo_ra.grd}"
        sleep 60
    done
    /opt/src/satin/satin/insar/scripts/intf.sh ${seed} ${swath}
done
for swath in 1 2 3
do
    while [ `/opt/src/satin/satin/insar/status.py ${seed} ${swath} | wc -l` -gt 0 ]
    do
        echo "Waiting for completed status ${seed} ${swath}"
        sleep 60
    done
    ${dltp} -load 32 -mem 300 -q insar-v0-highmem /opt/src/satin/satin/insar/scripts/sbas.sh ${seed} ${swath} 0 61 0 120 _dl 5 4
done
```

FIG. 58 — 5800

SPARSE PHASE UNWRAPPING

CROSS REFERENCE TO OTHER APPLICATIONS

This application claims priority to U.S. Provisional Patent Application No. 62/796,489 entitled SPARSE PHASE UNWRAPPING USING NONCONVEX CONTINUOUS OPTIMIZATION filed Jan. 24, 2019 which is incorporated herein by reference for all purposes. This application also claims priority to U.S. Provisional Patent Application No. 62/828,183 entitled SPARSE PHASE UNWRAPPING USING NONCONVEX CONTINUOUS OPTIMIZATION filed Apr. 2, 2019 which is incorporated herein by reference for all purposes.

BACKGROUND OF THE INVENTION

A variety of applications use the phase of an electromagnetic wave to derive useful information. One example is interferometric synthetic aperture radar (InSAR). Phase is often specified as an angle in radians, making a equivalent to one wavelength. The relative phase corresponds to the measurement not being able to distinguish between a phase of a and a phase of 0. The measurement identifies a point on a circle without knowing how many times the phase has gone around the circle. Unfortunately, in order to extract scientific value from the measurement, the phase typically needs to be unwrapped, which is nontrivial. Accordingly, techniques for efficiently unwrapping phase are desirable.

BRIEF DESCRIPTION OF THE DRAWINGS

Various embodiments of the invention are disclosed in the following detailed description and the accompanying drawings.

FIG. 3B shows a comparison of a 2003-era Beowulf cluster, Cray XE6 node, and 2015 Cloud performance.

FIG. 3C illustrates a brief summary of example computing costs.

FIG. 13 depicts an example of pseudocode for ingesting data.

FIG. 14 depicts an example of pseudocode for preprocessing data.

FIG. 15A illustrates an example portion of the Earth as viewed from above (e.g., by a satellite).

FIG. 15B illustrates an example portion of the Earth as viewed from the side.

FIG. 16 illustrates a set of NDVI values for a given pixel in a sixteen day period.

FIG. 21 depicts gradient presence images.

FIG. 49 illustrates example code for implementing phase unwrapping.

FIG. 52 illustrates the difference between the unwrapped and wrapped phase.

FIG. 53 illustrates an example of an interferogram and unwrapped phase for which SNAFU does not converge after a period of time.

FIG. 58 depicts an example control script for managing portions of process 5700.

DETAILED DESCRIPTION

Figure 1:
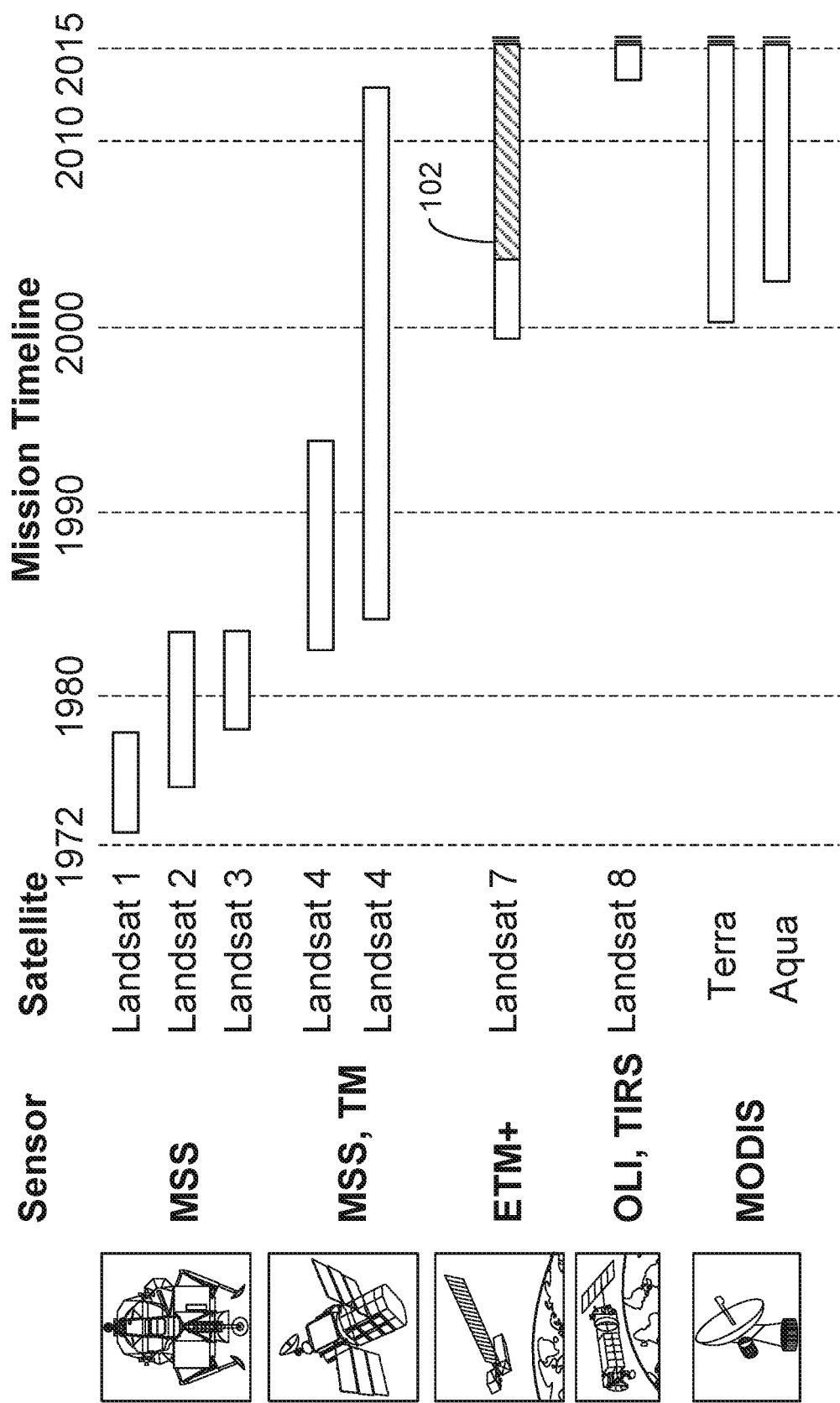
FIG. 1 shows NASA/USGS Landsat and MODIS satellites and sensors providing data that can be processed using embodiments of techniques described herein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques described herein can be used to process and analyze data such as multi-decadal observations of the Earth by constellations of satellites. For example, described herein are techniques for operating on over a petabyte ($8 \times 10^{15}$ bits) of compressed raw data from 2.8 quadrillion pixels (2.8 petapixels) acquired by sources such as the U.S. Landsat and MODIS Earth remote sensing programs over the past forty years. As described herein, such data can be converted from a raw form to a calibrated, georeferenced, and multi-resolution tiled format suitable for further additional processing/analysis, facilitating further space and time-domain analysis, including fusion of the Landsat and MODIS (and other) datasets, as applicable. The techniques described herein are efficient—allowing, in various embodiments, for the processing, in less than a day, on generally available resources, over a petabyte of scientific data collected from the natural world. The techniques described herein can be deployed using commodity cloud computing resources (using a "Cloud architecture"), but can also be deployed using other architectures, including traditional high-performance computing architectures, in various embodiments, as applicable.

I. Overview

A. Overview of Example Data Sources

The NASA/USGS Landsat program has routinely collected approximately monthly snapshots of the world's land surface since 1972. The Landsat program has evolved over its lifetime, with the eight Landsat satellites hosting a series of moderate-resolution multispectral imaging systems, from the Multispectral Scanner (MSS), to the Thematic Mapper (TM) and Enhanced Thematic Mapper (ETM+), and most recently the Operational Land Imager (OLI) and Thermal Infrared Sensor (TIRS). FIG. 1 shows NASA/USGS Landsat and MODIS satellites and sensors providing data that can be processed using embodiments of techniques described herein. Landsat 6 failed on launch, and a failure in the Landsat 7 scanline corrector (SLC) is indicated in region 102. Complementing the Landsat program is a range of lower-spatial resolution systems optimized for daily global imaging, of which the most widely used is the Moderate Resolution Imaging Spectroradiometer (MODIS) instrument on the NASA satellites EOS Terra (launched 1999) and Aqua (launched 2002). Landsat and MODIS are two examples of sources of observational data. Other sources can also be processed/analyzed in addition to/instead of Landsat/MODIS data in accordance with various embodiments. For example, observational data collected from other constellations (e.g., PlanetScope, RapidEye, Dove, SENTINEL-1, and SENTINEL-2), as well as higher-resolution imagery (e.g., collected via airplane/drones) can also be used in accordance with embodiments of techniques described herein.

Figure 2:
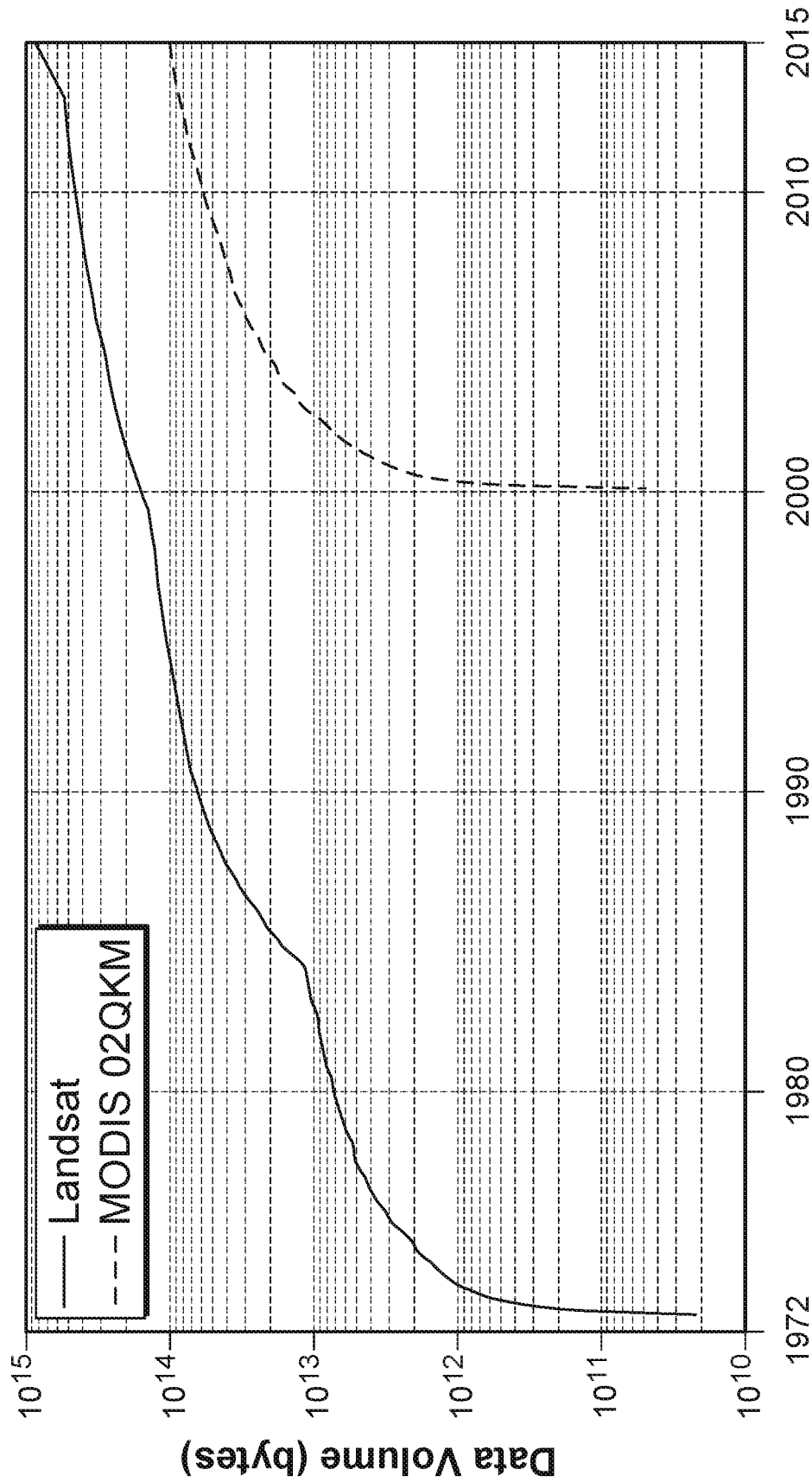
FIG. 2 shows the growth of Landsat and MODIS data volume over time.

FIG. 2 shows the growth of Landsat and MODIS data volume over time. To be most useful (e.g., to the community of researchers and policy makers), the Landsat and MODIS datasets need to be available globally on data systems that support high-bandwidth access, and the data itself needs to be stored in a data format that supports scientific analysis and is compatible with common visualization tools. At the time of the Landsat 1 launch on Jul. 23, 1972, the fastest computer in the world was the CDC 7600, capable of approximately 10 Mflops. Each Landsat 1 MSS scene consisted of 20 Mpixels (170 km×185 km image at 79 m ground sample distance in 4 spectral bands). The long-term storage options for these huge images involved magnetic tape and conversion to large-format photographic film. Hundreds of thousands of frames of photographic film remain in the USGS Eros data center, and efforts were taken in the early 1990s to convert the film data from Landsat 1 through 5 MSS and TM observations back to a digital format.

Google Earth Engine and the Amazon-NASA Earth Exchange (NEX) have placed historical (and are continuing to place newly-collected) Landsat and MODIS data into freely accessible storage in the cloud. Unfortunately, this data is often provided to the public in a format which requires more resources to store and process than necessary, and can prevent some forms of analysis entirely. As one example, bzip compressed tar files (often used to store such imagery) prevent random access to the data within them. Additionally, if answering a specific question requires access to the entire time series of data within a relatively small region (e.g., tens of kilometers), more than 1000 large image files spanning 185 km would need to be decompressed in their entirety, and then further spatially subdivided in order to fit within the memory of a processing node. However, if, as will be described in more detail below, the data is provided in a multi-resolution tiled format, only the data of interest needs to be accessed, reducing the cost and complexity by a large factor.

B. Overview of Infrastructure

1. Hardware

A variety of infrastructural approaches can be used to process data at a petabyte scale. One option is to purchase hardware, and install and maintain one's own computing center. One drawback of this approach is that, where the peak requirements are very large, but the typical workload is much smaller, resources will often go wasted through idleness. Further, this approach requires an appropriate knowledge of how to design and provision the hardware and software environment, possibly before having a complete understanding of the resources required to solve the data processing problem at hand. This solution also potentially comes with a multi-year commitment, since there is not much of a market for slightly used supercomputers.

A second option is to use shared supercomputing resources (e.g., provided by one's company, university, or national supercomputing facility). There are hundreds of supercomputing installations with more than 10,000 cores that could potentially provide for the on-node processing of the datasets described herein. Unfortunately, the associated storage and network resources are not so readily available. One major limitation to processing very large datasets using traditional supercomputing hardware is the difficulty of transferring the data to a parallel file system where it can be processed. At typical supercomputing center transfer rates, retrieving a petabyte from an archival storage location over the Internet could take a month or more.

Another issue is how to store the data while it is being collected. Parallel file systems commonly attached to supercomputers, such as Lustre and Panasas, have been designed for high performance, and their high cost limits their utility for long-term data storage. They are typically reserved for temporary, scratch storage. Lower cost archival storage such as magnetic tapes are available, but are not designed to support the use case of staging a petabyte at a time onto a parallel datastore. Yet another issue is how to perform further analysis and/or distribute results after a large data processing run has completed. Supercomputing centers typically do not provide a friendly environment for interactive data analysis and visualization, and additional infrastructure to provide web-enabled public or private access to large amounts of processed data can run afoul of traditional security models.

Instead of purchasing dedicated hardware to perform calculations, and/or performing them at an existing supercomputing center, an alternate approach is to leverage public cloud computing resources. Cloud computing represents a further step in the commoditization of computational resources, with associated benefits in agility, elasticity, and reliability. One aspect of cloud computing is that its pay-as-you-go model promotes transparency of resource costs, and thus allows free-market economic feedback loops which are largely suppressed in the traditional supercomputing environment. In the following discussion reference is made to Google Compute Engine, which is the Infrastructure as a Service (IaaS) component of Google Cloud Platform. Other platforms provided by other companies can also be used, and the techniques adapted as applicable.

Figure 3A:
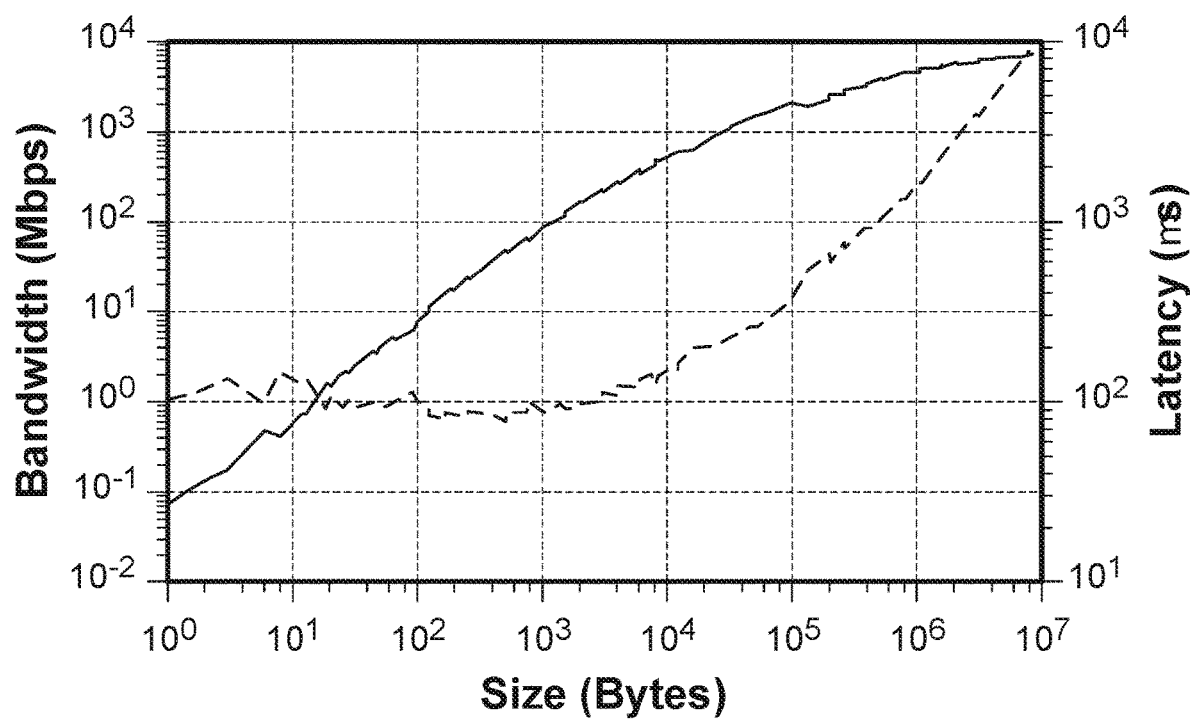
FIG. 3A shows bandwidth and latency for an example Google Compute Engine node.

Google Compute Engine became generally available in December 2013, and offers virtual machines using KVM as the hypervisor. Benchmarks connecting its node performance to a past Beowulf architecture and a recent HPC architecture are depicted in FIGS. 3A and 3B. In particular, FIG. 3A shows bandwidth and latency for a Google Compute Engine node. Small message latency is approximately 85 microseconds, while large message bandwidth reaches 7 Gigabits/second. FIG. 3B shows a comparison of a 2003-era Beowulf cluster Gordon Bell price/performance prize finalist to a Cray XE6 node and 2015 Cloud performance. The top set of results is memory bandwidth measured in Mbytes/s by the STREAM benchmark, the middle is from the Class C NAS Parallel Benchmarks in Mop/s, and the last line is Linpack Gflop/s. Beowulf results are per CPU on a 2.53 GHz Intel Pentium 4. Cloud results are per HW core on a 16-core 2.3 GHz Intel Haswell node. Cray results are per Bulldozer compute unit of a dual-socket XE6 node with 2 AMD Interlagos model 6276 2.3 GHz CPUs (16 cores total). The data indicates that performance per core has progressed little in the past 12 years for un-tuned applications (between factors of 1 and 8, with most of these benchmarks around a factor of 3).

A brief summary of example computing costs is shown in FIG. 3C. The values are derived from published Google Cloud Platform pricing and example performance measurements taken in April, 2015. The numbers represent rough estimates, and substantial discounts can be obtained for particular workloads. Commodity bandwidths and capacities have been converted to a cost per second per giga-unit to facilitate total cost estimation. For example, storing one petabyte (1 million gigabytes) for one year (31.5 million seconds) in Cloud Storage costs $315,000. One dollar can currently buy a minute of programming labor, deliver 8 Gigabytes to the Internet, store a gigabyte in DRAM for 1 week, or provide $10^{15}$ floating point operations.

Figure 4:
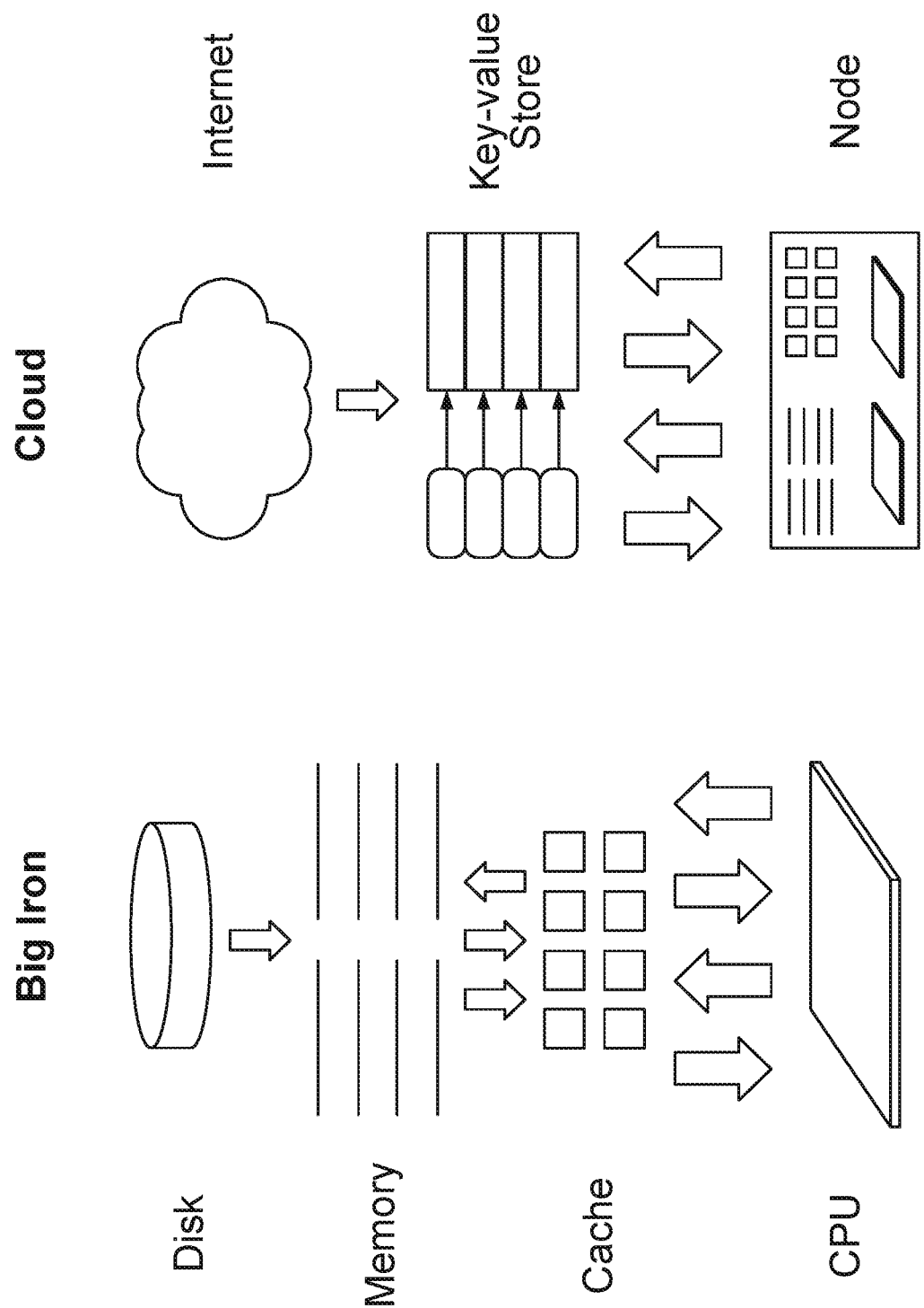
FIG. 4 illustrates a comparison between supercomputer architecture and cloud computing.

Many lessons gleaned from the past decades of supercomputing remain relevant to cloud computing with a translation between architectural components (e.g., where memory becomes a key-value store, and a CPU becomes the entire compute node). Where efficiency on a "Big Iron" supercomputer is most often dependent on dealing effectively with the limited bandwidth available from main memory, the equivalent limitation in the cloud is the network connection between the processing nodes and data storage. Techniques developed for "cache-friendly" algorithms to increase data locality can often be adapted for use in cloud architectures. An illustration of a comparison between supercomputers and cloud computing is shown in FIG. 4.

Figure 12:
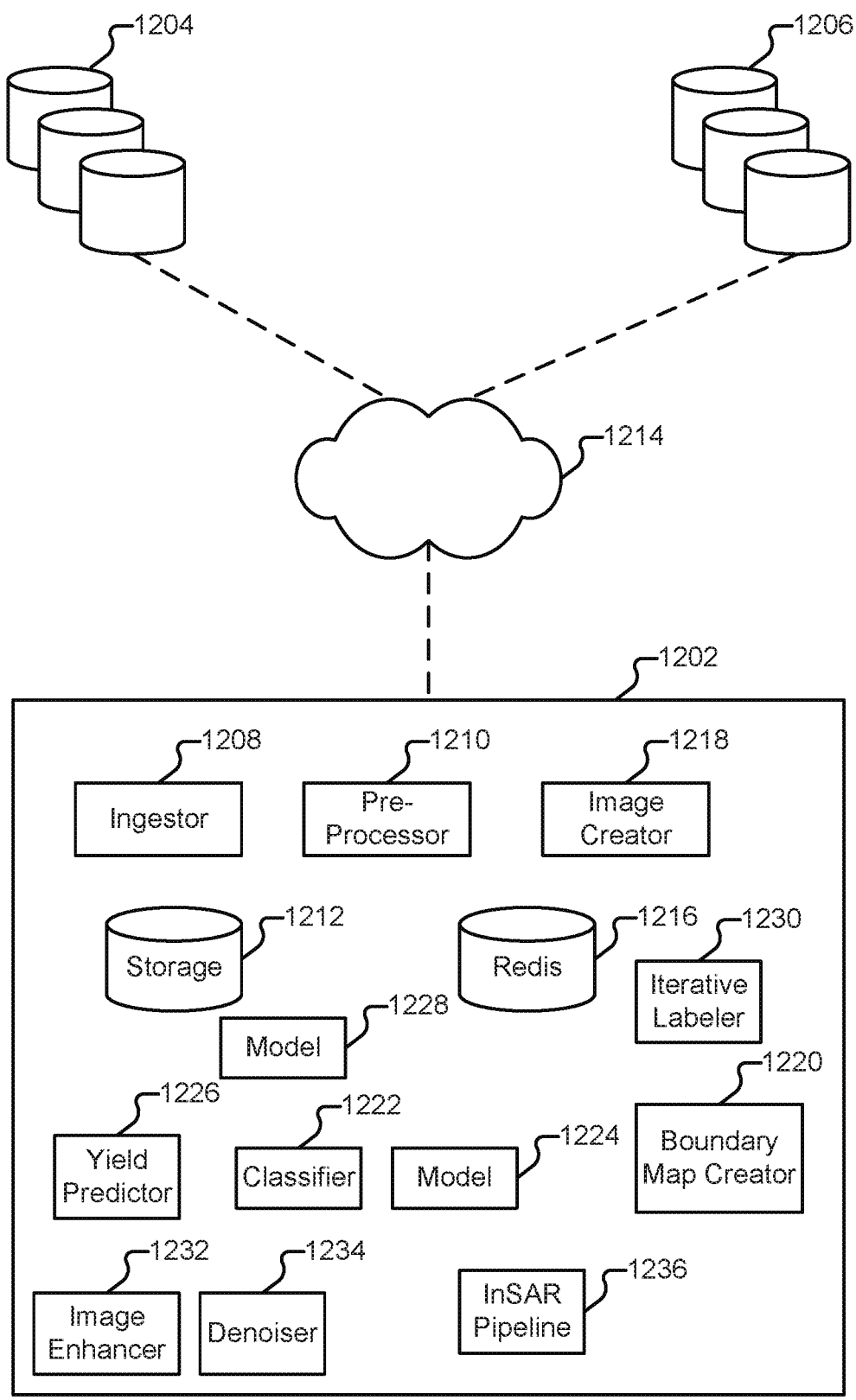
FIG. 12 depicts an example environment for processing and analyzing data in accordance with techniques described herein.

For the remainder of the Specification, reference will generally be made to various techniques being deployed using cloud computing resources. However, traditional standalone hardware can also be used, and the techniques described herein adapted as applicable. FIG. 12 (described in more detail below) depicts an example environment for processing and analyzing data in accordance with techniques described herein. As explained throughout the Specification, platform 1202 (and/or various elements thereof) can be implemented using traditional server hardware, and can also be implemented using cloud computing resources. Various elements of the environment shown in FIG. 12 are depicted as individual units (e.g., ingestor 1208 and pre-processor 1210). It is to be understood that such elements need not be implemented on a single node, but can also be implemented across multiple nodes configured to cooperate to perform tasks (e.g., leveraging various industry standard cloud computing techniques, as well as various approaches described herein). Further, whenever platform 1202 is described as performing a task, a single component, a subset of components, or all components of platform 1202 may cooperate to perform the task. Similarly, whenever a component of platform 1202 is described as performing a task, a subcomponent may perform the task and/or the component may perform the task in conjunction with other components. Various logical components and/or features of platform 1202 may be omitted and the techniques described herein adapted accordingly. Similarly, additional logical components/features can be added to embodiments of platform 1202 as applicable.

2. Software

The availability of useful, high-quality, and interoperable software packages continually increases (e.g., as the knowledge and effort of many software developers integrates over time in a code base counted in hundreds of millions of lines). The ecosystem that has developed around the collaborative development of software is a remarkable example of how the solution to a problem can be scaled across a large number of people. A corollary to the observation that there is vastly more high-quality open source software available now than there was in the past, is that much of the complexity of managing software has moved from writing one's own code to interfacing one's code with software written by others.

Python offers a good compromise between rapid code development and high performance. Accordingly, in various embodiments, various pipelines (and/or components thereof) are predominantly written in Python, leveraging Numpy for numerical array operations. Cython is used as a glue to interface to other software libraries, and the Geospatial Data Abstraction Library (GDAL) is also used. The code is revision controlled with Git, which is also used as the vehicle for code deployment to worker nodes. Other languages/packages/etc. can also be used in accordance with various embodiments of the techniques described herein. As one example, a Landsat metadata file parser from the Landsat ecosystem disturbance adaptive processing system (LEDAPS) can be written in the C programming language, comprising approximately 500 lines of code, supporting either the old or new Landsat metadata format, depending on the version used. A Python metadata file parser in accordance with embodiments of the techniques described herein requires less than 40 lines, and can support both old and new Landsat metadata formats with the addition of an 80 line translation dictionary. Landsat metadata information can be propagated into an XML container within JPEG 2000 output files, providing a self-documenting provenance for the data the processing pipeline produces.

Various approaches can be used to reduce the cost of resources involved in the various kinds of processing and analysis described herein (examples of which costs are illustrated n FIG. 3C). For example, memory usage can be reduced to allow for execution on the smallest memory (and least expensive per core) Google Compute Engine nodes, which contain somewhat less than 2 GBytes of memory per hardware core, and use no conventional disk storage on the compute nodes at all (beyond the minimum 10 GB partition required to boot the system), working entirely in memory or from the Linux tmpfs RAM disk. As another example, intermediate writes to the local file system can be reduced, instead going from memory buffer to memory buffer between application libraries. As a specific example, rather than copying a bzipped Landsat image tar file from Google Cloud Storage to local storage and then decompressing and reading the file into memory, the data can be streamed directly into memory using a Python tarfile module reading from a gsutil cat pipe. The data in memory can then be passed directly to GDAL via the gdal.FileFromMemBuffer interface.

3. Initial Dataset—Landsat/MODIS

One example input dataset for use in conjunction with techniques described herein comprises $915.52 \times 10^{12}$ bytes of Landsat data in 5,693,003 bzip compressed GeoTIFF files (available at gs://earthengine-public/), and $101.83 \times 10^{12}$ bytes of MODIS Level 1B (2QKM) band 1 (red) and 2 (near infrared) data in 613,320 sz compressed Hierarchical Data Format (HDF4) files (e.g., collected from the NASA ftp site (1204) and stored in Google Cloud Storage (1212)), for a total of $1017.35 \times 10^{12}$ bytes and 6,306,323 files. The oldest image was collected Jul. 25, 1972, and (in this example data set) the recent image was collected on 2015-04-13 at 06:10:04Z. All of the input data is publicly available.

In various embodiments, the processing stages for each Landsat image in the dataset include: retrieving the image from Google Cloud Storage, uncompressing the image, parsing the metadata, identifying the bounding rectangle that contains valid data, cleaning the edges of the image, converting the raw pixel information into meaningful units (e.g., calibrated top of atmosphere reflectance using the appropriate constants for each satellite and accounting for solar distance and zenith angle), cutting each image into appropriately sized pieces using a consistent equal-area worldwide tiling of the sphere, performing any necessary coordinate transformations, compressing the data into a JPEG 2000 format (or another appropriate format), and storing the result back into Cloud Storage.

4. JPEG 2000 Image Coding

Aspects of JPEG 2000 include:

Rate-distortion performance that is somewhat superior to that of traditional JPEG at high bit-rates (i.e., low compression ratios) and substantially superior at low bit-rates (i.e., high compression ratios).

Much greater flexibility in terms of the types of images that can be coded, including single and multi-band images, and bit-depths between 1 and 32 bits per band (e.g., as compared to traditional JPEG).

Support for both lossless and lossy compression.

A scalable codestream that can be truncated to obtain a lower bitrate representation of the image of similar quality to that which would have been obtained if the image had been coded to target that reduced bit-rate. The codestream can be ordered for various forms of scalability, giving priority, for example, to either resolution (a high-fidelity low-resolution representation is obtained first) or fidelity (a low-fidelity full-resolution representation is obtained first).

The above features are all provided by the baseline, defined in "Part 1" of the standard, which also defines a standard file format for the codestream, referred to as JP2. Further flexibility, such as support for user-defined wavelet transforms and inter-band transforms, is provided by "Part 2" extensions to the standard, which also defines the more flexible JPX file format.

5. Generations of Landsat Imagery: MSS, TM, ETM+, AND OLI

Landsat images comprise 6 or 7 spectral channels, a higher-resolution panchromatic channel (only available in Landsat 7 ETM+ and Landsat 8 OLI), and one or more mask images. Example ways to combine groups of them are in the following set of JPEG 2000 encoded images in JP2 file format:

a three-band image comprising the spectral channels with the closest correspondence to visible red, green, and blue bands (lossy coding), a three-band image comprising the near infrared (NIR) and short wave infrared (SWIR) bands (lossy coding), a single thermal infrared (TIR) band (lossy coding), a single high-resolution panchromatic (PAN) band for ETM+ and OLI (lossy coding), a single band 1-bit image representing the data validity mask (lossless coding), and a single band 8-bit image representing the most important bit-planes in the Landsat 8 Quality Assessment Band (lossless coding).

The above layout does not fully exploit all of the flexibility of the JPEG 2000 standard, which would allow all bands to be included within a single JPX file, or all multi-spectral bands to be included as multiple components within the same JP2 file. Example reasons for this choice are (i) the optimum layout is strongly influenced by the optimal chunk size for access while minimizing costs for cloud file operations, and (ii) a JP2 file format was preferred over the more flexible JPX format due to the much wider support by libraries for decoding JPEG 2000 format images. In other embodiments, other layouts can also be used.

JPEG 2000 performance in reversible coding of bitplanes is inferior to that of a coding technique, such as JPEG-LS, specifically designed for this type of content. However, to avoid the complexity of using multiple coding standards, in various embodiments, JPEG 2000 is also used for bands of this type. A substantial performance improvement can be obtained, at the expense of losing resolution scalability, by effectively disabling the wavelet transform by setting the number of transform level to zero.

6. JPEG 2000 Parameters

Figure 5:
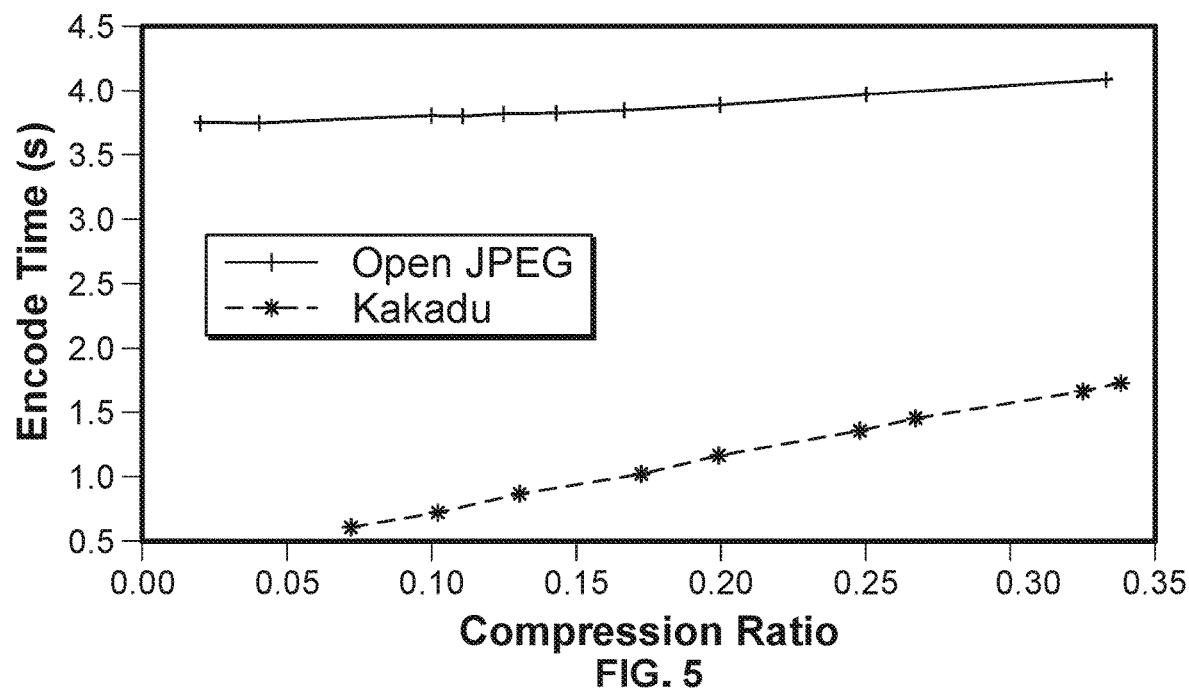
FIG. 5 illustrates a comparison of encode times for the OpenJPEG and Kakadu libraries for a 3-band 12-bit Landsat 8 image.

A variety of libraries can be used for manipulating image data. For example, the commercial Kakadu library can be used, as can an open-source option such as OpenJPEG. Using the Kakadu library offers an advantage in encoding speed, as illustrated in FIG. 5, which depicts a comparison of example encode times for the OpenJPEG and Kakadu libraries for a 3-band 12-bit Landsat 8 image. Reported times are averages over 10 runs. With respect to the data depicted in FIG. 5, Kakadu multi-threading was disabled to do a fair comparison for the environment, to account for the use of parallelism on a node at the task level.

One application of the imagery described herein is as an input to a classifier. In such a scenario, quality measures targeting perfectibility of distortion to a human viewer are generally not directly relevant. A compression ratio can be based on more meaningful criteria, e.g., by performing a classification experiment on processed JP2 imagery over a wide range of compression ratios. As one example, suppose for each ratio, thirteen 2048×2048 frames for the same thirteen 2048×2048 frames for the same spatial location (e.g., a region in Kansas) are selected from different times in 2011, and 1800 rows of pixels are used in each of the six spectral bands as training data, with the remaining 248 rows of pixels as testing data. The ground truth in this example is whether each pixel location is identified by the United States Department of Agriculture (USDA) CropScape Data Layer (CDL) as containing wheat. The 78-dimensional training inputs for each of the 3,686,400 training pixels can be input into an artificial neural network comprising three fully-connected layers, using the open source Caffe library. In this example, suppose the classification performance varies from 87.52% for uncompressed data to 87.13% for the most compressed imagery. A compression ratio can be selected such that it is sufficiently high to give a substantial reduction in storage costs, but for which image structure (e.g., edges) is just perceptible in the difference image between original and decoded images.

Figure 6:
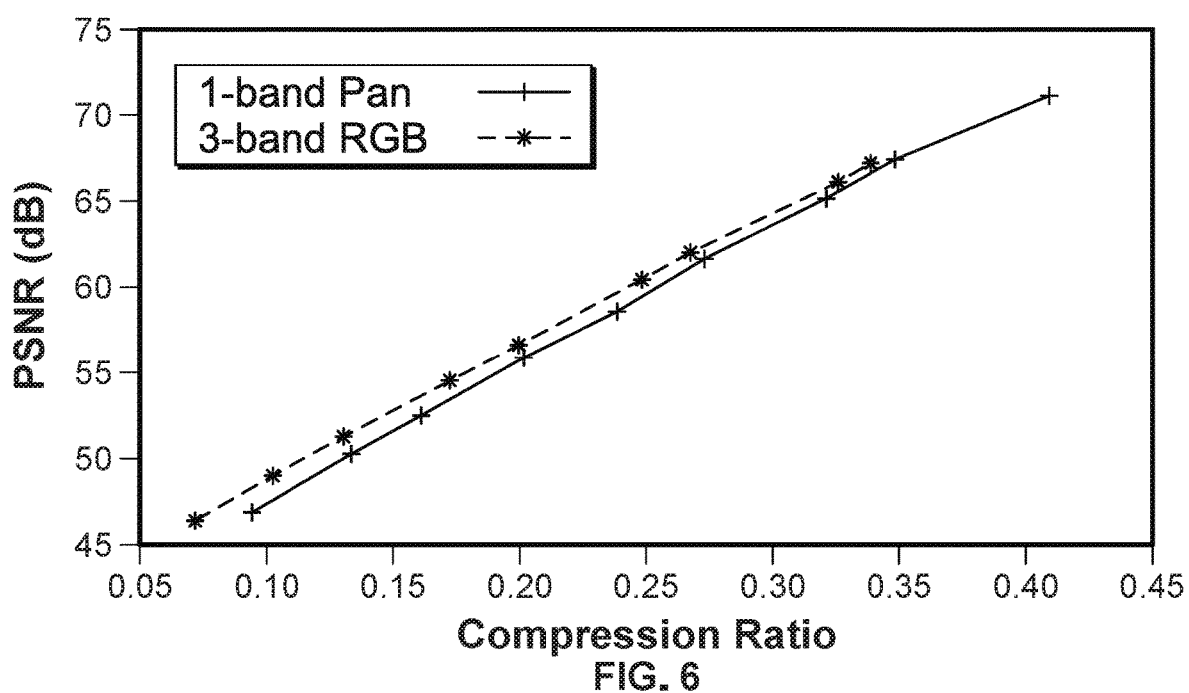
FIG. 6 illustrates an example of rate-distortion performance for Landsat imagery.

An example of rate-distortion performance for Landsat imagery is presented in FIG. 6. In particular, FIG. 6 depicts the JPEG 2000 rate-distortion performance for a single-band panchromatic image and a 3-band multi-spectral (RGB) image from the same Landsat 8 tile. The coding rate is measured in terms of compression ratio, and distortion is measured in terms of PSNR. In various embodiments, the desired level of compression is specified to the Kakadu encoder using the rate-allocation slope rather than a target bitrate (which is less robust to changes with image content in delivering a consistent reconstruction distortion).

7. Visualization in the Browser

Being able to quickly view and interrogate a given image or montage of images can be helpful for verification and validation of a processing pipeline. Unfortunately, even though the use of JPEG 2000 enables superior performance in terms of compression ratios and multi-resolution representation of imagery, modern web browsers such as Google Chrome, Mozilla Firefox, and Apple Safari do not natively support the format. Accordingly, output JP2 files that could otherwise be viewable directly in the Google Developers' Console Storage Browser must first be downloaded to a local workstation and viewed using an image viewer capable of parsing JP2 files. The situation is aggravated by the files having up to 10 different components, requiring the usage of layout-specific visualization scripts. One solution is to use a Google Chrome Javascript-based extension to view images directly from within the web browser. While an entire JP2-capable parser can be purely in Javascript, in various embodiments, the Emscripten LLVM compiler toolchain is used to compile the C99 OpenJPEG 2.1.0 library to LLVM bytecode and translate the result into optimized Javascript. The base library can be augmented by implementing additional C library functions that are used to specify additional decoding parameters and yield direct access to image component data without first writing to a temporary PNG or RAW image. An HTML5 Canvas object can then be filled with the data array, providing scaling and gamma correction functionality through a simple web GUI. This moves the image inspection procedure directly to wherever the data resides (in terms of its location on a website). Progressive decoding of the bytestream can be performed as it arrives from the server, allowing for a seamless integration into traditional websites.

8. Example System and Environment—Google Compute Engine

As explained above, in various embodiments, the data processing and analysis techniques described herein are implemented using commercially available public cloud resources with an on-demand cost model. These include Google Cloud Platform resources, such as Compute Engine and Cloud Storage, but other platform resources by other vendors can also be used, as applicable (e.g., as offered by Amazon). Cloud vendors such as Google divide physical hardware into virtual resources to divide workloads into isolated environments, which allows customers to use compute capacity with an on-demand cost model. Once the task is complete, the customer can deprovision the system, ending their costs. The virtual infrastructure and its underlying physical resources can then be returned to the available resource pool for the next customer to use. Construction and management of data centers, purchasing of hardware, utilities, and staffing are all removed for the task of building a large distributed system. This allows for focus on the actual problem being solved. Google currently has four geographic availability zones in its us-central1 region, any/all of which are used in various computations described herein. Geographical diversity creates design options for robust failover and scaling.

Google Compute Engine allows for development teams to specify virtual hardware such as CPU, RAM, SSDs, network, security, etc., along with software such as an operating system, custom software, and dependencies. This flexibility allows the costs and benefits of different hardware to be factored into the software engineering decision process, as a tradeoff against the cost of optimizing the code to work with lower priced virtual hardware. In various embodiments, worker nodes comprise four virtual machine CPU (vCPU) models, based on what is available in the four geographic zones. Examples are as follows:

| Zone | Virtual Machine | CPU Hardware |
| --- | --- | --- |
| us-central 1-a | highcpu-16vCPU | Intel Sandy Bridge 2.6 GHz Xeon E5 |
| us-central 1-b | hi ghcpu-16vCPU | Intel Haswell 2.3 GHz E5 v3 |
| us-central 1-c | highcpu-32vCPU | Intel Haswell 2.3 GHz E5 v3 |
| us-central 1-f | highcpu-32vCPU | Intel Ivy Bridge 2.5 GHz E5 v2 |

Other virtual hardware specifications such as RAM, SSD, and network are identical across zones. Software is identical with the exception of worker processes corresponding to the vCPUs available. Zone variations (primarily 16 and 32 vCPU instances) necessitate multiple VM templates. Datacenter regions also allow the specification of templates inside a group, such as the specification of the number of VMs to be created, and auto-scaling of the group based on factors such as network traffic or CPU load.

9. Example Software Deployment and Configuration

In various embodiments, software deployment and configuration is accomplished with two techniques: bash scripts and Linux containers (e.g., Docker). VM templates allow for a custom script to be specified and executed post startup. With the bash script technique, the code is pulled from a private Github repository along with dependencies, and configuration files deploy the code onto the virtual machines and start the worker processes. In the second approach, a pre-built Docker container that contains source code, dependencies, and configurations built inside the container is deployed onto the VM and the container is executed in daemon mode. Docker containers provide an API around several Linux kernel features (libvirt, LXC, systemd, and libcontainer) to create an isolation mechanism from the host OS while utilizing the existing Linux kernel. Traditional virtual machines fully isolate operating systems on top of a hypervisor. Docker containers also use a copy-on-write layered file system approach where identical layers need not be duplicated, creating considerably smaller storage requirements than traditional virtual machines. Because the container is leveraging the existing kernel's CPU, memory, and network, additional performance overhead can be minimal. Containers can be executed on both virtual machines and bare metal hardware, which provides an efficient mechanism to move configured, functional, versioned, compute capabilities to where the data resides, which often could be a different cloud vendor, private datacenter, or collaborator's laptop. Just as source code can be branched and versioned inside modern source code repositories such as Git, pre-built containers can be versioned and branched in container repositories at a fraction of the size of versioning virtual machines, since only the changes in the layered file system are differentiated. In an example deployment, containers are built with all required dependencies, configurations, and source code from GitHub, and then stored in a private Google Container Registry located inside a Google Cloud Storage bucket. This allows for the latest container to be pulled down and executed in daemon mode on startup in a consistent manner across the cluster. Containers also provide a reproducible archival mechanism for others to later execute code to attempt to duplicate results with minimal effort. The time from the initial virtual machine creation command to the worker node starting tasks from the task queue is two minutes in an example run.

The Landsat dataset is stored inside Google Cloud Storage as a publicly available dataset, persistent and accessible from all four us-central zones. As an alternative to using a large NFS for all worker nodes to write results, Google Cloud Storage buckets can be used as a persistent, common datastore across all nodes. As a further benefit, this data is also available in other geographical zones, enhancing availability and tolerance to hardware failures.

To manage the creation of asynchronous tasks for processing millions of scenes across the worker nodes, an asynchronous task queue approach (e.g., the Python Celery library) is used in some embodiments. Celery's API allows multiple asynchronous job queues to be created, the list of tasks and their parameters to be managed, and for their insertion into a pluggable backend key-value pair store (e.g., Redis). As worker nodes are provisioned and start, they connect to the Celery broker to receive processing tasks in the queue. To optimize performance, Redis can be configured to keep the queue in memory.

10. Scalability and Performance—Example Execution

In one example execution (e.g., of the tiling process described in more detail below), processing of a petabyte of satellite imagery begins at 02:15 UTC, when 250 nodes in zone us-central1-f are started, processing Landsat TM images. Additional compute instances are then created across zones a, b, c, and f, accounting for approximately 15,000 physical compute cores. At 11:34 UTC, nodes running the MODIS processing pipeline are started, and an equivalent number of Landsat nodes are shut down. At 15:45 UTC, a list of tasks which have not completed and have not been automatically re-tried by the task manager is resubmitted. By 16:15 UTC, the bulk of the Landsat tasks are complete, and the remaining Landsat MSS tasks are added. At 17:11 UTC, the MODIS processing completes, and at 17:41 UTC on April 16 all tasks have completed.

Figure 7:
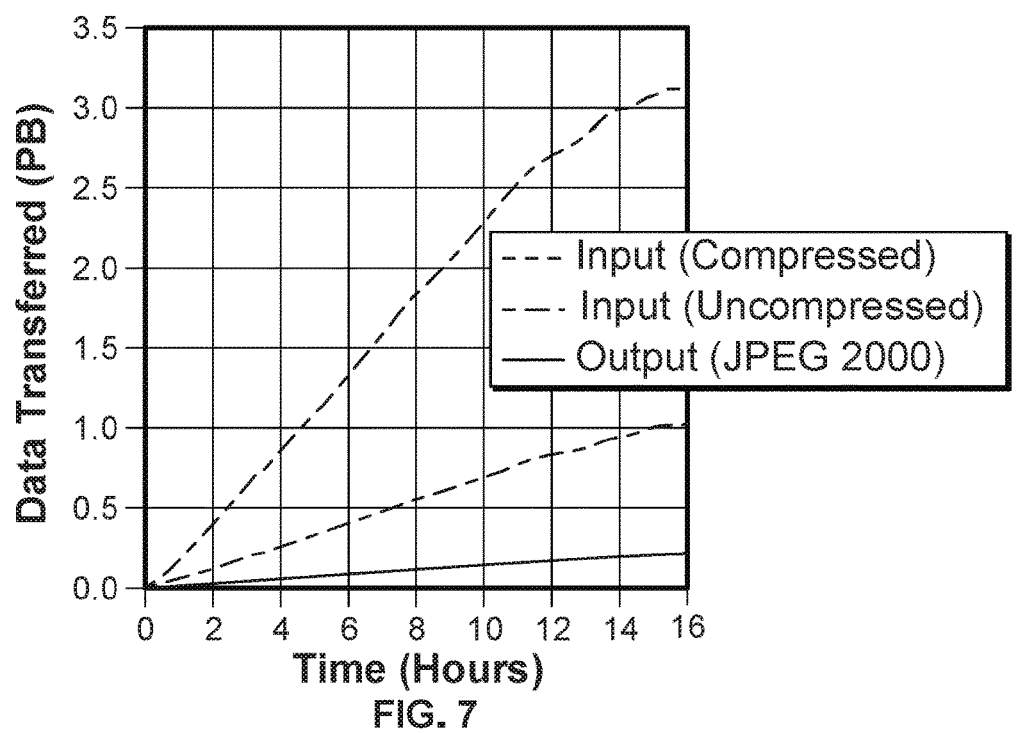
FIG. 7 depicts progress of an example imagery processing job.

FIG. 7 depicts progress of the aforementioned processing over 15.5 hours. The petabyte of input data is read from the distributed Google Cloud Storage system at an average rate of 18.1 Gbytes/sec. After decompression, this represents 55.2 Gbytes/sec into processor memory. The peak input network bandwidth exceeds 25 Gbytes/sec (200 gigabits/sec). The output bandwidth back to Google Cloud Storage averages about 4.5 Gbytes/sec, written to over 185 million individual files.

Figure 8:
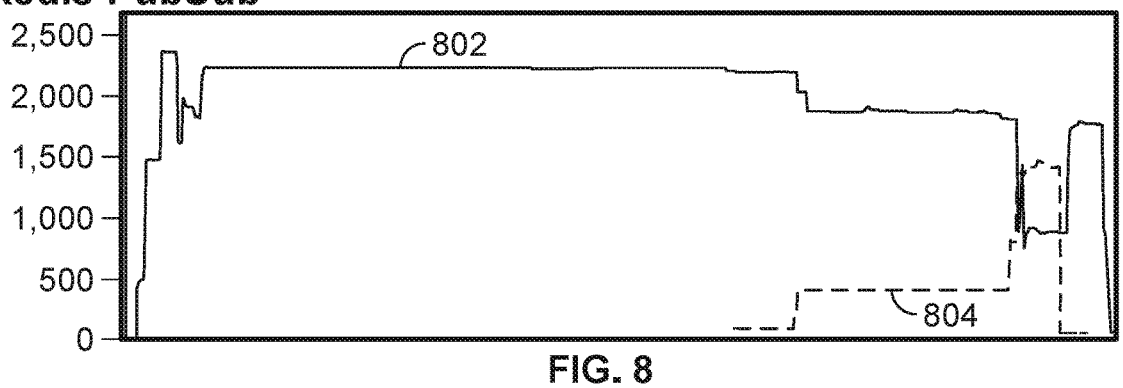
FIG. 8 illustrates the number of nodes involved for each phase of an example imagery processing job.

The number of nodes involved for each phase of the above example execution is shown in FIG. 8 (counting one publisher and one subscriber on each node, with a mix of 8-core and 16-core machines). In particular, the number of publishers and subscribers during the calculation derived from the Redis system used as a backend by the Celery task manager is shown. Line 802 shows Landsat tasks, and line 804 shows MODIS tasks.

Figure 9:
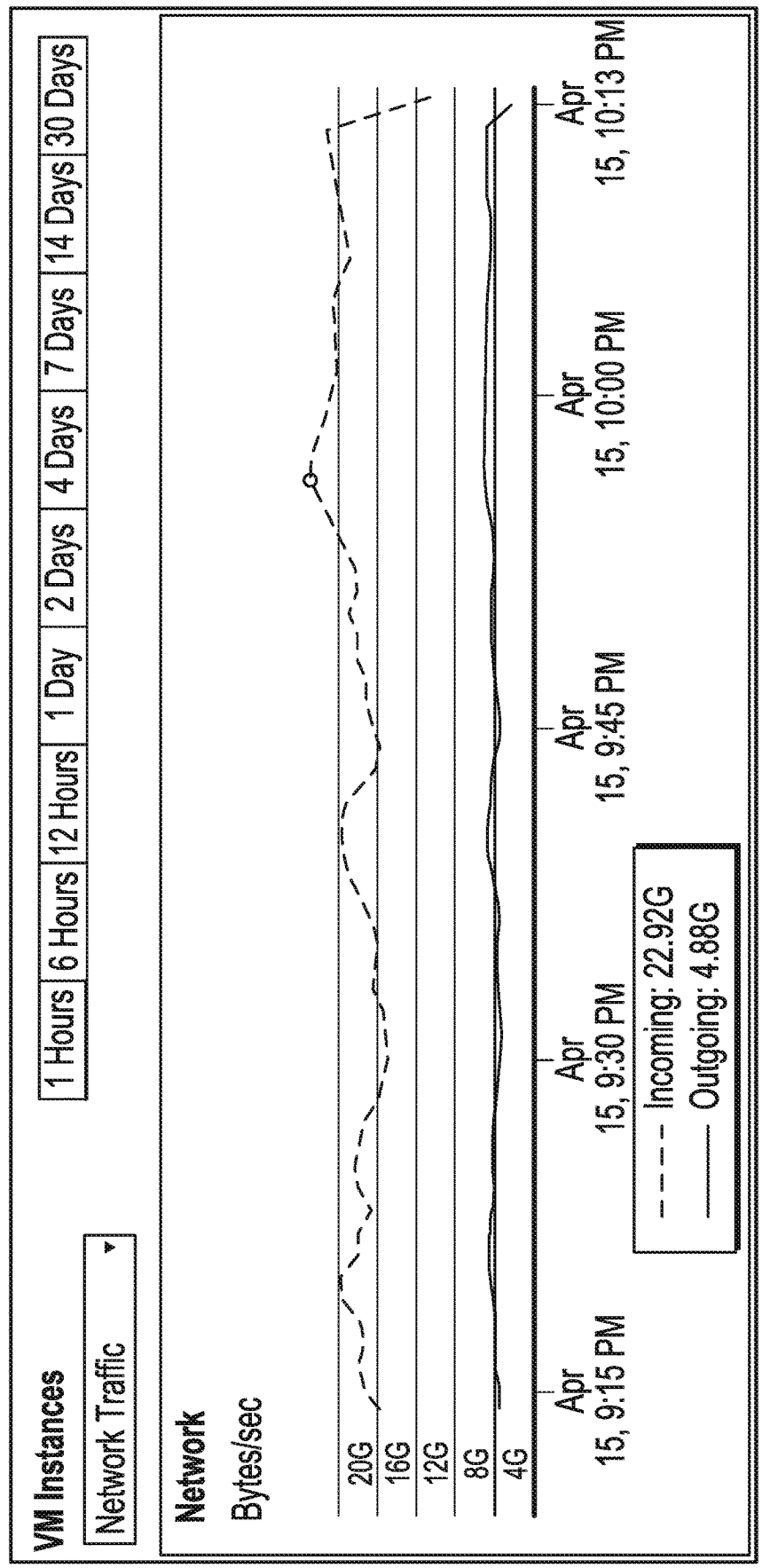
FIG. 9 depicts output from the Google Developer Console showing network bandwidth in and out of compute nodes during an hour slice.

FIG. 9 depicts output from the Google Developer Console showing network bandwidth in and out of compute nodes at hours 3-4 of the process, showing typical bandwidths above 16 Gbytes/sec, with the peak at nearly 23 Gbytes/sec.

Figure 10A:
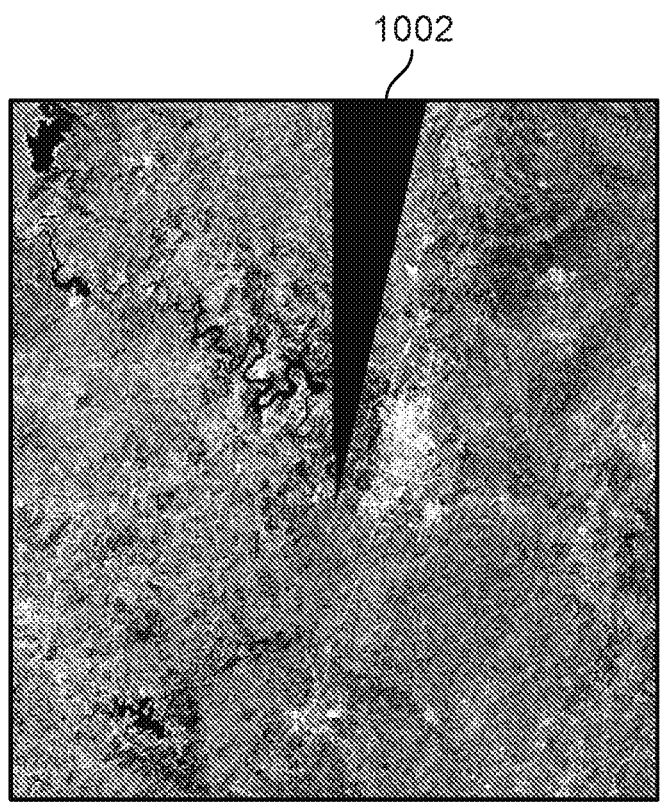
FIGS. 10A-10C illustrate processed tiles.
Figure 10B:
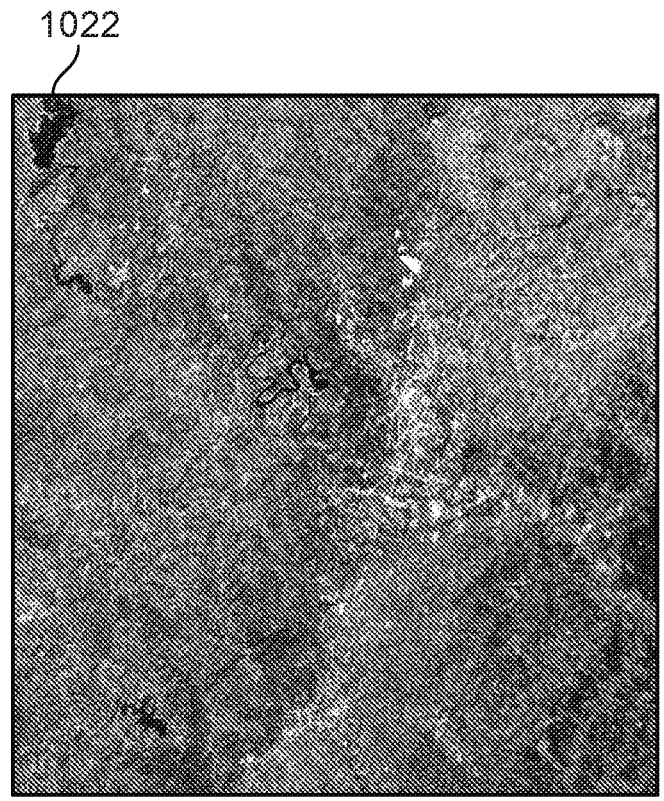
Figure 10C:
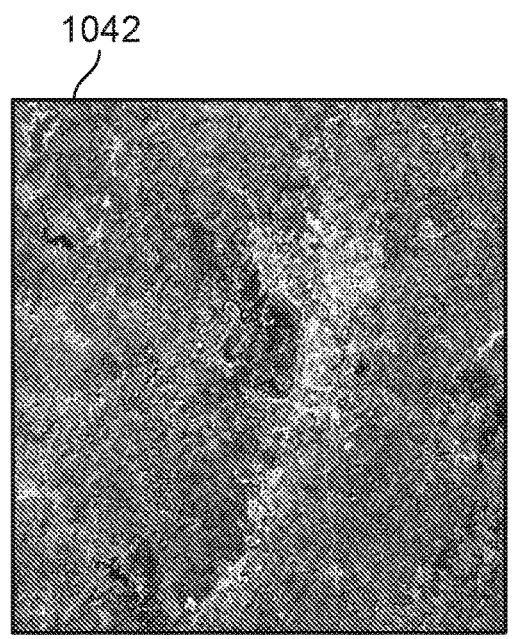

FIGS. 10A-10C show examples of processed tiles of the Austin, Tex. area. FIG. 10A depicts March 1973 (Landsat 1 MSS), FIG. 10B depicts September 1994 (Landsat 5 TM, 10B), and FIG. 10C depicts March 2015 (Landsat 8 OLI, 10C), respectively. The tiles are 2048×2048 pixels, and are calibrated and georeferenced. The Landsat 1 image (FIG. 10A) is a false-color image (RGB display channels mapped to near IR, visible red, visible green), due to the MSS sensor lacking a visible blue band. All three panels are composites of four processed tiles, where each panel is formed from tiles collected over several days, showing the consistency of the processing across Landsat scenes and between sensors. Region 1002 in FIG. 10A is a region where no data was available in that Landsat 1 MSS observation. Changes in the extent of urbanization surrounding Austin are clearly visible from panel to panel, as is a significant change in Buchanan Lake between FIGS. 10B (region 1022) and 10C (region 1042).

II. Ingestion and Pre-Processing

Figure 11:
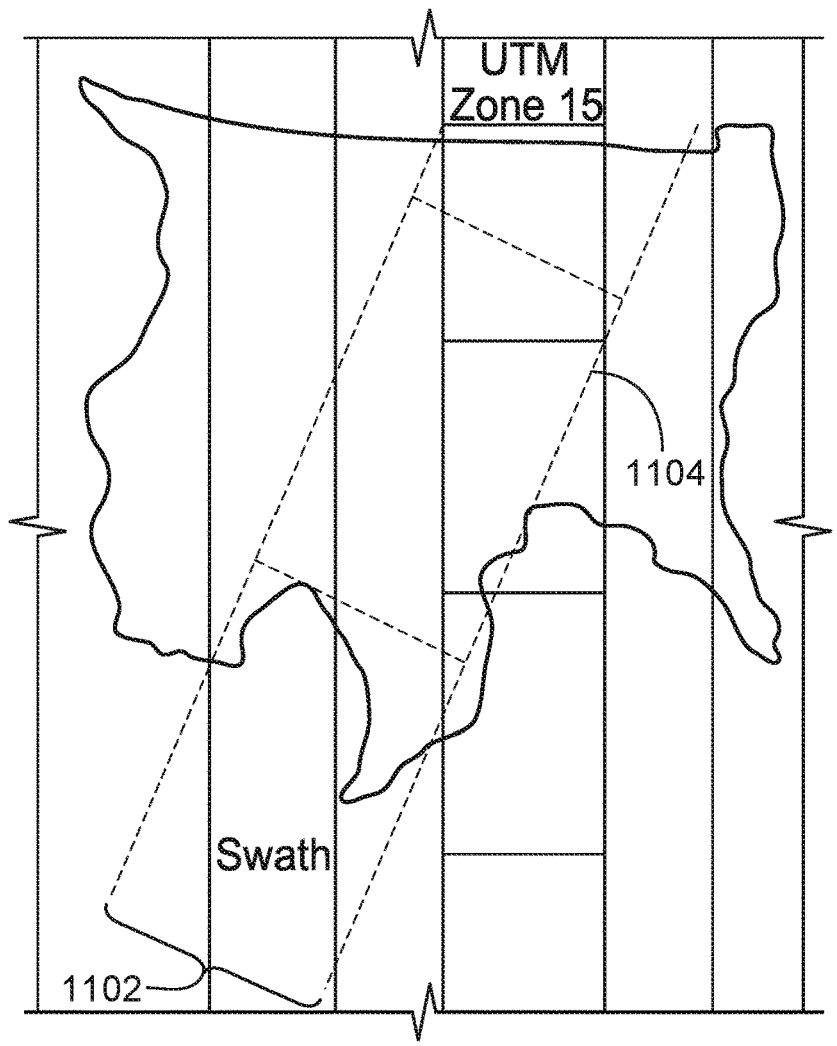
FIG. 11 depicts an illustration of the United States, as observed from satellite.

FIG. 11 depicts an illustration of the United States, as observed from a satellite. In particular, FIG. 11 illustrates a granule (1104) of data—five minutes of orbit along a swath (1102). The path of the spacecraft is down through the center of the swath.

A. Map Projections

Two common map projections which represent the spherical surface of the Earth as a regular grid are the Web Mercator projection and the Universal Transverse Mercator (UTM) projection. A single image of the Earth with pixel scales less than about 10 km is too large to process efficiently, so the map must be "tiled," or split into pieces which can be processed independently.

The Web Mercator projection can readily be tiled, because the image dimensions are precisely a power of two in both coordinates. The level of the decomposition divides the world into $4^n$ level pieces. An appropriate level can be chosen to satisfy various constraints, mainly, the number of time slices of a given tile that can fit into processor memory at one time. Web Mercator is suitable for simple map interfaces, but is problematic for applications beyond simple analysis because the pixel areas are not equal: as a pixel becomes farther from the equator, it represents a smaller and smaller area on the surface of the Earth.

The UTM projection is not as simple. UTM first splits the world into 60 zones, and within each zone pixels are split into nearly equal areas referenced by their "x" or "Easting" coordinate and their "y" or "Northing" coordinate. All UTM distances are measured in meters. The number of pixels which span a zone in the East-West direction depends on the distance from the equator.

For the MODIS sensor carried on the Aqua and Terra satellites, sensor values come as a logically rectangular grid of latitude/longitude co-ordinates (a swath), but projected on to the surface the sample points are not on a regular grid (points become farther apart towards the edges of the swath). For other sensors, the image values are delivered in UTM coordinates. A shared, common coordinate reference system can be used to further the most efficient and accurate processing of multiple datasets. Most of the input data is delivered in UTM coordinates, and operations to interpolate pixels to a different map projection or resolution can affect the data quality and require additional computational resources. Accordingly, in various embodiments, UTM is used as a common map projection. The tiling techniques described herein can also be adapted for use with other projections, as applicable.

B. UTM Tiling Parameters

UTM tiling (e.g., as used by embodiments of platform 1202) can be described by a number of parameters. It is applied to each of the 60 UTM zones with identical parameters, with the zone designated by z. A similar construction can be applied to the polar UPS projection. The parameters are as follows:

z: the UTM zone,
$x_0 y_0$: the origin of the tiling system,
$x_n y_n$: the number of pixels in the tile,
$x_b y_b$: the border size of the tile,
r: the spatial resolution of the pixel.

Each pixel can be located by its spatial global index offset from the origin of the tiling system $g_i g_j$ or its index i, j, within a specific tile $t_i t_j$ (also referred to as column and row).

An example size for tile images (e.g., given current computer architectures and memory storage capacities) $x_n y_n$ is approximately 4096×4096 pixels. Since a UTM zone is 6 degrees across, that represents 668 km at the equator. For pixel scales $x_r$ larger than approximately 200 meters, a single tile will cover the east-west extent of a UTM zone. For smaller pixel scales, multiple tiles are required. For example, for r=10 m resolution (e.g., SENTINEL-2), seventeen 4096 pixel wide tiles would be required $$\left(\frac{668 \text{ km} * \frac{1000 \text{ m}}{10 \text{ m}}}{4096}\right).$$

In the y-dimension, the distance from the equator to the pole is near 10000 km, so the number of 4096×4096 tiles to span that distance is approximately 10 for a 250 m pixel tile, and 244 for a 10 m tile. The southern hemisphere can be handled with a similar number of tiles using a negative index referenced from the equator, or referenced by their northing coordinate from the south pole using the southern "S" designator for the zone.

There are several potential choices for the origin of the tiling. The first uses the native UTM 0,0 as the origin, which is at the intersection of the false easting of the zone (500 km) and the equator. One drawback of this choice is that the tiles are not symmetric within a zone. Another choice is to use the intersection of the central meridian of the zone with the equator, which is located at UTM $x_0 y_0$=500000,0.

The border size represents overlap with adjacent tiles, which allows the reduction of "edge" effects for processing which requires neighboring pixels. One choice is to use some fraction of the tile size to reduce duplicate storage. For a 4096×4096 tile, an example choice is some power of 2 between 32 and 256.

There are also various choices for the optimal pixel resolution "r." One approach is to accommodate as many sensors as possible using powers of two of a fundamental resolution. Examples of such tilings are as follows:

r=5 m accommodates RapidEye and PlanetScope (native 5 m), and SENTINEL-2 (native 10 m/20 m).

r=15 m accommodates pan-sharpened Landsat 7/8 (15 m), Landsat 5/7/8 (native 30 m), and MODIS (240 m).

For high-resolution sensors (e.g., NAIP aerial photography at 1 m resolution), r=1 m can be used as the fundamental tiling, with small interpolation adjustments as needed to accommodate the existing sensors (e.g., with RapidEye and PlanetScope adjusted to 4 m (level 2), SENTINEL-2 to 8 m (level 3), pan-sharpened Landsat at 16 m (level 4), Landsat at 32 m (level 5), and MODIS at 256 m (level 8)).

C. Example Conversion to Pixel/Tile Index

The following example shows an assignment of a specific WGS84 latitude/longitude from the MODIS sensor to a pixel and tile. Longitude −106.3017 and Latitude 35.8785 is UTM Zone 13N Easting 382497.99 Northing 3971254.80. For a pixel resolution of 1 meter, this would fall in the pixel whose upper left corner is at 382497, 3971255 which is identical to the zone pixel $g_i, g_j$ address. For a pixel resolution of 240 meters, the sample would be in the pixel with upper left location 382320, 3971280 and $g_i, g_j$ address 1593, 16547. The global pixel indices can be calculated via $$g_i = r * \left\lfloor \frac{\text{Easting}}{r} \right\rfloor \text{ and } g_j = r * \left\lfloor \frac{\text{Northing}}{r} + 1 \right\rfloor.$$

The corresponding tile indices for r=1, $x_0$=0, $y_0$=0, $x_n$=4096, $y_n$=4096 are $t_i$=93, $t_j$=970. Using a central meridian origin ($x_0$=500000), $t_i$=−29, $t_j$=970. For the MODIS 240m pixel and $x_n$=4096, $y_n$=4096, $t_i$=0, $t_j$=5. The tile indices can be calculated from the pixel indices via $$t_i = \left\lfloor \frac{g_i}{x_n} \right\rfloor \text{ and } t_j = \left\lfloor \frac{g_j}{y_n} + 1 \right\rfloor.$$

Tile indices are mapped to a string which is part of the file name (along with date of acquisition and sensor) stored in a long-term storage 1212 (e.g., Google Cloud Storage or Amazon S3). An example for MODIS would be "2006-06-09-1800_12N_12_MO_09qkm.jp2," which was collected on Jun. 9, 2006 at 18:00 UTC in Zone 12N with $t_j$=12 by the Terra sensor. There is no $t_i$ because a tile covers the entire E-W span of the zone. An example for Landsat 7 would be "2015-01-18-L7-034033_13N_007_069_321.jp2" which was collected on Jan. 18, 2015 from zone 13N with $t_j$=7 and $t_j$=69.

D. Ingestion Process

FIG. 12 depicts an example environment for processing and analyzing data in accordance with techniques described herein. Platform 1202 includes an ingestor module 1208 (comprising one or more Google Compute Engine instances and a Celery master). Ingestor module 1208 connects (e.g., via one or more networks depicted in FIG. 12 as a single network cloud 1214) to various sources of observational data. Two examples shown in FIG. 12 are NASA FTP site 1204 and a proprietary repository 1206 (e.g., storing aerial photography). Ingestor module 1208 retrieves data (e.g., using the FTP protocol) from the repositories and writes them to storage 1212 (e.g., creating a local mirror of the retrieved data).

The following is an example of how ingestor 1208 obtains data, and in this particular example, the ingestion of MODIS data. As explained throughout the Specification, other sources of data (in other formats) can also be processed using embodiments of the techniques described herein.

In various embodiments, ingestor module 1208 executes a shell script that manages ingestion. The shell script executes (e.g., as a cronjob running every four hours) and launches an LFTP process to obtain a directory listing of FTP site 1204. Ingestor module 1208 identifies files that are new since the last time the script ran, by parsing the directory listing into a list of potential files to retrieve, and then checking against a Redis database 1216 to see whether the files were previously retrieved. Previously retrieved files are ignored and threads are started to download any new items. In an example operation, 50 to 100 new files are identified in NASA's MODIS collection each time the ingestor script executes (depending, e.g., on when NASA's MODIS processing occurs). Each raw MODIS Hierarchical Data Format (HDF) file obtained from FTP site 1204 is approximately 140 MB. Multiple files can be downloaded in parallel (e.g., using threads), and locks can be used to prevent multiple threads from trying to download the same file simultaneously. In the event the download fails (e.g., due to a network connectivity problem, or if the file length is not correct when it is finished), the script can restart the download as needed. Newly seen files are copied to storage 1212 and entries are made in Redis database 1216 (e.g., using python) indicating the new files as having been downloaded successfully.

The raw data (e.g., MODIS data obtained from NASA) is stored in "granules." In various embodiments, every pixel in a granule is stored. In other embodiments, a cloud mask (included by NASA with the granule) is used to shrink the number of pixels stored. The following is an example file name for a granule stored in storage 1212, and mirrors NASA's nomenclature:

gs://modis/allData/6/MODO2QKM/2015/200/
MODO2QKM.A2015200.0040.006.2015200134321.hdf The components of the path name are:
gs://: Google Storage designator
modis: storage bucket
allData: (inherited from NASA storage path)
6: collection number (equivalent to a NASA version number)
MOD02QKM: data type (MODIS 02 quarter kilometer (250 m) bands)
2015: year
200: Julian day of year
MOD02QKM.A2015200.0040.006.2015200134321.hdf: a file name assigned by NASA using NASA's naming scheme In an example embodiment, platform 1202 handles twelve types of data granules, each produced every five minutes over daylight portions of the globe. There are approximately 1,728 new files per day, 630,000 files per year, and 10 million files total.

An example of pseudocode for ingesting data (e.g., from site 1204 by ingestor module 1208) is shown in FIG. 13. An example of pseudocode of preprocessing data (e.g., by preprocessor 1210 of the data ingested by ingestor module 1208) is shown in FIG. 14.

E. Pre-Processing

Pre-processor module 1210 (also comprising one or more Google Compute Engine instances and a Celery master) takes all of the newly retrieved files (e.g., the 50 to 100 MODIS files obtained by ingestor 1208 every four hours) and pre-processes them. In various embodiments, pre-processing executes as a cron job (e.g., every four hours), and executes as a first portion of the process the ingestion processing described above. Pre-processing can also be triggered by an event, such as the appearance in a particular directory of new data.

A given granule can be split into smaller tiles (e.g., approximately twenty tiles) by pre-processor module 1210. The smaller tiles are easier to perform various operations on by platform 1202. Pre-processor module 1210 can also process large repositories of historical data (e.g., the last n years of data stored with NASA FTP site 1204) by performing a parallel run using an appropriate number of nodes (e.g., 200 multi-processor nodes). The Celery system distributes the workload over the (e.g., 200) nodes, with each node executing the same script as is executed for the newly-seen files (but in parallel).

The following is an example file name for a .xz file stored in storage 1212:
gs://modis-xz/utm_v7q_09/15N/03/2015-06-20-1935-MY_15N_03.bin.xz The components of the path name are:
gs://: Google Storage designator
modis-xz: storage bucket
utm_v7q_09: type and version
15N: zone
03: tile y index
2015-06-20-1935-MY_15N_03.bin.xz: file name An .xz file comprises an array of N samples. The samples are x and y coordinates as 16-bit unsigned integers quantized to 30 UTM pixel indices, followed by b bands of pixel location (DN) values. The array of N samples is compressed using the Lempel-Ziv-Markov chain compression technique. As previously mentioned, a given granule may have associated with it a cloud mask provided by the original data source (e.g., a NASA provided cloud mask). In such a scenario, the cloud mask can be used to reduce the number of points included in the .xz file, with the file structure remaining the same.

The .xz tiling process can be bypassed, as applicable, and JPEG2000 compressed image tiles can be created directly from the raw MODIS data using an appropriate interpolation method. The following is an example file name for a .jp2 file stored in storage 1212:
gs://descartes-modis/2015-07-29-1620_16N_09_MO_09qkm.jp2

The components of the path name are:
gs://: Google Storage designator
descartes-modis: storage bucket
2015-07-29-1620_16N_09_MO_09qkm.jp2: file name, date, time, zone, row, sensor, data type, and file type.

In various embodiments, additional (optional) preprocessing is performed (e.g., prior to the .xy tile being written). One example of such additional processing is scaling DN values to top of atmosphere reflectance. The physical meaning of the numbers associated with each pixel location (DN) varies by sensor. Various operations (e.g., performing cloud removal, described in more detail below) make use of values which represent reflectance as observed at the top of the atmosphere. Some sensors, such as SENTINEL-2, deliver data in this format, and do not require scaling. Sensors such as MODIS and Landsat, however, deliver data in radiance units, which require various scaling to obtain reflectance. The metadata associated with the image data contains some of the appropriate constants, while others (such as the distance from the sun to the earth) can be tabulated from other sources as needed. The conversion formula to reflectance in the range of 0.0 to 1.0 is:

$$gain = \frac{(LMAX - LMIN)}{(QCALMAX - QCALMIN)}$$

$$bias = LMIN - gain * QCALMIN$$

$$toar_f = \frac{\pi * earth\_sun\_dist\_in\_au^2}{sol\_irrad * cos(solar\_zenith\_angle)}$$

$$scaledDN = DN * toar_f * gain + toar_f * bias.$$

To store the reflectance in a 16-bit integer, it is scaled by an additional factor of 10000. As another example of optional preprocessing, pixels for which no data is present (e.g., due to scanline errors) can have their values set to zero, which can be used in later applications, as described in more detail below.

III. Creating Images with Reduced Atmospheric Obstructions

FIG. 15A illustrates an example of a portion of the Earth as viewed from above (e.g., by a satellite). Suppose FIG. 15A illustrates a portion of Iowa. Lines such as 1502, 1504, and 1506 are gravel roads—generally spaced one mile apart. Other elements visible (e.g., to a satellite) are fields, such as field 1508, tree 1510, river 1512, and house 1514. Region 1516 of FIG. 15A is obscured by clouds. In some cases, an obstruction (such as a cloud) may completely obscure the ground underneath it. In such a scenario, the optical depth can be represented as a "0," indicating that an obstruction can't be seen through. Correspondingly, a cloudless (i.e., completely visible) portion of ground can be considered as having an optical depth of "1." For some datasets (e.g., Landsat), a cloud mask accompanies the granule (e.g., as obtained from site 1204), indicating for a given pixel (in a binary manner) whether the pixel represents a cloud or not.

As shown in FIG. 15B, clouds can take a variety of forms, and different types of clouds (or other atmospheric obstructions, such as smoke, snow, haze, and smog) can conceal the ground beneath them in different ways and to different degrees. In FIG. 15B, a tree (1552) and corn plants (1554) are shown. Example clouds are also shown, such as a cumulus cloud 1556 (which will be opaque in the center part, but have fuzzy edges), low foggy stratus clouds (1558), and very high cirrus clouds 1550 (where the sun shines through the cloud but the illumination is affected by the cloud).

As mentioned above, sometimes the cloud may completely obstruct what is underneath it, and sometimes the view may be completely unobstructed. Sometimes, the optical depth value is inconclusive/insufficient to articulate whether a pixel is a cloud or not. For example, around the edges of pixels that have optical depths of 0 or 1, there will typically be pixels with optical depths somewhere in between 0 and 1 (e.g., 0.276). In some embodiments, a "cloud" pixel is defined as a pixel with an optical depth of less than 0.4 (or another appropriate value), and used as a mask. Cloud masks can also be more than 1 bit (e.g., 2 or 3 bits, indicating cloud, not cloud, or maybe cloud) per pixel.

One value that can be used in image processing/analysis is the normalized difference vegetation index (NDVI), which is a ratio $$\frac{NIR - VIS}{NIR + VIS},$$

where VIS and NIR stand for the spectral reflectance measurements acquired in the visible (red) and near-infrared regions. If a cloud affects each of these bands equally (e.g., it reduces each one by 10%), the ratio is unchanged. As an example, dust in the atmosphere scatters blue light more preferentially than green and red light. A cloud that affects red more than infrared will change the vegetation index. But, if that change occurs evenly across the whole scene, a correction can potentially be applied. For example, if a probe 1520 is present for which the NDVI is known, and a different NDVI value is measured, if a sufficient number of probes are present in the scene, it could be possible to correct the whole scene for whatever obscuration is happening that is impacting the red and the infrared differently. Accordingly, a refinement to the definition of a "cloud" is something that affects NDVI in an uncorrectable way.

One approach to mitigating cloud cover (and other atmospheric obstructions) in imagery is to use the temporal dimension (e.g., to examine a set of images across time). One option is to opt for the largest number of samples in each pixel, without regard for resolution. A second option is to opt for the best resolution, with fewer samples per pixel.

Satellites (and other image sources) have a temporal period. For example, a given satellite might be above a given portion of land every 16 days. There may also be multiple satellites (e.g., two satellites), taking images on alternate days, where on one of the days the satellite will be directly above a region, and alternate days the satellite will be off to one side or another. Accordingly, for a given pixel, there could exist 20 observations, collectively, by various satellites over a 16 day period. Of those 20 observations of a given pixel, many may be masked out because of clouds (or other atmospheric obstructions). However, of those 20 observations of a given pixel, one pixel is the "best" pixel (e.g., the least obstructed). And, a composite image of an area can be created using data associated with each of the "best" pixels from a sequence of images covering the area, using techniques described in more detail below. The "best" pixel can be considered the one in a set (e.g., a time series) for which given spectral information associated with that pixel was last obscured by atmospheric obstruction.

A variety of approaches can be used to select the "best" pixel. One example is to use the NDVI value associated with the pixel (a one-sided error distribution). FIG. 16 illustrates a set of twenty NDVI values observed for a given pixel in a sixteen day period (starting on the 200$^{th}$ day of the year). While an NDVI value can range from −1 to 1, in this example, values below 0 have been excluded. In the sixteen day period, four "cloud free" observations are present (the points above the threshold NDVI line, set in this example at 0.6). Of those four observations, the observation on day 203 (1604) of the particular pixel being examined has the highest NDVI value (1604) and is thus the "best" pixel in the sixteen day sequence. For a given pixel in a given sequence of images, in some cases, no data may be present. One reason for the missing data is that a cloud mask (e.g., provided by NASA and described above) was applied. Another reason for missing data is that aberrations (due to satellite position) yield unusable image information. Suppose days 205 and 209 are missing data for the pixel being examined in FIG. 16. In various embodiments, the NDVI values of pixels with missing data are set to zero (e.g., as shown at 1606 and 1608). As mentioned above, in addition to clouds, a variety of other atmospheric obstructions can be "removed" in the composite image. For example, a composite image of a region affected by a wildfire can be created by selecting, collectively, the least smoky pixels from a bin of images. And, a set of images collected during a dust storm (e.g., on Earth, or elsewhere) can be used to create a composite image with the least amount of dust present in each pixel, etc. Other examples of "obstructions" that can be reduced in accordance with techniques described herein include digital defoliation (e.g., selecting for the pixel least obscured by plant cover using an appropriate index) and using a water index to select for a maximum (minimum) value to see a composite image of the ground at its wettest (or driest) as applicable.

The use of the NDVI value for cloud detection relies on the fact that clouds are spectrally "flat." In other words, the reflectance for each band is similar. This is equivalent to clouds being white, or a shade of gray. The formula for NDVI $$\frac{NIR - VIS}{NIR + VIS}$$

means clouds have an NDVI value near zero, since the terms in the numerator cancel. Selecting maximum value pixels is particularly effective with vegetation pixels, which have NDVI values which are much higher, since near-infrared (NIR) reflectance is much larger than red (VIS) reflectance. The same approach works for other differential indexes such as the normalized difference water index (NDWI), normalized difference snow index (NDSI), shortwave infrared $$\left(\frac{SWIR - VIS}{SWIR + VIS}\right),$$

or various permutations of differential vegetation index (e.g., using visible green instead of visible red). Other cloud rejection algorithms can work using other features of clouds. For example, since clouds are white or gray and are usually brighter than land cover they can be rejected over a background which is not white or gray by using an HSV (hue/saturation/value) decomposition of the RGB (red/green/blue) values and selecting pixels which are the lowest value or the lowest saturation.

Figure 17:
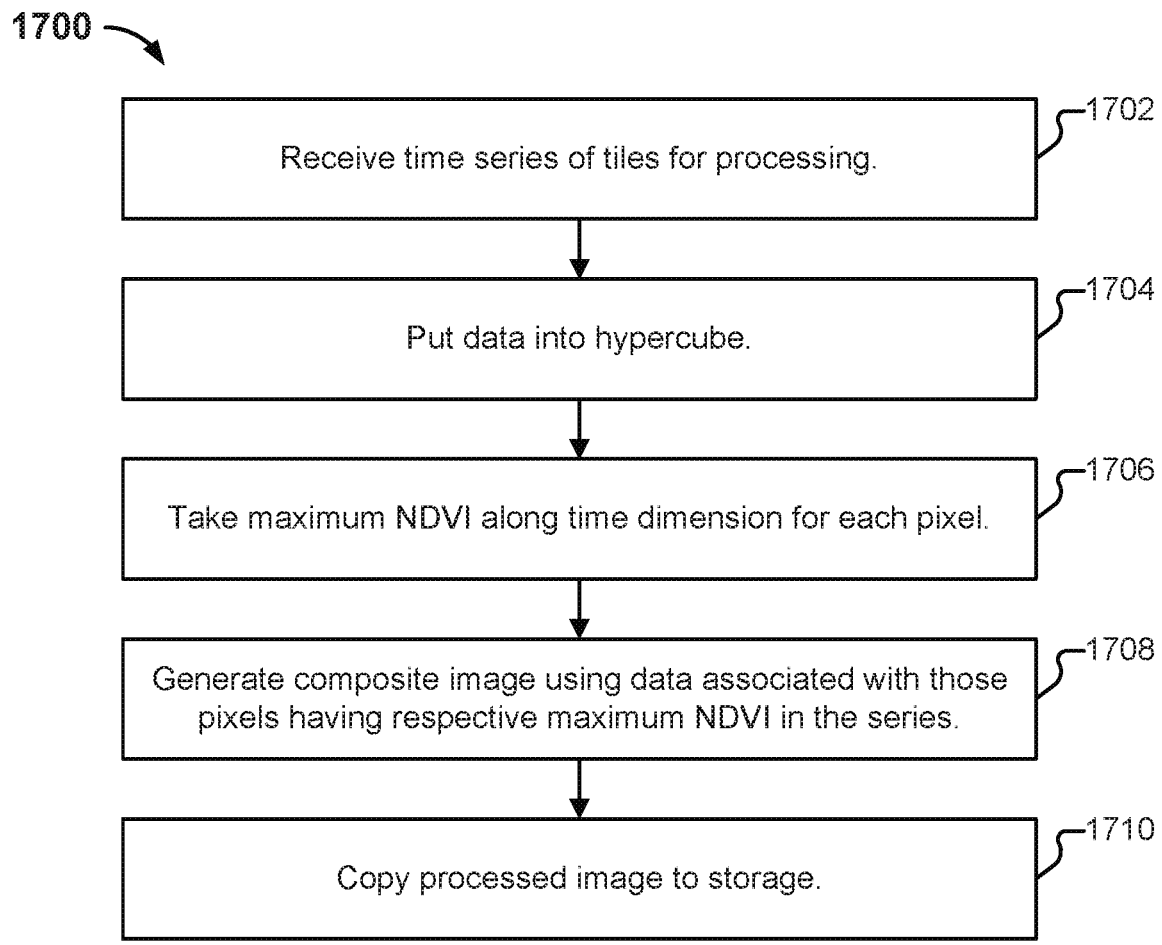
FIG. 17 illustrates an example of a process for creating a composite image.

FIG. 17 illustrates an example of a process for creating a composite image. In various embodiments, process 1700 is performed by image creator module 1218.

The process begins at 1702, when a first tile is received for processing, and the previous fifteen (or other appropriate number of) tiles in a time series are also received. As one example, at 1702 image creator module 1218 (comprising one or more Google Compute Engine instances and a Celery master) determines that a recently preprocessed tile (e.g., an output of pre-processor module 1210) is available and retrieves that tile for additional processing. The images corresponding to the previous fifteen days' worth of that particular tile are also retrieved. As another example, predetermined time sequences of tiles (e.g., days 0-15, 16-31, etc.) are selected for processing (e.g., as the days elapse). Other size bins of data (i.e., other than 16 days) can also be used. Further, different size bins can be used for different regions (e.g., larger bins for cloudier areas) and/or different times of year (e.g., smaller bins in fall and larger bins in spring, where there are fewer clouds in a region in the fall than in the spring). Further, the images included in a bin need not be adjacent temporally. For example, a ten year stack of tiles from the same day of the year (e.g., Jan. 1, 1990; Jan. 1, 1991; Jan. 1, 1992; etc.) can be used as a bin, as can an arbitrary number of tiles selected at arbitrary intervals (e.g., depending on the application).

At 1704, a data hypercube is created by stacking each of the multi-band image tiles in the bin. In one example, the data hypercube created at 1704 is 4-dimensional, with the dimensions being pixel dimension (e.g., Red, Green, Blue, Near-Infrared, NDVI, Collection date), x-dimension, y-dimension, and time dimension. In various other embodiments, additional and/or different bands comprise the multiband information included in the data hypercube. As process 1700 progresses, the time dimension is compressed to a single layer, and the data is reduced to a cube of values, or a 2-dimensional plane for each image component as applicable.

At 1706, the maximum NDVI is taken along the time dimension (e.g., by a python script). As a simplified example of the processing performed at 1706, suppose the data being operated on at 1706 includes a 3×3 image plane for the NDVI component on a particular day, and that only a total of two days' worth of tiles are used in the time series. Example data for a first day is as follows:

0 143 199
10 155 202
12 147 198

Example data for the second day for the NDVI plane is as follows:

20 122 204
10 157 199
11 141 206

After taking the maximum NDVI over the two days, the image plane would be:

20 143 204
10 157 202
12 147 206.

At 1708, a composite image is generated. As mentioned above, the maximum NDVI is used to determine, for a given pixel position (e.g., 1×1, 3×3), which image's pixel in that position was the most cloud free in the time series. At 1708, the spectral information (e.g., any/all of RGB, NDVI, Infrared, etc.) associated with the "best" pixel (e.g., the one having the maximum NDVI for that pixel position in the set) is used to generate the composite image.

In various embodiments, additional metadata is included in the composite image. For example, the particular day of the year that was selected as the "best" for each pixel can be stored (e.g., day 203). As another example, the total number of valid observations that were considered can be stored. An example of a "valid" observation is any of the non-zero observations seen in FIG. 16 (i.e., not 1606 or 1608). In various embodiments, other processing (e.g., downstream of process 1700) can make use of the number of valid observations. For example, if out of 20 observations, only two are deemed valid, this could indicate a particularly stormy set of weeks (and that the maximum value recorded for that pixel during those two weeks is not likely to be representative of a cloud free image). A later process can have a requirement that (e.g.) a minimum of three valid observations be seen in order for that pixel in that particular composite image to be considered representative.

Finally at 1710 the processed image is stored (e.g., to storage 1212). The following is an example file name for a composite image file:

gs://modis-max/utm_v7r_max/2015/
max_2015_df200_15N_03_v7r.tif

The components of the path name are:
gs://: Google Storage designator
modis-max: storage bucket for
utm_v7r_max: type and version
2015: year
max_2015_df200_15N_03_v7r.tif: file name, with day=200, 15N=zone, and row=3

In some embodiments, there is one composite image per tile per day, with approximately 1200 MODIS tiles covering the globe. The resulting composite image can store a variety of features in a single or multiple bands as applicable. For example, the resulting composite image can store a single scalar feature in a single band, or can store one or more vector features in multiple bands.

A variety of analyses/manipulations can be performed using data such as the image data stored in storage 1212, whether in conjunction with process 1700 (e.g., as one or more additional steps), or as a separate process (e.g., after the storing performed at 1710, or entirely independent of the execution of process 1700). Further, data from one (e.g., MODIS), or multiple (e.g., MODIS and Landsat) sources can be operated on, whether individually or in combination.

A variety of example applications using a variety of such techniques are described below. As one example, an image (or set of images, as applicable) can be used to generate a boundary map (an example of which is a field map). The boundary map can be used in a variety of ways. As one example, the map can be used to reduce the noisiness of an image. As a second example, the map can be used in image restoration to reduce artifacts. A boundary map can be also used as a mask to classify regions of an image (e.g., to produce an image of average values within the boundary or otherwise homogenize the pixel values for at least one band of information within the boundary, such as by taking a median value, a minimum value, etc.).

IV. Creating a Boundary Map

Some imagery applications work on an image as a whole. As one example, an image search application may take as input a photograph of a giraffe, and provide as output other photographs of giraffes selected from a corpus of photographs. As another example, in some applications (e.g., involving remote-sensing imagery) it is desirable to operate on the smallest area of an image possible (e.g., at the pixel level, which typically corresponds to the smallest area resolvable by the imaging sensor). For yet other applications however (e.g., various applications involving land use classification), it can be more desirable to operate over regions larger than a pixel (but smaller than the image as a whole).

Returning to the example of FIG. 15A, suppose field 1508 is a corn field, as is field 1518. Field 1522 is a soybean field. Each of fields 1508, 1518, and 1522 is an example of a "Common Land Unit (CLU)," described by the Farm Service Agency (FSA) as an individual contiguous farming parcel that has a permanent, contiguous boundary, a common land cover and land management, and a common owner and/or common producer association. The boundaries of a CLU are generally delineated from relatively permanent features such as fence lines, roads, and/or waterways. More generally, as used herein, a field is an example of a region bounded by edges that are temporally persistent.

In various applications, the ability to treat a given pixel as being part of a particular region would be desirable. For example, agricultural land use will generally be uniform over a given field, which will typically occupy multiple pixels in a particular image. Processing each pixel independently can thus be (1) unnecessarily computationally expensive, to the extent that the results of the processing produce different outcomes for a field's pixels, and (2) will also necessarily be needlessly inaccurate. By incorporating the knowledge that groups of pixels should be considered collectively, more accurate results can be produced, with greater efficiency. Accordingly, being able to treat all pixels (e.g., pixel 1524) within a given region of a satellite image (e.g., within field 1522) uniformly can be beneficial (e.g., when classifying field 1522 as containing soybeans vs. corn vs. water). When examining the image depicted in FIG. 15A for land use classification purposes, all of field 1508 should be designated "corn field," as should all of field 1518. All of field 1522 should be designated soybeans.

The USDA makes CLU data available (e.g., as CLU maps). Unfortunately, access to CLU data is restricted to entities certified by the FSA as working in cooperation with the Secretary of Agriculture. A company (or individual), such as an environmental research company or a land use planner (unaffiliated with the Secretary of Agriculture) will accordingly be unlikely to benefit from CLU data.

Even where an entity has access to CLU data, such data has various limitations. As one example, CLU data can become stale. An entity wanting a current boundary map for a particular region (e.g., where land usage has changed and/or where existing CLU data is inaccurate) may have to wait a year or longer for an updated set of government-provided CLU data. As another example, non-agricultural land uses (e.g., rivers, lakes, residential development, industrial development, mines, etc.) are outside the narrow definition of a CLU, as are farming plots outside of the United States and/or potentially American farming plots not associated with the FSA/USA. The ability to uniformly treat all pixels bounded by house 1514 (e.g., including pixel 1526), or all pixels bounded by river 1512 (e.g., including pixels 1528 and 1530) can be beneficial, despite those regions not representing CLUs.

Using techniques described herein, boundary maps can be created, e.g., from imagery stored in storage 1212. In addition to delineating CLUs (also referred to interchangeably herein as "fields"), boundaries of other types of contiguous land use (e.g., forests, grasslands, mines, parking lots, etc.) can also be determined. Further, the approaches described herein can be applied to other forms of imagery (e.g., other than land observations). Accordingly, as used herein, "fields," "regions," and "segments" will generally be used interchangeably, with a CLU being an example of a field/region/segment.

While various examples described herein will refer to agricultural fields (e.g., a corn field adjacent to another corn field or a soybean field), "fields" (and the approaches described herein) are not limited to an agriculture context.

A first step in extracting fields (e.g., as a dataset) is to find their boundaries. As mentioned above, field boundaries manifest themselves in satellite imagery as edges that are temporally persistent. That temporal persistence, together with the ability to analyze a stack of satellite images, allows field boundaries to be distinguished from edges arising from ephemeral phenomena (e.g., clouds).

The source imagery for boundary map creation can include satellite imagery from any of several different sources, each of which have been preprocessed and divided into uniform tiles, and stored in Google Cloud Storage (GCS) buckets (e.g., as described above). Images can come from government sources (e.g., Landsat, NAIP) and/or 3rd-party sources (e.g., Planet Labs, RapidEye), as applicable. It is to be noted that while cloud removal has been described as a technology that can be applied to imagery data (e.g., stored in storage 1212), cloud-free images are not necessary as input to the applications described below.

One approach to mitigating the effects of cloud and other image clutter is to average pixel values over many images, taken over a long time interval. However, averaging also tends to diminish differences between fields. Adjacent fields with different land uses can look very similar after averaging, diminishing the strength of the edge between them. An alternate approach is to determine edges for each image of a temporal stack, and then average the results over time. While field boundaries may be obscured in some images, over a long enough period of time, they will appear in a greater fraction of the images than ephemeral edges.

The pixel values of a satellite image can be regarded as samples of an underlying function $f(x, y)$, defined at every point on the ground contained within the image. In terms of this function, the values of $f(x, y)$ will change much more at a field boundary than within a field. This can be measured by computing $|\nabla f(x, y)|$. Edges can be characterized as those points $(x, y)$ for which $|\nabla f(x, y)|$ is large, whereas within a field, the gradient will be zero (in an ideal case).

For images, the points $(x, y)$ are only defined at discrete points $\{x_1, x_2, \ldots, x_M\}$ and $\{y_1, y_2, \ldots, y_N\}$. Finite differences can be used to approximate $$\Delta f(x, y) = \left(\frac{\partial f}{\partial x}(x, y), \frac{\partial f}{\partial y}(x, y)\right):$$

$$\frac{\partial f}{\partial x}(x_i, y_j) \approx f(x_{i+1}, y_j) - f(x_i, y_j) = D_x f(x_i, y_j), \quad (1)$$

$$\frac{\partial f}{\partial y}(x_i, y_j) \approx f(x_i, y_{j+1}) - f(x_i, y_j) = D_y f(x_i, y_j). \quad (2)$$

(For i=M or j=N, Neumann boundary conditions can be used. That is, $D_x f(x_M, y_j)=0=D_y f(x_i, y_N)$ is assigned.)

The discrete gradient magnitude:

$$|Df(x_i,y_j)| = \sqrt{|D_x f(x_i,y_j)|^2 + |D_y f(x_i,y_j)|^2} \quad (3)$$

is defined for images with multiple spectral bands, so that each $f(x_i, y_j)$ is a vector $(f_1(x_i, y_j), \ldots, f_L(x_i, y_j))$, and $D_x f$ and $D_y f$ will be vector-valued as well. Then $|D_x f(x_i, y_j)|$ is the length of this vector:

$$|D_x f(x_i, y_j)|^2 = \sum_{k=1}^{L} (D_x f_k(x_i, y_j))^2, \quad (4)$$

and similarly for $|D_y f(x_i, y_j)|$.

The finite difference operators $D_x$, $D_y$ are implemented using sparse matrices, so that the "differentiation" process includes reshaping an image $f$ into a vector, multiplying by the appropriate matrix, then reshaping back into an image. The construction of the sparse matrices is as follows. First, one-dimensional finite differencing (with Neumann boundary conditions) of a vector with K components is obtained with the following matrix:

$$B_K = \begin{pmatrix} -1 & 1 & 0 & 0 & \ldots & 0 \\ 0 & -1 & 1 & 0 & \ldots & 0 \\ \vdots & & \ddots & \ddots & & \ldots \\ 0 & \ldots & 0 & -1 & 1 & 0 \\ 0 & \ldots & 0 & 0 & -1 & 1 \\ 0 & \ldots & 0 & 0 & 0 & 0 \end{pmatrix}. \quad (5)$$

Accounting for the location of indices to correspond to differentiation with respect to x or y is accomplished using Kronecker products. If $I_L$ denotes the L×L identity matrix, then for use with M×N×L images, $$D_x = (I_M \otimes B_N) \otimes I_L, \quad (6)$$

$$D_y = (B_M \otimes I_N) \otimes I_L. \quad (7)$$

This produces matrices that are (MNL)×(MNL) in size. They are constructed so that if f is an M×N×L image, unwinding the pixel values of $f$ into a vector, multiplying this vector by the matrix, and then reshaping the product back into an image will give the desired finite-difference derivative.

A. Example Process

Figure 18:
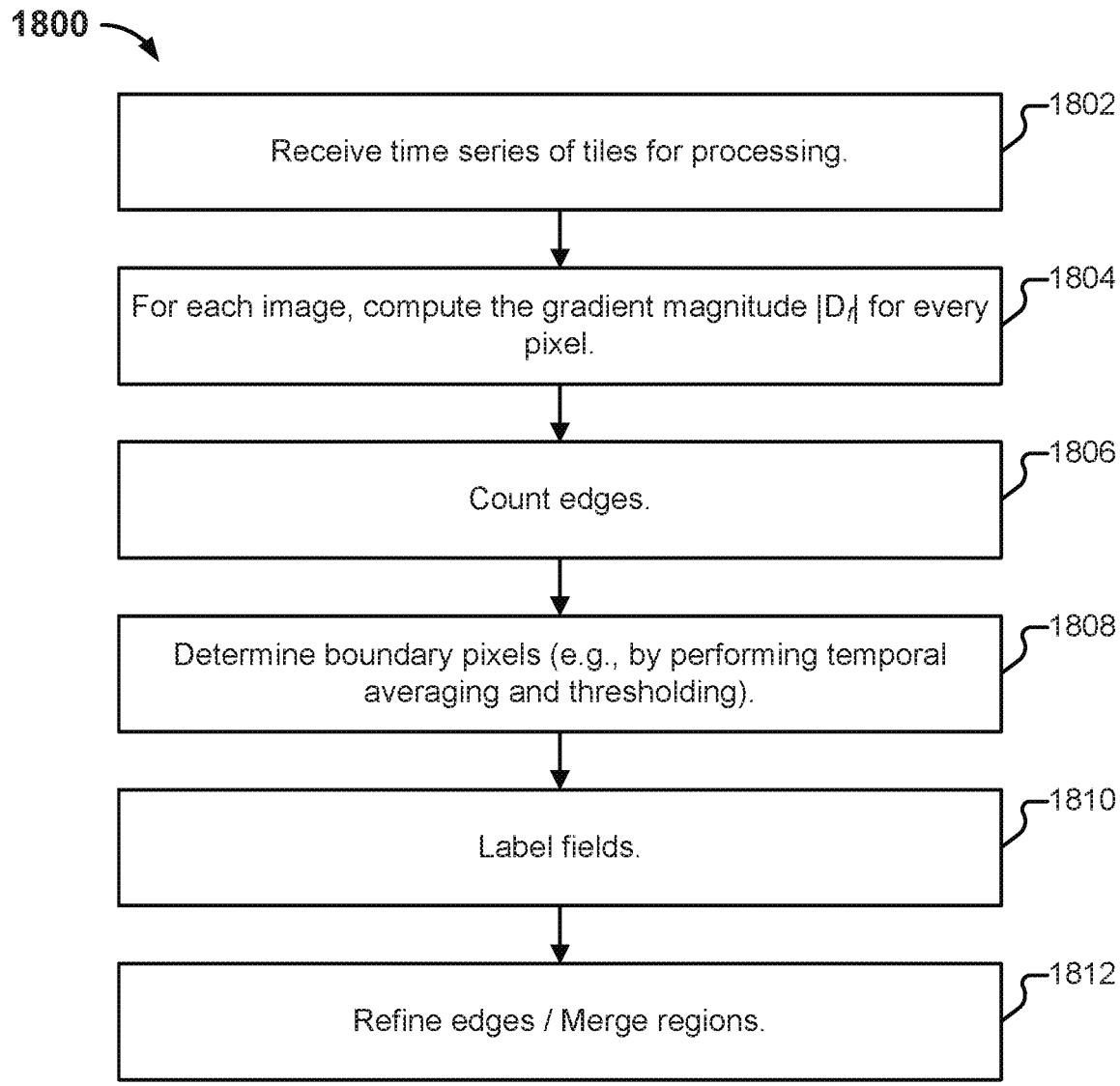
FIG. 18 illustrates an example of a process for creating a boundary map.

FIG. 18 illustrates an example of a process for creating a boundary map. In various embodiments, process 1800 is performed by boundary map creator module 1220. The map is created by extracting fields from satellite images of a particular location, for which there may be many different observations over a period of many years. As will be described in more detail below, process 1800 can be terminated prior to the completion of the boundary map, as intermediate products (e.g., the output of portion 1808 of the process) are also useful for various applications.

One example way to implement boundary map creator module 1220 is (as with other components of platform 1202) to use a combination of python scripts and libraries (e.g., NumPy, sciPy, scikit-image). In particular, computation can be performed using a set of one or more Google Compute Engine virtual machine instances. Parallelization over tiles and dates (the latter for gradient computation, which is done independently with each image) can be performed using either a Celery master or with Bash shell scripts, depending on the geographic scope of the computation.

The process begins at 1802, when a set of images corresponding to a particular tile is received. As one example, at 1802 boundary map creator module 1220 receives an instruction (e.g., in response to the execution of a periodic script, or in response to a user request submitted via a web frontend) to generate a boundary map for a particular portion of land (e.g., by receiving a set of bounding coordinates, an identification of a particular tile identifier, etc.). A set of tiles corresponding to the location is retrieved for processing. As one example, suppose a request is received to generate a boundary map for the portion of land depicted in FIG. 19A.

Figure 19A:
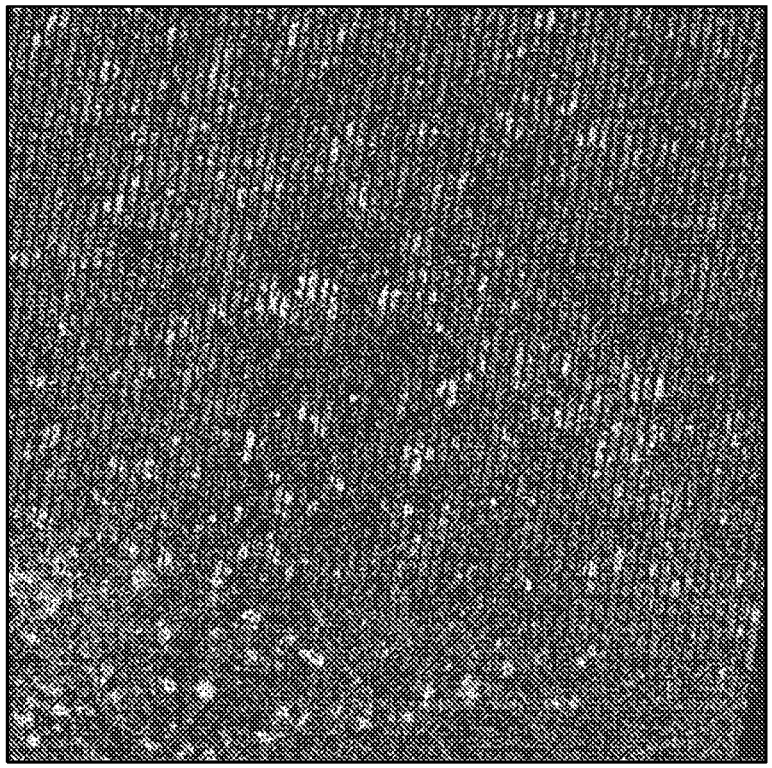
FIG. 19A depicts a portion of a Landsat 7 image.

FIG. 19A is an example of a 2048×2048 sized portion of a Landsat 7 image and includes clouds, cloud shadows, incomplete tile coverage, and the scanline corrector artifact. At 1802, tile 1900 is retrieved, along with a time series of other tiles depicting that portion of land. In one example, fifteen years of imagery, with approximately forty observations a year, is retrieved at 1802 (approximately 600 images retrieved).

The scope of the set of tiles retrieved at 1802 can be adjusted as applicable (e.g., taking into account tradeoffs). The longer the time series (e.g., fifteen years vs. two years), the less likely it will be for clutter (e.g., scanline artifacts, incomplete tile coverage, clouds, etc.) to erroneously impact boundary lines. However, a longer time series can also result in reduced currency. For example, suppose a field was bisected three years ago (or its usage changed (e.g., from rural to urban)). When fifteen years of images are examined, the changes made three years ago may not be identified as sufficiently persistent. Similarly, boundary maps for portions of land that are generally less cloudy (e.g., portions of Arizona desert) may achieve results of similar quality to those of cloudier environments (e.g., portions of Colorado) with a smaller time series (e.g., three years of observations instead of fifteen). As yet another example, process 1800 can be performed using multiple kinds of observations (e.g., processed Landsat tiles and drone photographs that have been preprocessed to align with the portion of land being operated on). For example, a farmer or other entity may desire a highly accurate boundary map to be generated for a 50-mile radius of a particular grain elevator using a set of recent observations (e.g., obtained once a day over the last week via low flying aircraft).

Figure 19B:
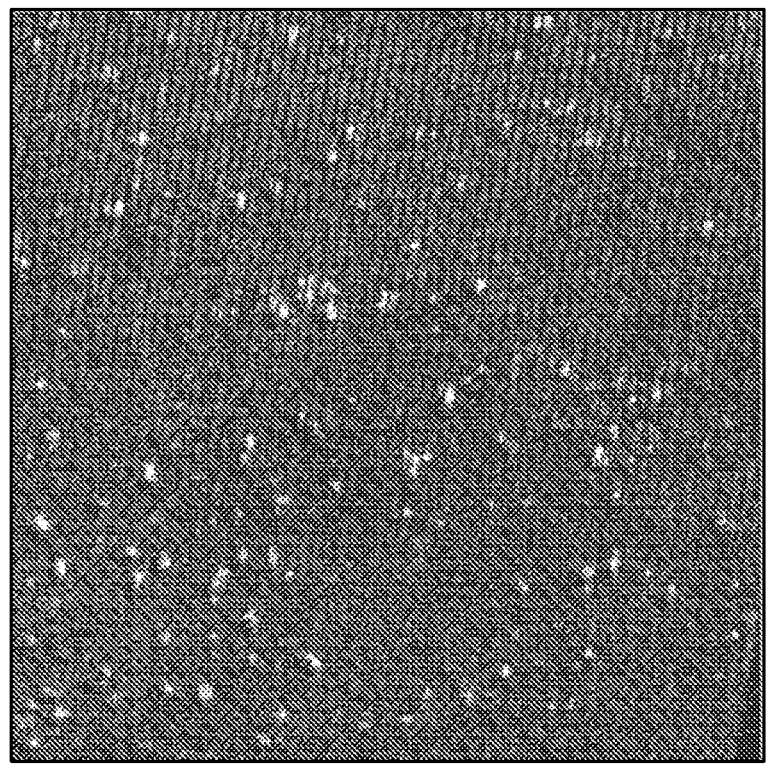
FIG. 19B depicts a gradient magnitude image.

At 1804, a gradient magnitude image is created for each image in the set of images retrieved at 1802. The gradient magnitude $|Df|$ is computed for every pixel in a given image in the set of retrieved images of the location (e.g., using python code with a differentiation library and a sparse matrix library). A threshold value of $|Df|$ that empirically provides a reasonable separation between edge pixels and within-field pixel fluctuations is selected. One example of such a threshold value is 50. It is also possible to leave $|Df|$ unthresholded, or to use a threshold value of 0, and rely on temporal persistence to separate edge pixels from within-field pixel fluctuations. In the case of multi-band imagery, each band can be independently processed in accordance with process 1800, and the results can be variously combined. As one example, suppose a set of imagery includes six bands of spectral information. Six gradients can be respectively determined at 1804 (e.g., in parallel) for each of the six bands, and a six component vector generated. The gradient magnitude image created for each received image at 1804 can be stored in storage 1212 (e.g., as a GeoTIFF image, preserving georeferencing information). FIG. 19B depicts a gradient magnitude image corresponding to the image depicted in FIG. 19A. The content of the image 1950 is the magnitude of the gradient at every pixel in image 1900 and summing over bands (resulting in a single band image).

Figure 20:
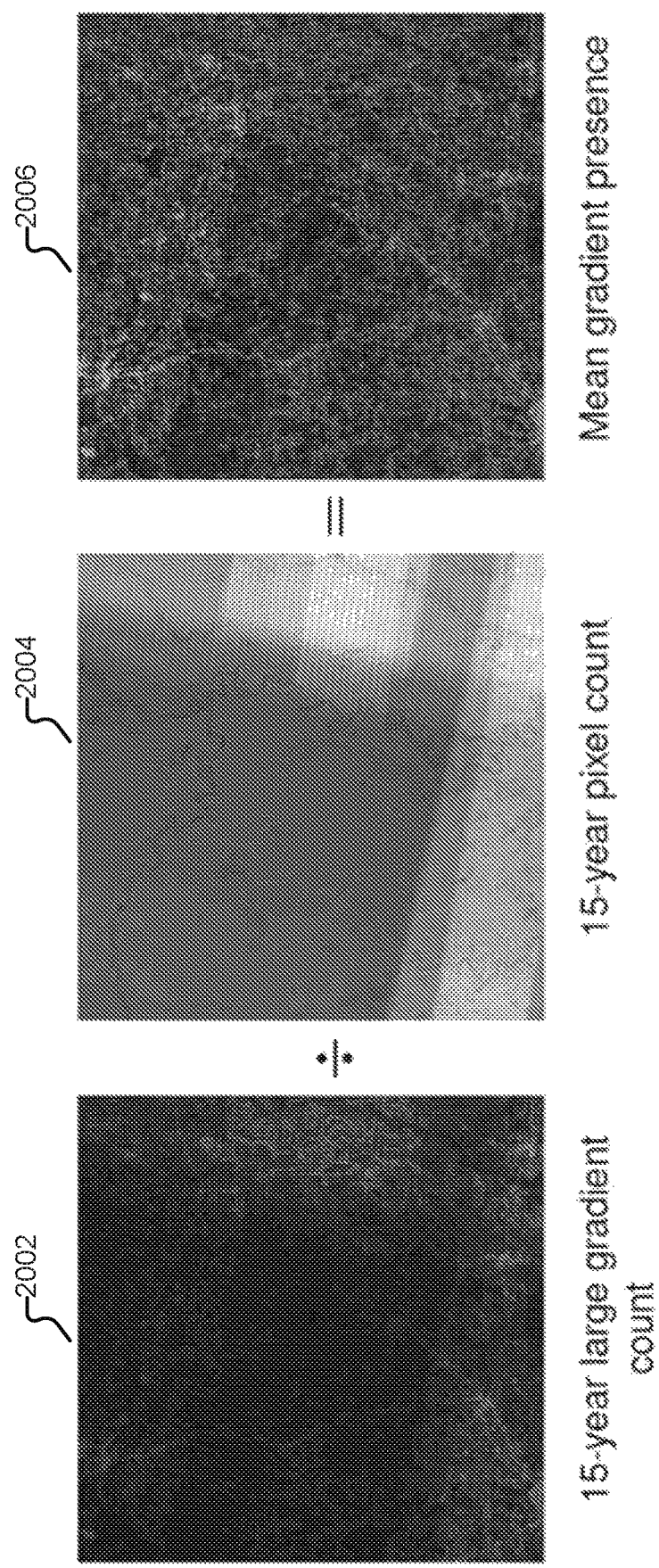
FIG. 20 depicts a gradient count image, a presence count image, and a gradient presence image.

At 1806, each of the gradient magnitude images (generated at 1804) is examined to tally the number of times a given pixel exceeds the gradient threshold. The edge count (across all the images in the set of retrieved images of the location) is saved as a gradient count image (e.g., as a GeoTiff image) in storage 1212. An example of a gradient count image is shown at 2002 in FIG. 20. As shown at 2002, for each pixel, the brightness indicates how many times in the time series (e.g., set of 600 images) the pixel met the edge criteria (i.e., had a gradient magnitude that exceeded the threshold). As shown variously at 2002, structural outlines are present. Approximately 75% of the image (starting from the upper left corner of the image) is darker than the rest. The darkening is due to the Landsat pattern.

As mentioned above, in some cases, observational data for some pixels within a given observation may be missing. As one example, region 1002 of the image depicted in FIG. 10A is a region where no data was available in a Landsat 1 MSS observation. If the observation depicted in FIG. 10A was the only observation used to make a boundary map, it might be the case that the edges of region 1002 might erroneously be classified as edges. Where a time series of many tiles is used in process 1800, an occasional instance of missing observational data for a given pixel is unlikely to impact the final boundary map, as most of the other observations will contain usable data. It is possible, however, that many observations of the same region in a time series may be missing observational data. The varying intersection of an image with Landsat scenes means that some pixels are outside the intersection more often than others. Another issue is the scanline corrector artifact of Landsat 7, which affects some pixels more than others.

One approach to mitigating the erroneous classification as edges of the boundaries of observed pixels with pixels missing data is to tally the number of times each pixel is not within the NODATA region for each image. The presence count (across all the images in the set of retrieved images of the location) is also saved as an image. An example of a presence count image is shown at 2004 in FIG. 20. One way to determine which pixels are within the NODATA region is (e.g., during preprocessing of the image described above) to reserve a pixel data value of 0 for NODATA. A pixel for which data is present but the measured value is very low can be rounded up (if needed) to preserve the meaning of 0 as NODATA. As needed, the NODATA 0 value can be converted to a not a number (NaN) value for use in additional processing. As shown at 2004, for each pixel, the brightness indicates how many times in the time series (e.g., set of 600 images) the pixel was not in a NODATA region (i.e., data was captured by the imaging sensor for the pixel). As with 2002, as shown variously at 2004, structural outlines are present. And, approximately 75% of the image (starting from the upper left corner of the image) is darker than the rest. The darkening is due to the Landsat capture pattern. Further, scanline related errors are visible along the right side of the image as stripes, with some pixels having fewer observations than others due to obscuring by Landsat 7 artifacts.

The pixelwise quotient of the edge count and presence count (from the respective edge count image and presence count image) gives the frequency with which each pixel, when present, is considered to be an edge pixel (2006). This gives a measure of each pixel's edge persistence. Any arithmetic involving a NaN value will result in a NaN value (e.g., when the difference is taken), so the finite difference involving pixels in the NODATA region will also be a NaN.

Figure 22:
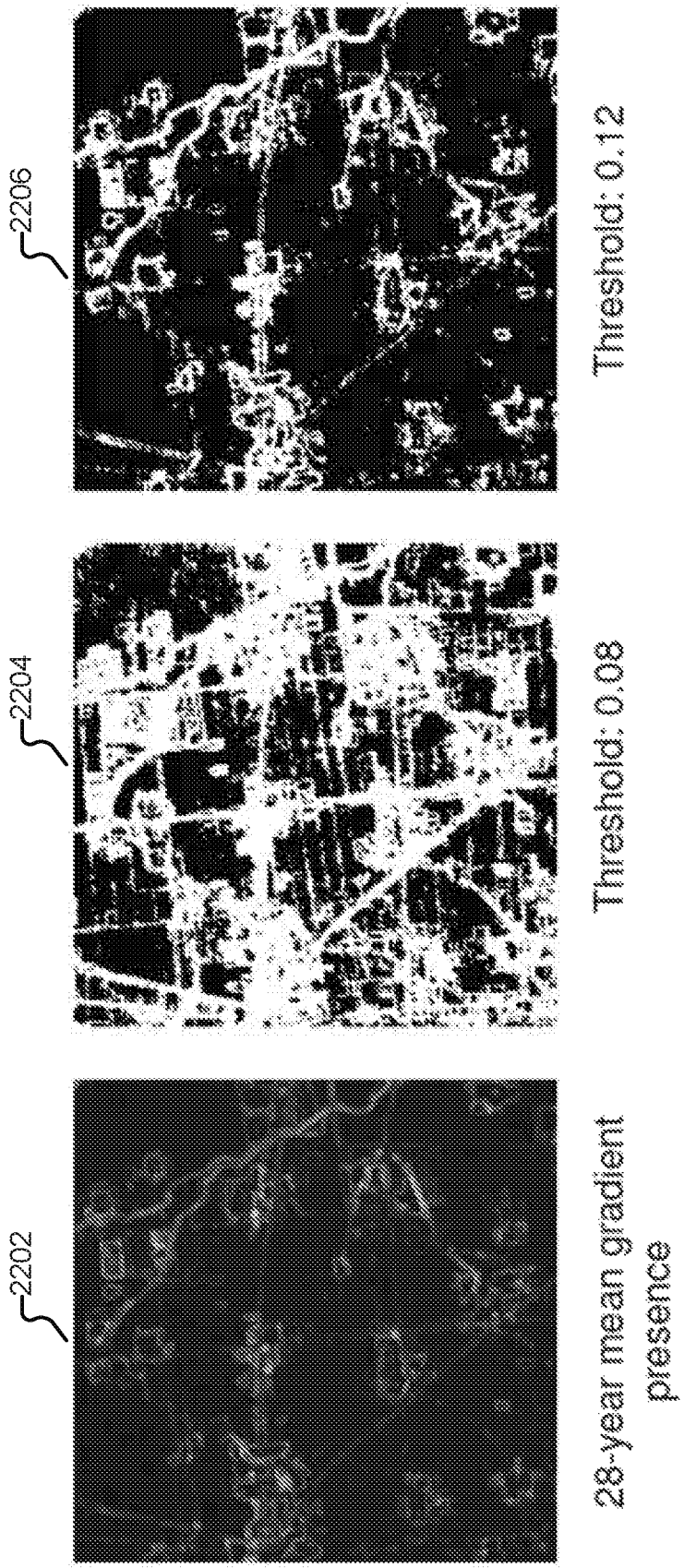
FIG. 22 depicts gradient presence images.

Suppose that the pixelwise quotient of the edge count and presence count for a given pixel is 0.20. This means that 20% of the time the pixel was observed, it was determined to be an edge pixel. A threshold for this quantity is chosen, and used at 1808 to make a final selection of those pixels that are considered to be part of field boundaries. The result is saved (e.g., in storage 1212) as a binary GeoTIFF image, indicating which pixels are boundaries. Examples of two different thresholds (0.20 and 0.15) being applied to the same gradient presence image are shown in FIG. 21 (as image 2102 and image 2104). The tradeoff in selecting a threshold value is the inclusion of spurious edges (lower threshold) vs. edge incompleteness (higher threshold). FIG. 22 illustrates a 28-year mean gradient presence image of a portion of land in China at 2202. Greater cloudiness and smaller field sizes make boundary detection more challenging. Examples of two different thresholds (0.08 and 0.12) being applied to image 2202 are shown as image 2204 and image 2206.

The binary image generated as output at 1808 (an example of which is shown at 2006 in FIG. 20) can be used for a variety of purposes. One example is as a mask (e.g., indicating which portions of a region are edges/boundaries and, e.g., when the mask is inverted, which are not). Accordingly, in various embodiments, process 1800 ends at 1808, with the generation of a binary image such as image 2006.

Figure 23:
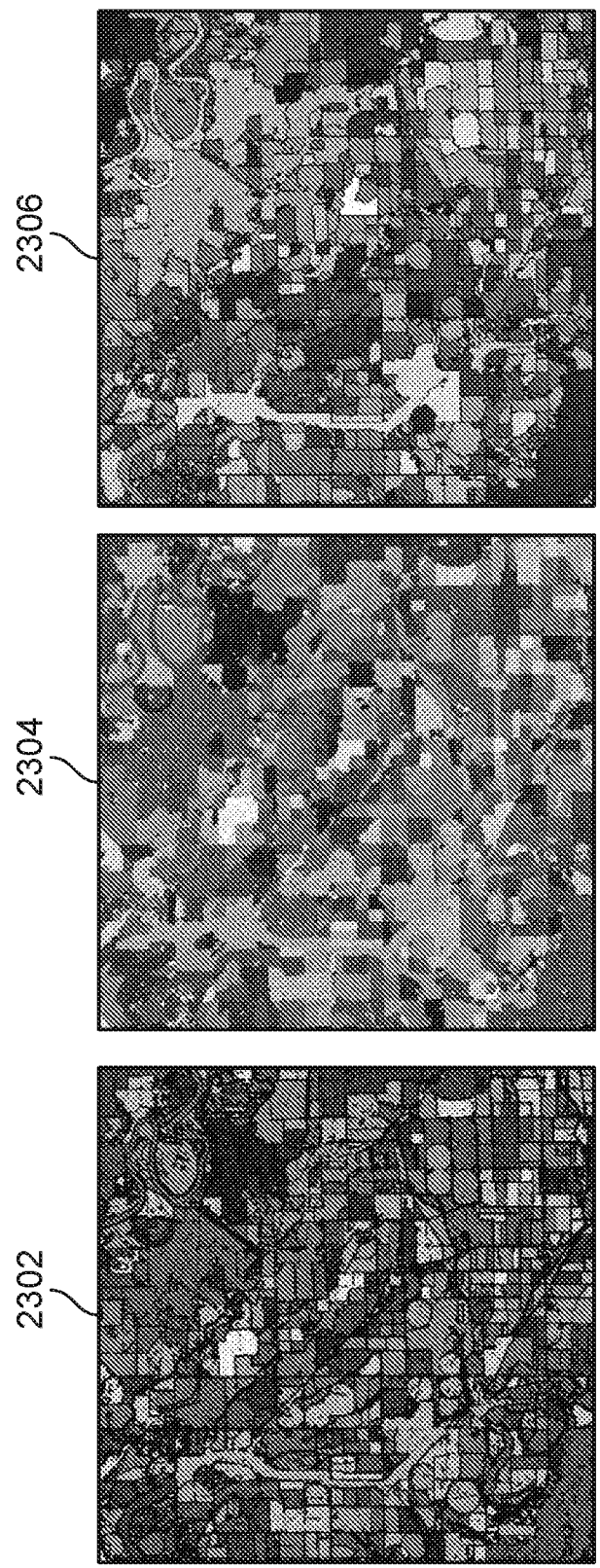
FIG. 23 depicts boundary maps.

The output of portion 1808 of process 1800 can be enhanced/refined, for example to generate a boundary/field map in which individual fields are identified and given labels. One approach is as follows. Take the set of identified non-boundary pixels (e.g., from the output of portion 1808), and separate them into connected components. One way to do this is using a Python package such as scikit-image, which provides image processing functionality (including for finding connected components) and uses NumPy arrays as image objects. Other packages providing morphological processing can also be used, as applicable (e.g., scipy.ndimage). At 1810, each such connected component is given a positive integer label as an identifier (e.g., using a "label" function made available by an appropriate Python package for labeling connected components). The set of pixels having a common label now constitute a field, and the boundary pixels are not (yet) assigned a field. The assignments are saved as an integer-valued image. FIG. 23, at 2302, depicts a set of fields (connected components) to which a random color map has been applied (i.e., with each pixel within an arbitrary field being colored the same as the other pixels in that field). Edges can be refined by alternately interpolating (2304) and redifferentiating (2306), described in more detail below.

Imperfections in the edge identification process can lead to issues such as excessively thick edges, and stray edge pixels wholly interior to fields. The boundaries can be optionally refined/improved (at 1812) using a variety of techniques. For example, skeletonizing can be used to thin edges to one-pixel thick, without changing connectivity. Interpolation can be used to assign field labels to each edge pixel, according to which field each edge pixel is closest to. Recomputing edge pixels, by once again computing gradients and assigning nonzero pixels to edges, allows refinement processing to be repeated. For example, portions 1804-1808 of process 1800 can be performed using the output of 1810. Different thresholds can be used, e.g., with the gradient threshold being set at $\geq 1$. Such processing can be terminated variously depending on application. As one example, a final boundary map can be created after skeletonization, resulting in a boundary map with fields having a one-pixel-thick edge. As another example, a final boundary map can be created after interpolation, resulting in a boundary map with every pixel assigned to a field. As mentioned above, each field is assigned (e.g., via labeling) a positive integer value that can be used as a field ID or other label. One example of a format for a final boundary map is to save it as a raster image (e.g., in storage 1212) which has a field ID for each pixel. The field ID (minus 1) can be used as an index for conversion between rasters and field-value arrays. In various embodiments, additional types of output are saved in conjunction with process 1800, such as a variety of shapefiles that describe different field polygons, and state rasters (e.g., comprising those fields within their boundaries). The shapefiles provide the vertices of polygons in geographical coordinates. In various embodiments, certain types of land use, such as urban areas and large bodies of water are not enclosed in any polygons and are left blank.

Process 1800 has been described thus far in terms of creating a boundary map for a single tile. A boundary map over a larger area can also be created (e.g., over a region such as a state) by merging smaller-scale maps. In various embodiments, the margining is performed at 1808, so that fields can be (re)labeled at the larger scale, and to avoid artificial boundaries at the edges of the smaller scale maps.

Portions of process 1800 are described above as being performed on all tiles in the set (e.g., 1802 where tiles are received, followed by 1804 where each image has a gradient magnitude determined for each pixel). As explained above, in some embodiments processing on all tiles is performed in parallel, e.g., with all tiles being retrieved at once, and then each of the retrieved tiles having per-pixel gradient magnitudes determined in parallel (e.g., using Celery architecture). In other embodiments, at least some portions of process 1800 are performed serially, e.g., with a single image being retrieved at 1802, and portions 1804-1806 performed with respect to that image, followed by a second image being retrieved at 1802 and portions 1804-1806 performed with respect to the second image, etc., until all images have been processed in accordance with portions 1802-1806) and processing continues (for the set) at 1808.

B. Example Application: Improving Classification

Certain portions of land, such as agricultural fields, are generally uniform in what they contain. For example, in a given farmer's field (e.g., a CLU), typically one type of crop (e.g., corn or soybeans) will be grown. And, typically, the contents within a given field are likely to change over time in the same way (e.g., grow at the same rate, produce the same yield, be affected by pests in the same manner, etc.).

A field will typically, when observed with remote imagery sensors, comprise several pixels. Some forms of image analysis operate at the pixel level (and, e.g., arrive at a per-pixel result). When each pixel of the field is analyzed (e.g., by a land use classification technique or set of techniques), it is possible that while most of the pixels within the field will be classified as corn, various stray pixels within the field may be classified as soybeans, whether due to errors in classification technique, limitations in the image(s) being analyzed, etc. As explained above, for some applications (e.g., land use classification and yield prediction), it may be desirable for results to be made uniform across an area (e.g., treating the field as the fundamental unit and/or arriving at a per-field result). As will be described in more detail below, boundary maps can be used (e.g., in conjunction with per-pixel analysis approaches) to achieve more uniform results.

Figure 24:
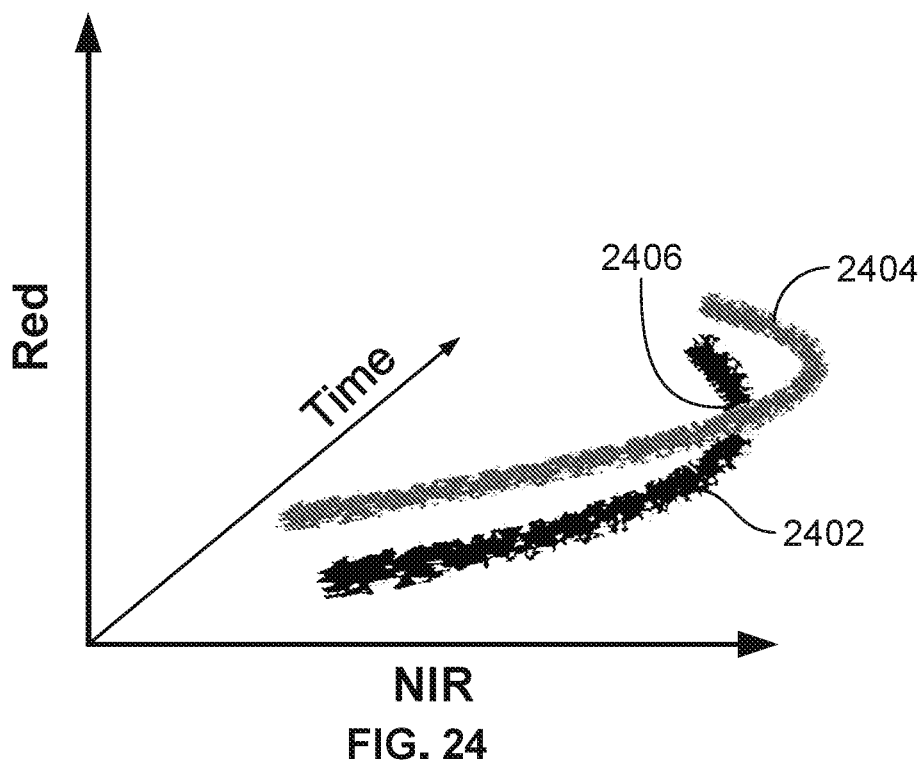
FIG. 24 illustrates a three-dimensional representation of how the spectral signatures of two different crops change over time during a typical growing season.

As shown in FIG. 12, platform 1202 includes a classifier 1222 (e.g., a land use classifier) that can classify portions of land. One way to implement classifier 1222 is as a python script (or set of scripts). In various embodiments, classifier 1222 takes as input an identification of a portion of land (e.g., a particular tile identifier, set of coordinates, etc.) and evaluates the land using a model 1224. Model 1224 is trained using a training set of imagery (and optionally additional data) for which land use classification has already been performed, and an appropriate machine learning technique, such as a random forest (e.g., using functionality provided by scikit-learn). FIG. 24 illustrates a three-dimensional representation of how the spectral signatures of two different crops (corn 2402 and soybeans 2404) change over time during a typical growing season. In particular, FIG. 24 tracks the brightness of a corn pixel and a soybean pixel, respectively, in the red and near infrared spectral bands, over time. Other bands can also be used instead of/in addition to the spectral bands represented in FIG. 24, and four-dimensional and other representations constructed similarly to what is depicted in FIG. 24.

Different types of land cover (e.g., corn, vs. soy, vs. forest, vs. pavement, etc.) will trace out different curves in a space such as is depicted in FIG. 24 (also referred to herein as "light curves"). The differences in such curves can be used in machine learning training (e.g., using a random forest and/or support vector machine) to differentiate between the different kinds of land usage and ultimately to classify images accordingly. Light curves can also be indicators of how healthy a crop is, and/or to predict yield. As one example, during the growing season, when a plant starts photosynthesizing actively, it becomes much more reflective in the near infrared than it is in the red, and so its NDVI values increase. As the plant matures, the NDVI value will increase even further, and then begin to plateau. Eventually, as the plant begins to brown, the NDVI will start to decrease, and, when the plant is harvested or otherwise removed from the land, the NDVI will drop significantly.

Figure 25A:
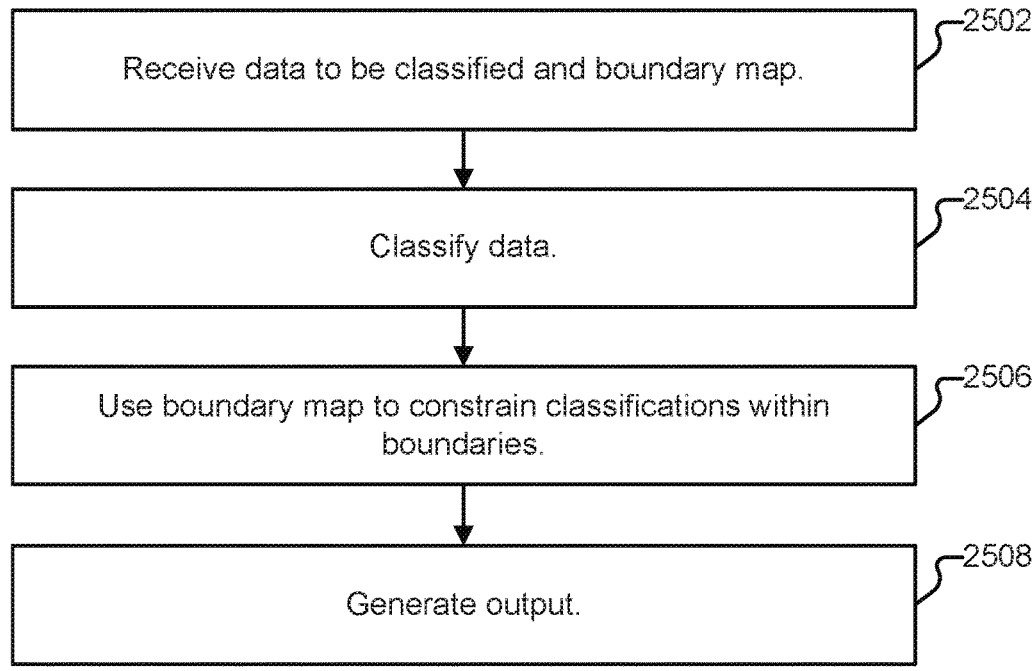
FIGS. 25A and 25B illustrate example processes for enhancing a classification using a boundary map.
Figure 25B:
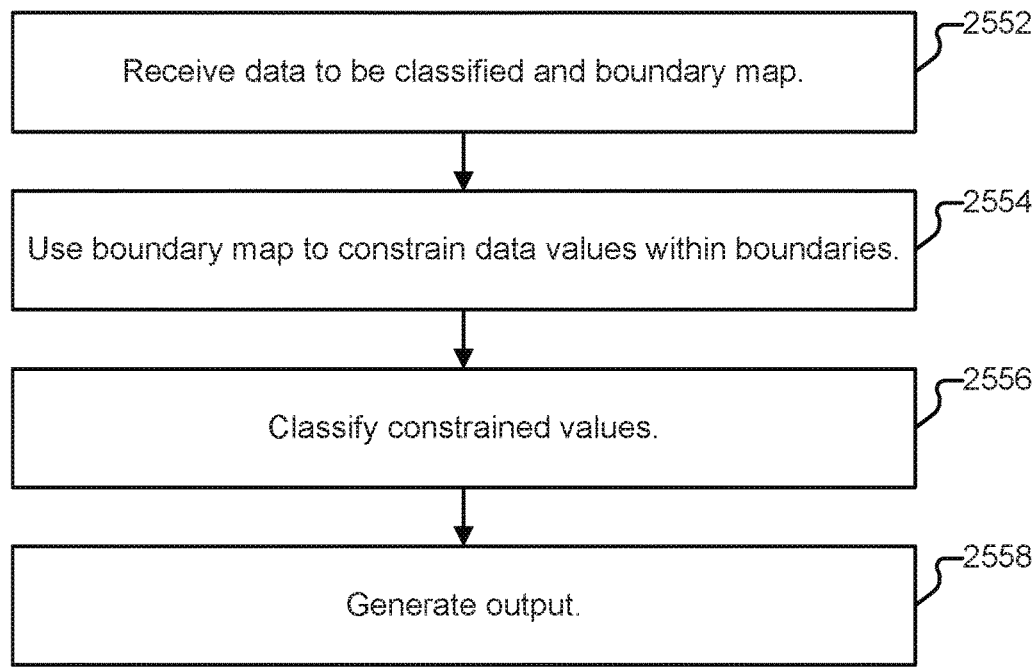

One approach to classifying land is to independently evaluate each pixel (e.g., using model 1224) and classify each pixel (e.g., as corn, water, road, etc.) accordingly. A boundary map, such as one produced in accordance with process 1800, can be used as an additional input to classifier 1222, to help improve the classification results. The boundary map can be applied after an initial classification is performed (FIG. 25A). The boundary map can also be applied prior to classification (FIG. 25B). Further, the boundary map can be used in conjunction with other types of analysis, such as yield estimation.

FIG. 25A illustrates an example of a process for enhancing a classification using a boundary map. In various embodiments, process 2500 is performed by classifier 1222. The process begins at 2502 when data to be classified, and a boundary map, are received. One example of the data received at 2502 is a time series depicting the region shown in FIG. 15A across a time window such as a month, or a year.

At 2504, the data received at 2502 is classified. As one example, for each pixel in a given position (e.g., pixel 1,1 across all received images) classifier 1222 evaluates the data associated with the pixel and assigns a classification. Examples of such data include a single spectral band (e.g., Near Infrared), a set of bands (e.g., all Landsat bands), and/or data from other sources associated with the pixel (e.g., a vector of statistical information such as rainfall statistics, ground temperature, etc. mapped to each pixel).

Figure 26:
FIG. 26 depicts various fields in Iowa.

FIG. 26 depicts various fields in Iowa, including corn fields (2604) and soybean fields (2602). Suppose classifier 1222 is examining a stack of images corresponding to the land shown in FIG. 26. It classifies the land covered by pixels 2606 and 2610 as soybeans, but classifies the land covered by pixel 2608 as corn. It is possible that the land covered by pixel 2608 is in fact corn. It is also possible that a problem with the data and/or a problem with the classifier erroneously resulted in pixel 2608 being classified as corn. Irrespective of the reason pixel 2608 is identified as corn, for many applications, it would be desirable for pixel 2608 to be identified as soybeans.

Returning to process 2500, a boundary map can be used to constrain classification results so that, given a statistic or set of statistics associated with a given pixel in a time series, the results will be uniform over a field. For certain types of data (e.g., used in a field classification), each pixel within a field (e.g., sharing the same field ID) can vote for the value that should be applied to the field as a whole. So, for example, if 95% of the pixels within a field are classified as soybeans, and 5% are corn (or other classifications) at 2504, all pixels within the field boundaries can be classified as soybeans at 2506.

Other kinds of analysis can also be performed in accordance with process 2500 and process 2500 can be adapted as applicable. As one example, statistics such as rate of growth may be computed, per pixel, for the time series at 2504. And, at 2506, the average value can be determined across all pixels within each field.

Classifier 1222 can generate a variety of different types of output at 2508 as applicable. For example, classifier 1222 can generate a classification map (e.g., in GeoTIFF format) which identifies, at each pixel in the image, a numeric value corresponding to the land use classification determined by the classifier. In various embodiments, classifier 1222 is trained using up to 256 classes (covered by an unsigned 8-bit integer) with, for example, "01" representing corn, "02" representing soybeans, "03" representing wheat, "04" representing evergreen trees, etc.

Classifier 1222 can also generate, for each/arbitrary classifications, a binary mask (e.g., corn mask indicating whether a given pixel is corn (value=1) or not (value=0); a soybean mask indicating whether a given pixel is soybeans (value=1) or not (value=0); etc.). As another example, instead of (or in addition to) conclusively assigning a particular label ("01") to a given pixel, classifier 1222 generates a probability (or confidence) that a particular pixel is a given classification. In this scenario, the land covered by an arbitrary pixel might be 78% likely to be corn (corn=0.78), 15% likely to be soybeans (soybeans=0.15), 4% likely to be wheat (wheat=0.04), etc. In this scenario, classifier 1222 can optionally select as a classification for the pixel the land use that has the highest score (subject to a threshold, such as 40% confidence). As yet another example of output that can be generated at 2508, classifier 1222 can store (e.g., in a table or other appropriate data structure) a classification for a given field ID, without (or in addition to) generating a classification map. (E.g., with an arbitrary field identified as fieldID=233982 having a classification of "02" and another field identified as fieldID=233983 having a classification of "01").

The output of classifier 1222 can also be consumed by other processes/components of platform 1202 for a variety of purposes. As one example, yield predictor 1226 (a script or set of scripts) can take as input classification data (from classifier 1222) and additional data such as rainfall/sunlight, and light curve information for a given region, to generate yield estimates for the region (e.g., using a model 1228 trained using historical information).

FIG. 25B illustrates an example of a process for enhancing a classification using a boundary map. In various embodiments, process 2550 is performed by classifier 1222. The process begins at 2552 when data to be classified, and a boundary map, are received. One example of the data received at 2552 is a time series depicting the region shown in FIG. 15A across a time window such as a month, or a year.

At 2554, a boundary map is used to constrain the values that will be input into classifier 1222. As one example, at 2554, for each image in the time series received at 2552, the average value across all pixels within a particular field is set as the value for each pixel within the field. Suppose, for a single image in a time series of images, pixel 2606 has a green channel value of 0.90, pixel 2608 has a green channel value of 0.60, and pixel 2610 has a green channel value of 0.80. At 2554, a green channel value of 0.77 will be set for all three pixels (2606, 2608, and 2610), prior to being provided to classifier 1222. Average values for other channels will similarly be applied to pixels 2606, 2608, and 2610. (It is to be noted that the average value will be taken across all pixels within a given field, not just pixels 2606, 2608, and 2610. Values for the remaining pixels have been omitted for simplicity.)

At 2556, classifier 1222 classifies the results of the processing performed at 2554. Specifically, classifier 1222 will operate on the average value for each pixel in a given field, across the time series. As with process 2500, other kinds of analysis can also be performed in accordance with process 2550 and process 2550 can be adapted as applicable. And, as with process 2500, classifier 1222 can generate a variety of different types of output at 2558 as applicable, including classification maps, tables of classifications, etc.

Figures 27A, 27B, 27C:
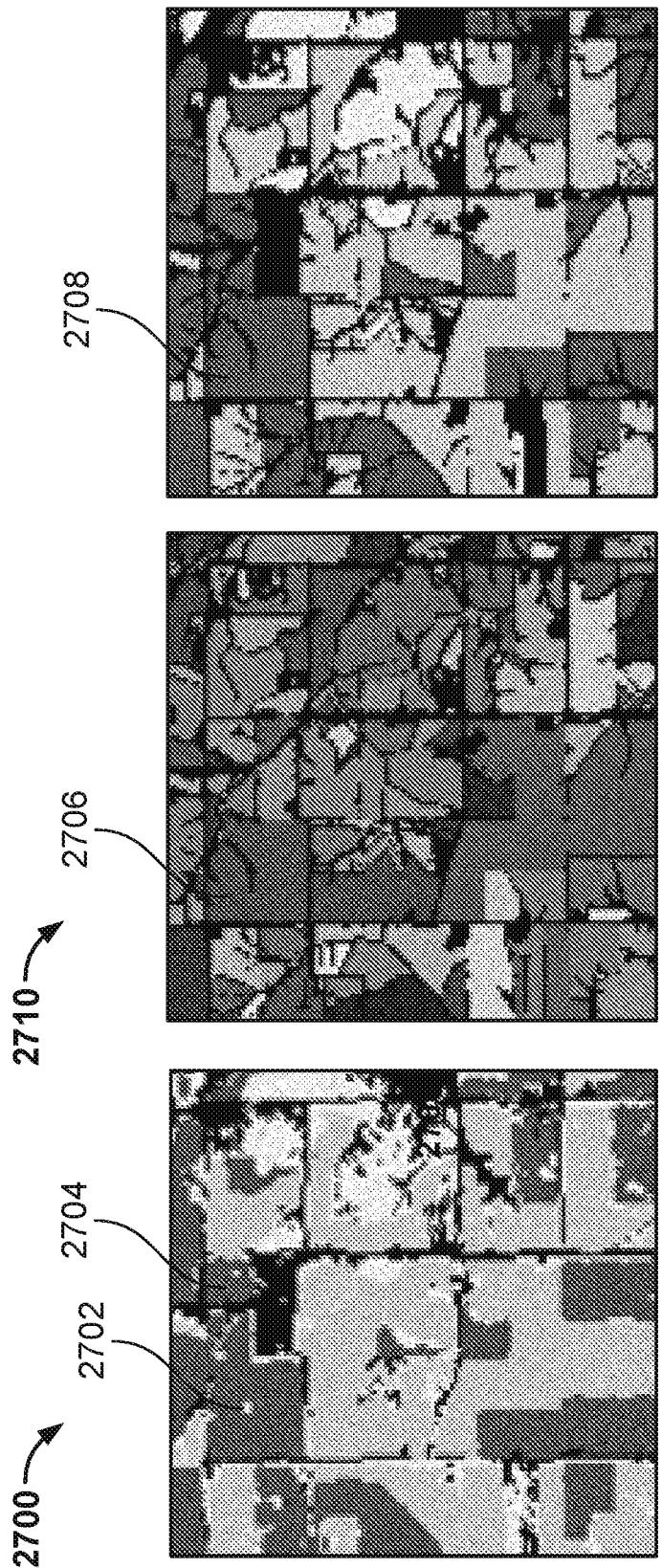
FIG. 27A illustrates an example of a portion of land classified without use of a boundary map.
FIG. 27B illustrates an example of a boundary map.
FIG. 27C illustrates an example result of providing the time series used to produce a classification map, and a boundary map, to a classifier.

FIG. 27A illustrates an example of a portion of land classified without use of a boundary map (e.g., using classifier 1222 on a time series of data without using a boundary map). As seen at 2702, a single pixel (or small set of pixels) has been classified as one type of crop in classification map 2700, but is surrounded by pixels classified as a second type of crop (in region 2704). FIG. 27B illustrates an example of a boundary map for the scene depicted in FIG. 27A. Boundary map 2710 is an example of a map that can be produced in accordance with process 1800. As shown in FIG. 27B, region 2706 is a single field. FIG. 27C illustrates an example result where the time series data used to produce the classification map 2700 and boundary map 2710 are both provided to classifier 1222. As shown in FIG. 27C, all pixels in region 2708 are classified as the same crop. FIG. 27C depicts a classification map, which is an example of output producible using either process 2500 or 2550 (at 2508 or 2558).

V. Iterative Relabeling Using Spectral Neighborhoods

Figure 28:
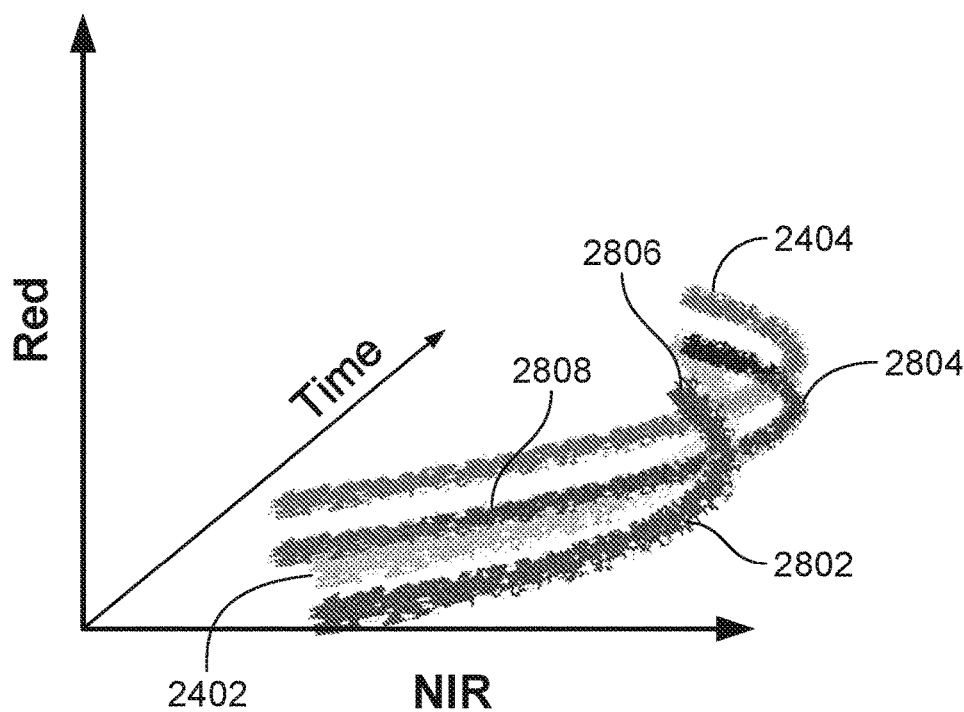
FIG. 28 illustrates a three-dimensional representation of how the spectral signatures of two different crops change over time during a typical growing season.

As mentioned above, suppose FIG. 24 depicts a typical progression of the growth of corn (2402) and soybeans (2404) over a growing season in a particular region. In some years, however, growth may progress differently. For example, in a particularly wet spring, crops may be planted later. Further, early season water stress may cause corn to look like soybeans to a classifier. In a particularly warm spring, crops may be planted earlier, and soybeans may look more like corn to a classifier. Accordingly, the curves shown in FIG. 24 (reproduced in FIG. 28 as 2402 and 2404 to aid in understanding) may be shifted in time (as curve 2802 and curve 2804, respectively), or have different shapes. A model trained using curves 2402 and 2404 may have difficulty classifying data obtained during a year that curves 2802 and 2804 are observed. Note, for example, at times 2806 and 2808, pixels from multiple curves overlap. In contrast, curves 2402 and 2404 (as shown in FIG. 24) are largely separate, with only portion 2406 overlapping. Accordingly, identifying a particular pixel at 2806 or 2808 as being a particular crop will be more challenging than in a year where crop growth occurs similarly to what is depicted in FIG. 24, particularly at a boundary between the two crops (e.g., crops along the boundary of fields 2602 and 2604).

Regardless of what happened during a given growing season, there will exist certain days that there is a clear spectral separation between the corn and soybean crops (e.g., the red and near infrared brightness will be significantly different for corn crops and for soybean crops in a given region).

Figure 29:
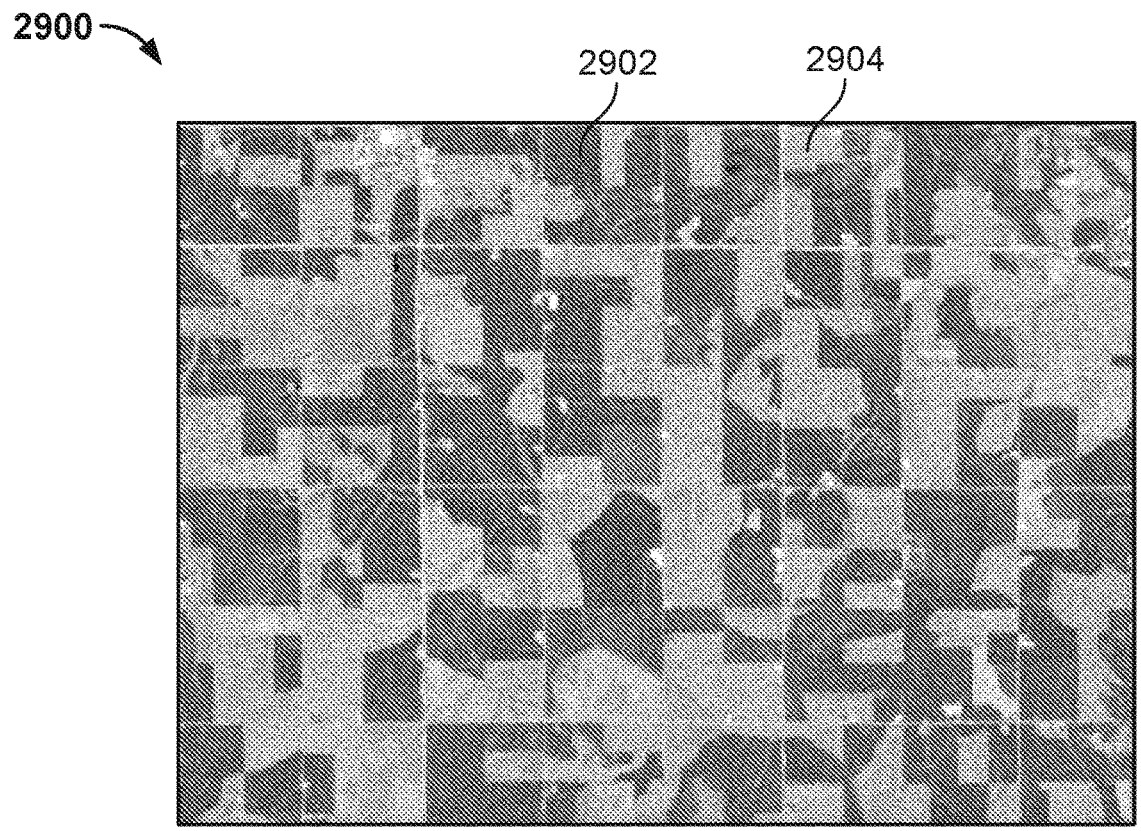
FIG. 29 illustrates an observation of a particular portion of Iowa.

FIG. 29 illustrates an observation of a particular portion of Iowa on a particular day in July (e.g., July 5) at a particular time (e.g., noon). Corn (2902) and soybeans (2904) are well separated in the image.

Figure 30:
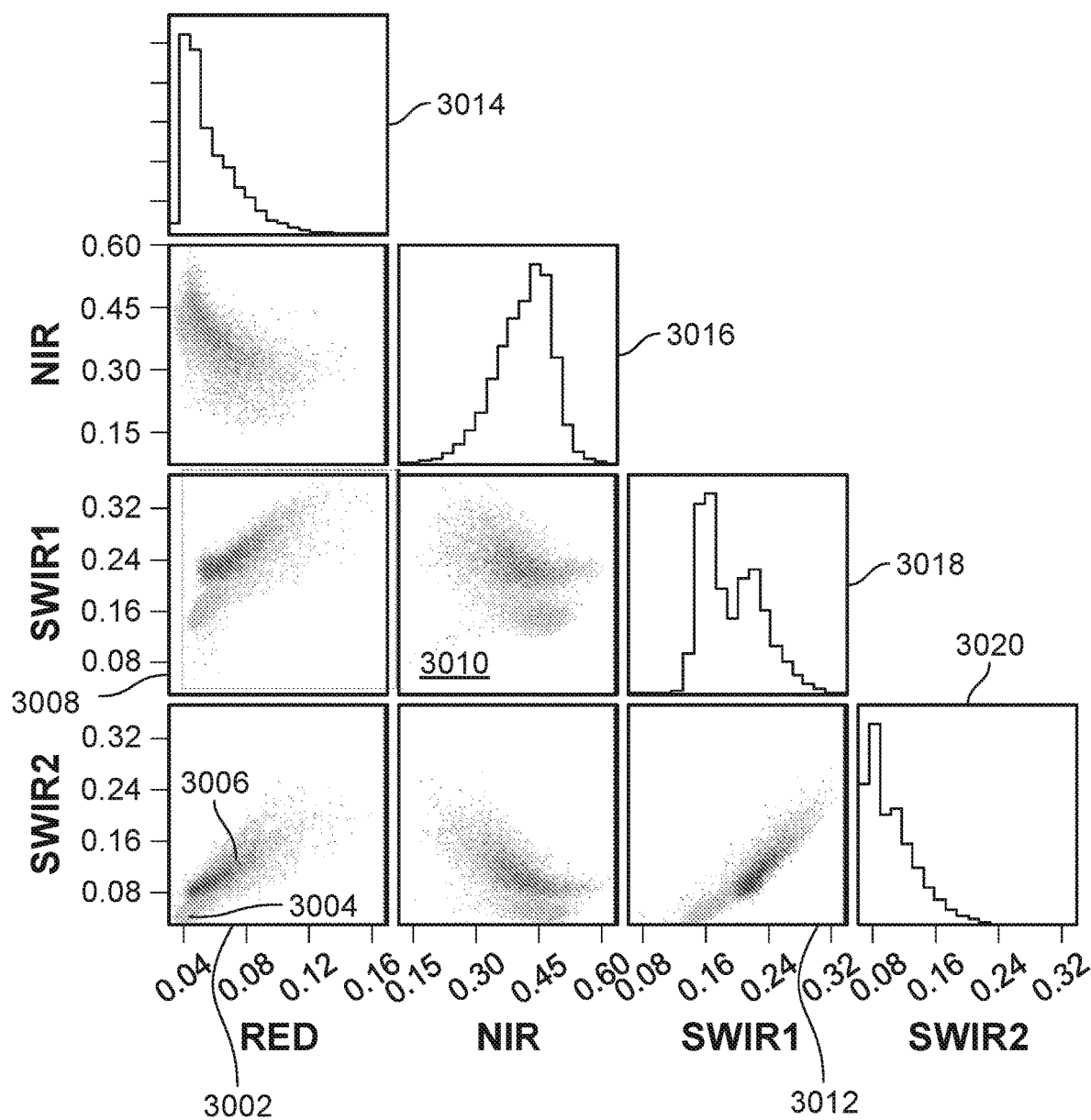
FIG. 30 is a corner plot of every pixel in the image shown in FIG. 29.

FIG. 30 is a corner plot (also referred to herein as a triangle plot), of every pixel in the image shown in FIG. 29. In particular, FIG. 30 shows, for each of the different spectral bands present in image 2900, a scatter plot of the brightness value of each pixel for one spectral band against the brightness value for that pixel for a different spectral band. As one example, box 3002 plots each pixel by using its red value as an X coordinate and its SWIR 2 value as a Y coordinate. As seen in FIG. 30, one group of pixels clumps in region 3004 (and will ultimately be revealed as corn pixels) and one group of pixels clumps in region 3006 (and will ultimately be revealed as soybean pixels). Other boxes, such as box 3008 (which plots SWIR 1 against red), and box 3010 (which plots SWIR 1 against near infrared) evidence similar clumping. Edge boxes 3014-3020 are histograms collapsing the distribution of pixels in a given dimension. Box 3018 indicates a particularly strong separation in each of plots 3008, 3010, and 3012 (as evidenced by the two distinct humps in box 3018).

Figure 31:
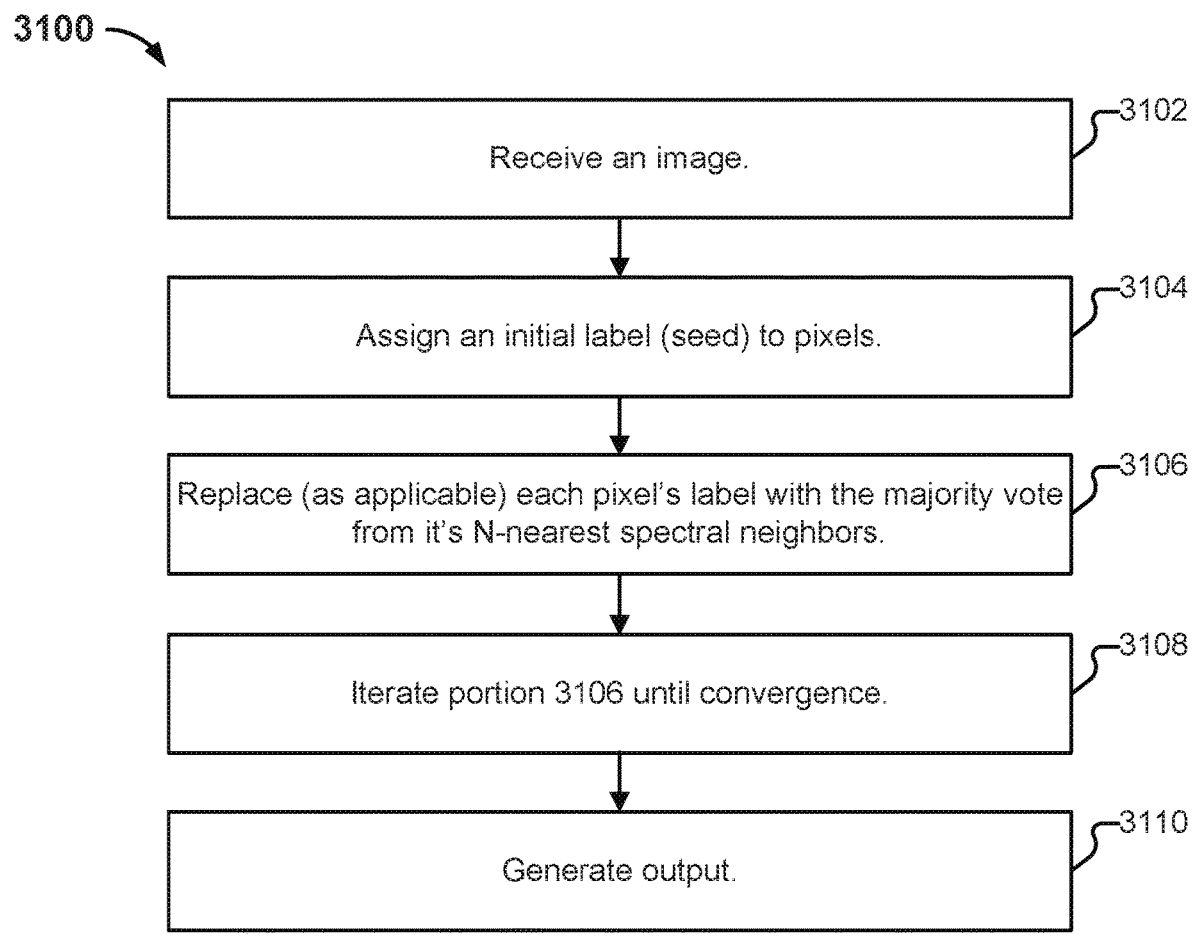
FIG. 31 illustrates an example of a process for refining a classification.

FIG. 31 illustrates an example of a process for refining a classification. In various embodiments, process 3100 is performed by iterative labeler 1230. One example way to implement iterative labeler 1230 is (as with other components of platform 1202) to use a combination of python scripts and libraries (e.g., NumPy, sciPy, scikit-learn). The process begins at 3102 when data to be classified is received. In the following example, suppose a single image (e.g., image 2900) is received at 3102. As will be described in more detail below, multiple images can also be received at 3102.

At 3104, an initial label is determined for each pixel in the image received at 3102. As one example, at 3104, classifier 1222 can be used to classify (label) each pixel in the image received at 3102 (e.g., with a given pixel being assigned a "01," "02," "03," etc. as described in more detail above). In various embodiments, the initial labels for the image are stored as a NumPy array.

The initial labeling can be performed using embodiments of processes 2500 or 2550, and can also be performed by classifier 1222 without using a boundary map. As another example, use of classifier 1222 can be omitted at 3104 and an initial classification obtained in another way. As one example, where available, historical classification of land corresponding to the image (e.g., a CropScape—Cropland Data Layer) can be used as an initial classification. As another example, a third party classification service (e.g., using Mechanical Turk, etc.) can provide the initial labels at 3104 (e.g., manually). Further, in various embodiments, only some of the pixels receive initial labels at 3104 (e.g., where a confidence in the initial label is below a threshold, where some of the data provided by CropScape is missing, where manual classification is missing, etc.). In the example of FIG. 29, suppose all of the pixels are initially labeled at 3104 as either 01 (corn) or 02 (soybeans). In other scenes, other/additional labels would also/instead be used in conjunction with process 3100. For example, in a scene with four kinds of land cover, the initial labels assigned to the pixels in the scene at 3104 could be 01 (corn), 03 (wheat), 42 (lumber), and 88 (millet).

Each pixel can be located in an n-dimensional spectral space, where n is the number of spectral bands included in the image. The coordinates of the pixel in the n-dimensional space are specified by the spectral band measurements associated with the pixel. Each pixel has a set of nearest spectral neighbors—a set of pixels that are the closest Euclidian distance in the n-dimensional space to the pixel.

At 3106, each pixel's current label is replaced with a label determined by a majority vote of its N-nearest spectral neighbors' labels. In particular, if the majority vote label is different from the pixel's current label, the majority vote label is saved for the pixel in the NumPy array. As one example, suppose five bands of spectral information are available in a given image for a given pixel. The pixel will be assigned the majority vote of the labels of the nearest N neighbors that are the closest Euclidian distance in 5-dimensional space to the pixel. One way to determine the nearest neighbor of a given pixel (e.g., in a 5-dimensional space) is to use a k-d tree. The value of N is configurable. One example value for N is 30 (i.e., 30 nearest spectral neighbors).

Figure 32:
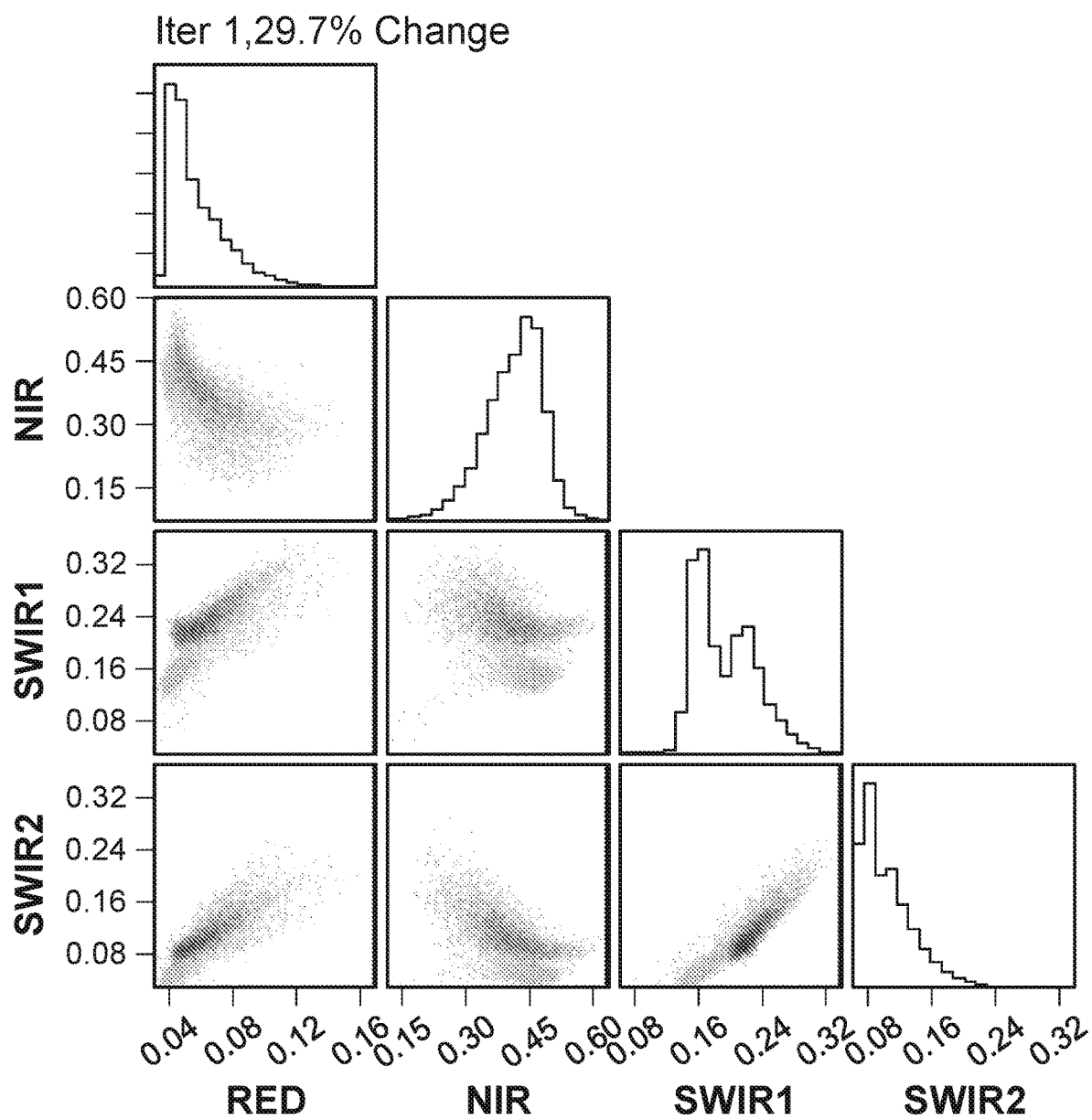
FIG. 32 is a corner plot of pixels after one iteration of a portion of process 3100.
Figure 33:
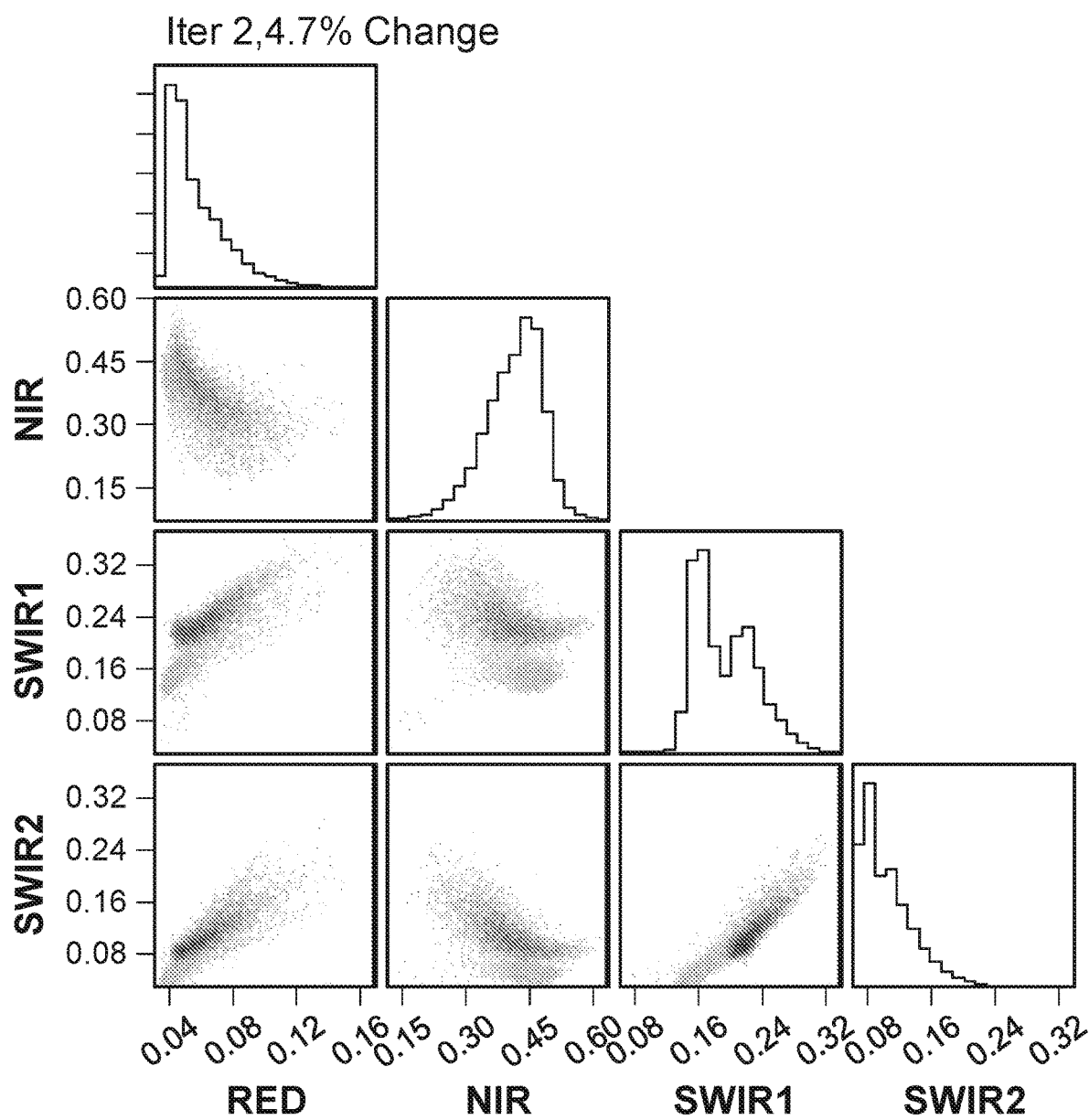
FIG. 33 is a corner plot of pixels after a second iteration of a portion of process 3100.

Portion 3106 of process 3100 can optionally be iterated (at 3108) until convergence. Convergence happens once the rate of change of pixel label values over successive repetitions falls below a threshold. To ensure that process 3100 ends, an upper bound on the number of iterations that can be performed (irrespective of convergence), such as six iterations, can be employed. FIGS. 32 and 33 illustrate, respectively, the results of two iterations of portion 3106 of process 3100 with respect to the image shown in FIG. 29. In the first iteration (the results of which are shown in FIG. 32), 29.7% of the pixels have had their initial labels changed. In the second iteration (the results of which are shown in FIG. 33), only 4.7% of the pixels' labels changed.

Other machine learning approaches can also be used at 3106 (and, as applicable at 3108), instead of nearest neighbor. For example, a random forest can be trained using the initial labels, and the initial labels can be refined at 3106 by applying the trained random forest to the labels.

As with classifier 1222, iterative labeler 1230 can generate a variety of types of output at 3110, as applicable. For example, iterative labeler 1230 can generate a classification map (e.g., in GeoTIFF format) which identifies, at each pixel in the image, a numeric value corresponding to the land use classification determined by the classifier (e.g., "01" being corn, "02" being soybeans, "03" being wheat, etc.). And, as with the output of classifier 1222, the output generated at 3110 can also be consumed by other processes/components of platform 1202 for a variety of purposes. As one example, yield predictor 1226 (a script or set of scripts) can take as input the output generated at 3110 and additional data such as rainfall/sunlight, and light curve information for a given region, to generate yield estimates for the region (e.g., using a model 1228 trained using historical information). As another example, the output of process 3100 can be provided as input, along with a boundary map, to an embodiment of process 2500 (e.g., where the process starts at 2506 and the boundary map is used to refine the classification determined in accordance with process 3100).

Figure 34:
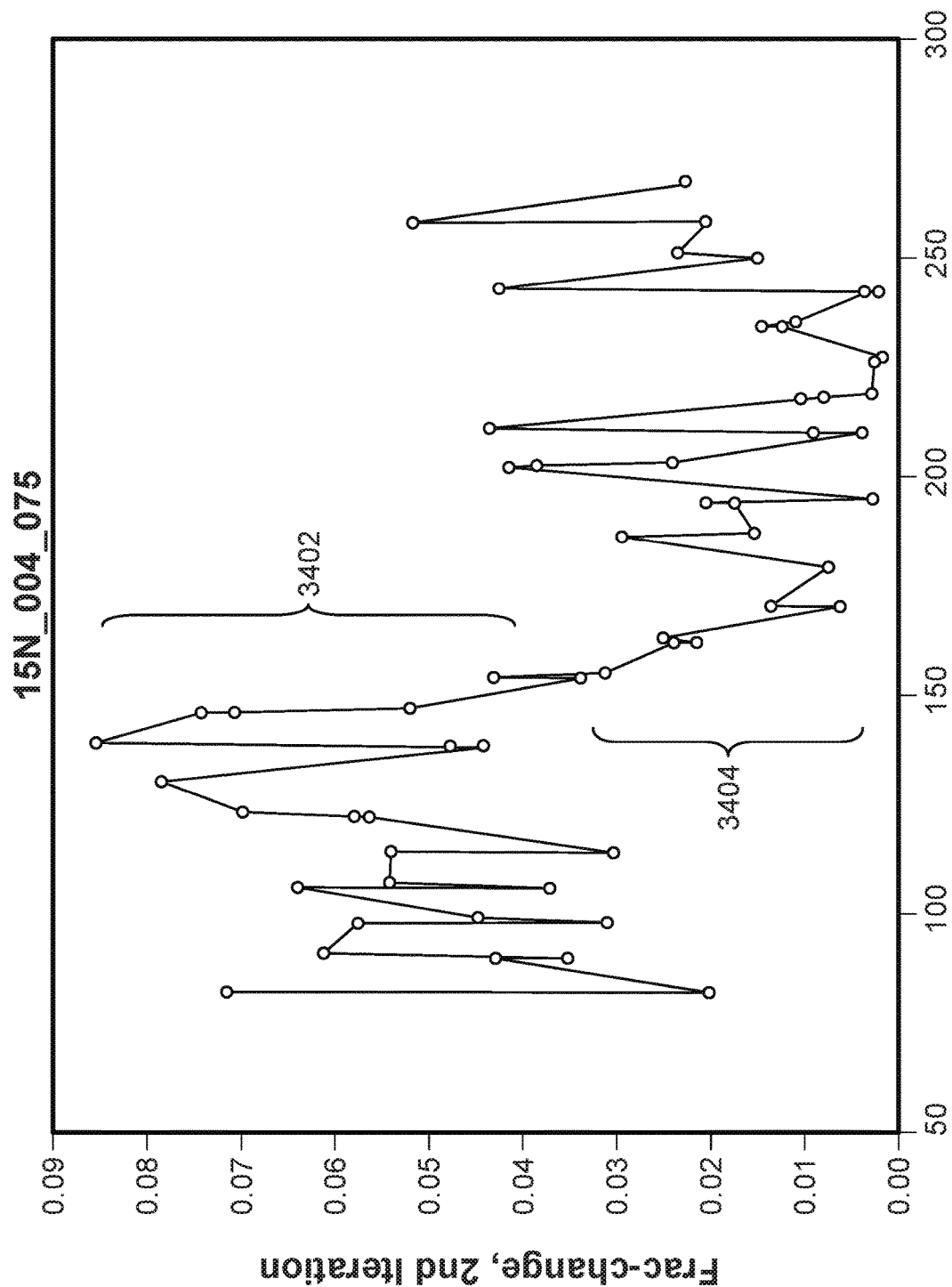
FIG. 34 illustrates the speed with which convergence occurs when process 3100 is performed using the scene depicted in FIG. 29.

Process 3100 has thus far been described in the context of a single image being received at 3102. In various embodiments, multiple images are received at 3102. In a first case, multiple images in a time series are received at 3102 (e.g., a set of twelve images of the same scene, in a time series, is received at 3102). In the first case, each image is separately processed in accordance with portions 3102-3110 of process 3100. A final label can be determined, for each pixel in the scene, by combining the labels provided by each of the individual outputs for each of the images in the time series. As one example, a majority vote can be used. As another example, the vote of each image for a given pixel can be weighted by how quickly convergence occurred. The speed of convergence can be measured by counting the number of repetitions of portion 3106 that take place before convergence. A faster convergence is indicative of better separation (i.e., an observation on a day when different crops are easier to differentiate from one another, such as a very clear day, and/or a day later in the growing season). FIG. 34 illustrates the speed with which convergence occurred when process 3100 was performed using the scene depicted in FIG. 29. As indicated in FIG. 34, observations earlier in the year will tend to take longer to converge (3402) and can be assigned a lower weight, and observations later in the year will tend to take less time to converge (3404) and can be assigned a higher weight.

In a second case, multiple observations of the same scene, at the same approximate time, but from different sources can also be combined. As one example, an observation of the scene depicted in FIG. 29 could be made by multiple of Landsat, RapidEye, SENTINEL-2, and SENTINEL-1. After initial processing (e.g., by elements 1208 and 1210) by platform 1202 to obtain images of the scene depicted in FIG. 29 in the appropriate (directly comparable) size/format, each of the scenes as obtained from each of the different observational sources can be processed in accordance with process 3100. A final label can be determined, for each pixel in the scene, by combining the labels determined for each of the respective observations of the scene. As one example, a majority vote can be used. As another example, the vote of each sensor can be weighted (e.g., based on convergence speed, based on an explicit preference for one sensor over another, etc.) as applicable.

VI. Additional Example Applications

A. Correcting Artifacts, Upsampling Images, and Denoising Images

Boundary maps, such as those that can be created using embodiments of process 1800, can be used to improve land use classification results (e.g., as explained in conjunction with FIGS. 25A and 25B). Boundary maps (whether made in accordance with embodiments of process 1800 or otherwise provided, e.g., as CLU data) can also be used in other applications to improve other kinds of results. Examples of such other applications include correcting artifacts such as scanline correction errors, upsampling images, and denoising images.

Figure 35C:
FIG. 35C illustrates a result of providing the image shown in FIG. 35A and the boundary map shown in FIG. 35B as input to process 3700.
Figure 35B:
FIG. 35B depicts a boundary map.
Figure 35A:
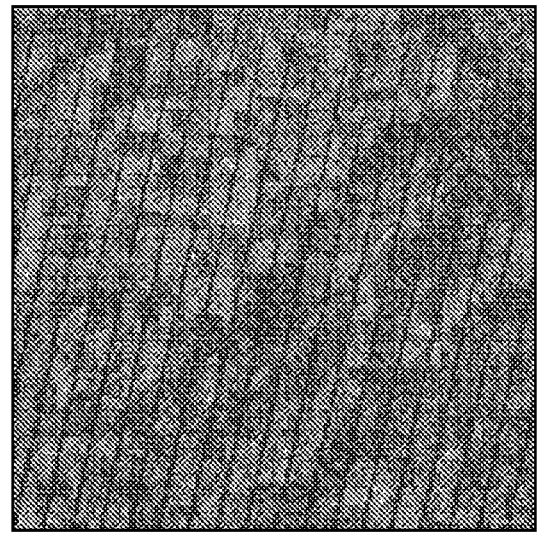
FIG. 35A depicts a Landsat 7 image.
Figure 36C:
FIG. 36C illustrates a result of providing the image shown in FIG. 36A and the boundary map shown in FIG. 36B as input to process 3700.
Figure 36B:
FIG. 36B depicts a boundary map.
Figure 36A:
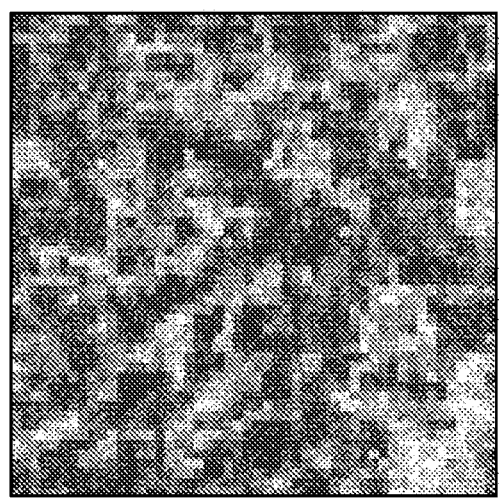
FIG. 36A depicts a portion of a MODIS image.
Figure 38B:
FIG. 38B shows a zoom into FIG. 38A.
Figure 39:
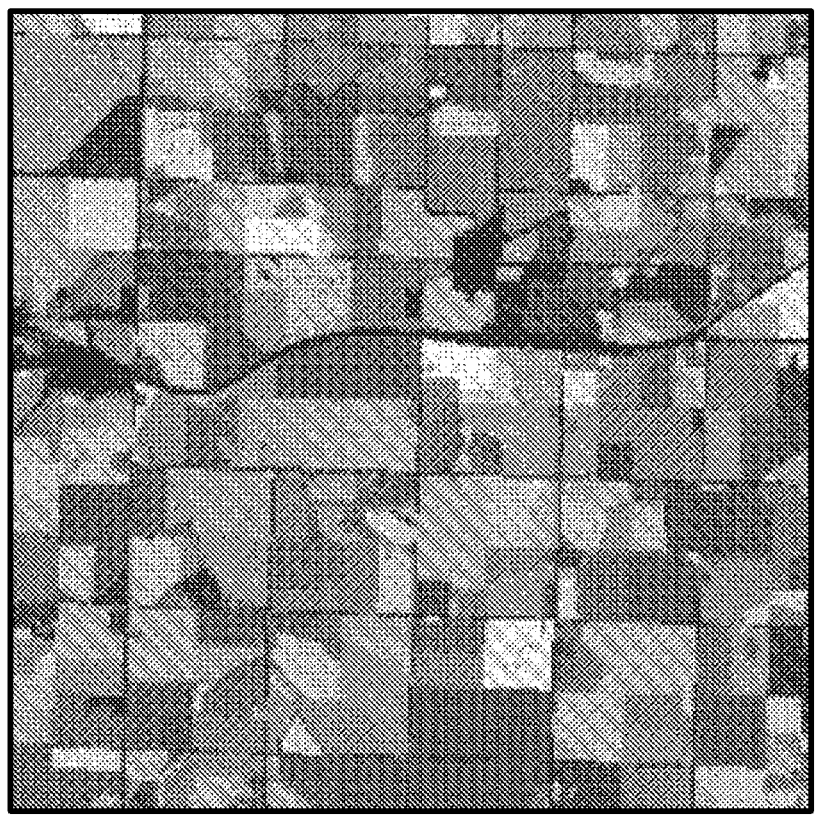
FIG. 39 illustrates an example of a boundary map.

FIG. 35A depicts a Landsat 7 image that includes (as diagonal black lines) scanline correction artifacts. FIG. 36A depicts a portion of a MODIS observation. FIG. 38B depicts a noisy observation by SENTINEL-1 of a portion of land. FIGS. 35B, 36B, and 39 respectively depict boundary maps corresponding to the images shown in FIGS. 35A, 36A, and 38B. In each case, the captured observational data can be improved by performing an embodiment of process 3700 using the respective boundary map.

Figure 37:
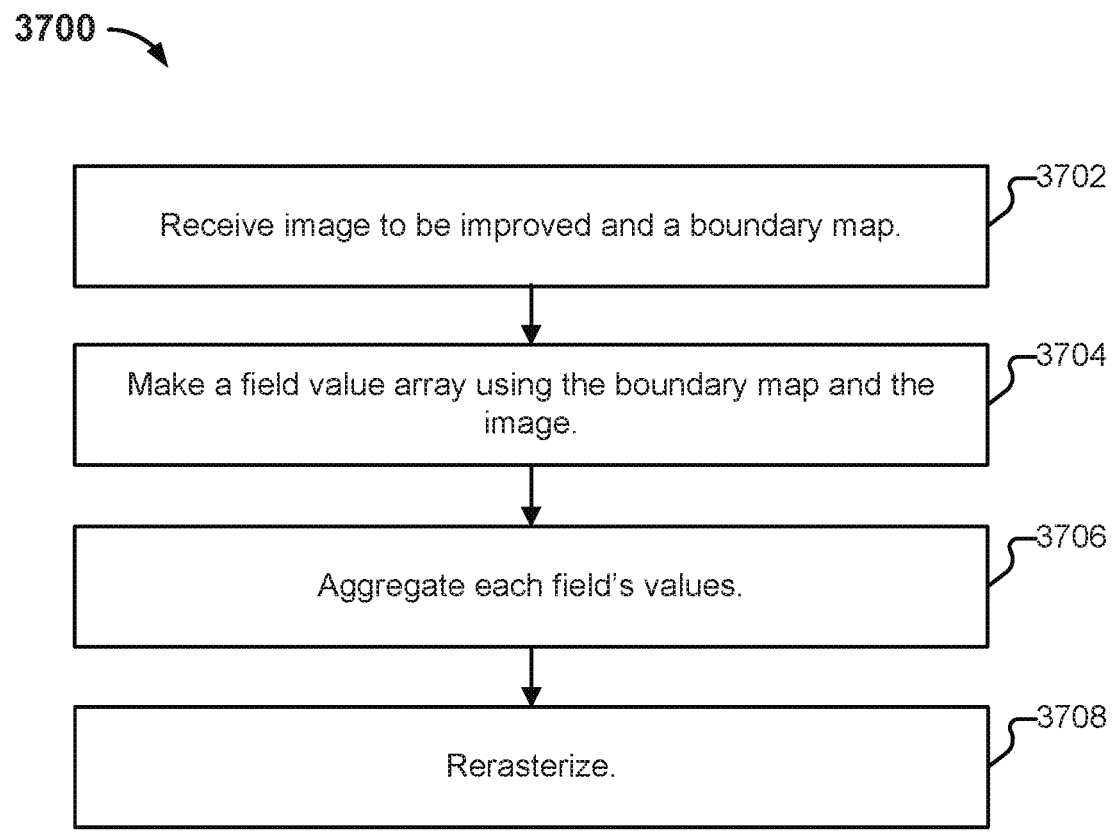
FIG. 37 illustrates an embodiment of a process for enhancing an image using a boundary map.

FIG. 37 illustrates an embodiment of a process for enhancing an image using a boundary map. In various embodiments, process 3700 is performed by image enhancer 1232. One example way to implement image enhancer 1232 is as a set of Python scripts incorporating the open-source libraries NumPy and SciPy. The process begins at 3702 when an image to be enhanced and a corresponding boundary map are received. As a first example, suppose that at 3702, image 3500 and boundary map 3530 are received. At 3704, a field value array is constructed, using the boundary map and the received image. The field value array is an array of deques, and is created by iterating over pixels in the received image, appending a given pixel's value to the appropriate field. At 3706, the values (extracted from the received image) are aggregated per field. A variety of aggregation techniques can be used, examples of which include determining the mean pixel value, the median pixel value, or a mode. As previously explained, for pixels where no data is present, a NaN value can be supplied (e.g., during ingestion), so that operations such as taking a median or mean are not impacted by the presence of zero values. The values determined at 3706 are used to perform, at 3708, a rerasterization operation, resulting in an enhanced image where each pixel in a field in the enhanced image has the same value as the rest of the pixels in the same field. As with various other examples provided throughout the Specification, where the image received at 3702 is multi-spectral, multiple values for a pixel can be operated on throughout process 3700 as applicable.

FIG. 35C illustrates a result of providing image 3500 and boundary map 3530 as input to process 3700. In particular, regularizing the pixel brightness values across the pixels bounded by a given field (e.g., using the median value) has in-painted the black stripes of missing data in the original image.

FIG. 36B depicts a boundary map (created in accordance with process 1800) for a portion of land, rasterized to 30 m resolution. FIG. 36A depicts a corresponding MODIS observation of the same portion of land that is represented by boundary map 3630. The MODIS observation (240 m resolution) has been upsampled so that both image 3600 and boundary map 3630 are the same size (e.g., with 2048×2048 pixels representing 30 m×30 m of ground in both cases). FIG. 36C illustrates a result of providing image 3600 and boundary map 3630 as input to process 3700. In particular, regularizing the pixel brightness values across the pixels bounded by a given field (e.g., using the median value) has resulted in a resolution-enhanced version of image 3600.

Process 3700 can similarly be used to de-noise image 3850 (using boundary map 3900), resulting in an image such as image 41A. As will be described in more detail below, alternate approaches to denoising images can also be used.

B. Additional Denoising Embodiments

Noise in images is an obstacle to many kinds of image processing. This is especially true of automated processing, as it can be challenging for computer algorithms to extract image features amidst substantial noise as easily as humans can. A fundamental challenge is to remove noise without also removing essential image characteristics. Much of the information content of an image is contained in the image's edges. Accordingly, a technique that will preserve edges in the course of removing noise will be beneficial.

Figure 38A:
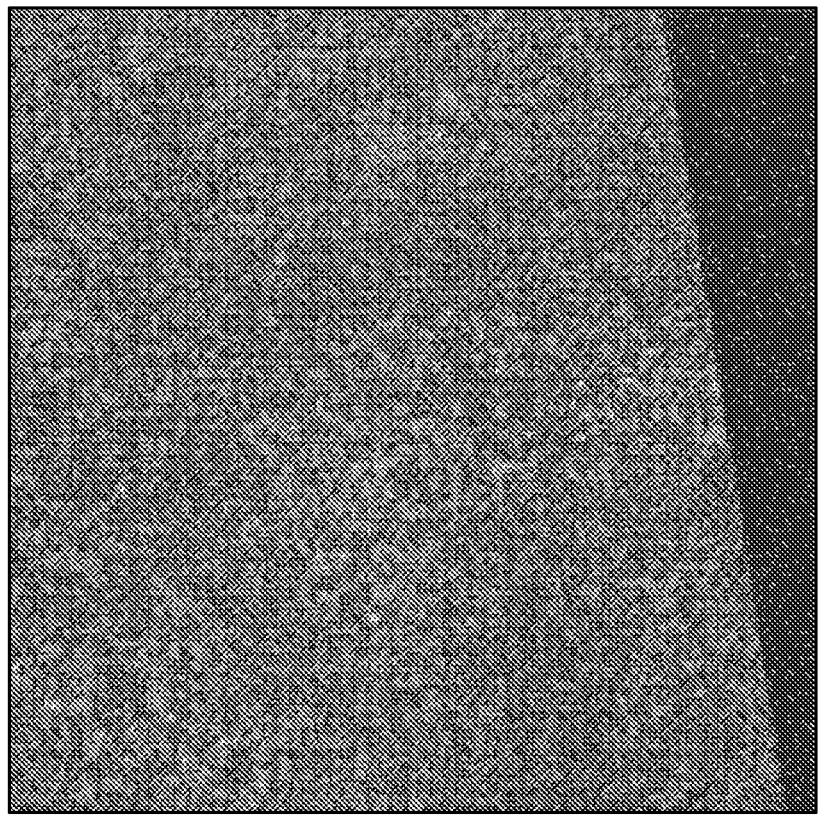
FIG. 38A shows an example of a processed SENTINEL-1A image.

One source of input to platform 1202 is SENTINEL-1 data. SENTINEL-1 provides synthetic aperture radar (SAR) imagery. Benefits of SAR imagery include that it is cloud-free, and also that it can be continuously collected (including at night). One drawback of SAR imagery is that it can be very noisy. FIG. 38A shows an example of a processed SENTINEL-1A image (UTM tile 15N 004 075 (Carroll, Iowa), taken Sep. 11, 2015), with each side of the image representing a distance of approximately 60 km. In the example shown in FIG. 38A, the first channel is the VH polarization, the second channel is the VV polarization, and a third channel has been added using $$\frac{VV - VH}{VV + VH}.$$

FIG. 38B shows a zoom into FIG. 38A, with each side of the image representing a distance of approximately 900 m. FIG. 39 illustrates an example of a boundary map that corresponds to the portion of land depicted in FIG. 38B. The following are two example approaches to using boundary maps (whether generated in accordance with an embodiment of process 1800, or otherwise obtained, e.g., as governmental CLU data) to assist in image denoising.

1. First Approach

Figure 40:
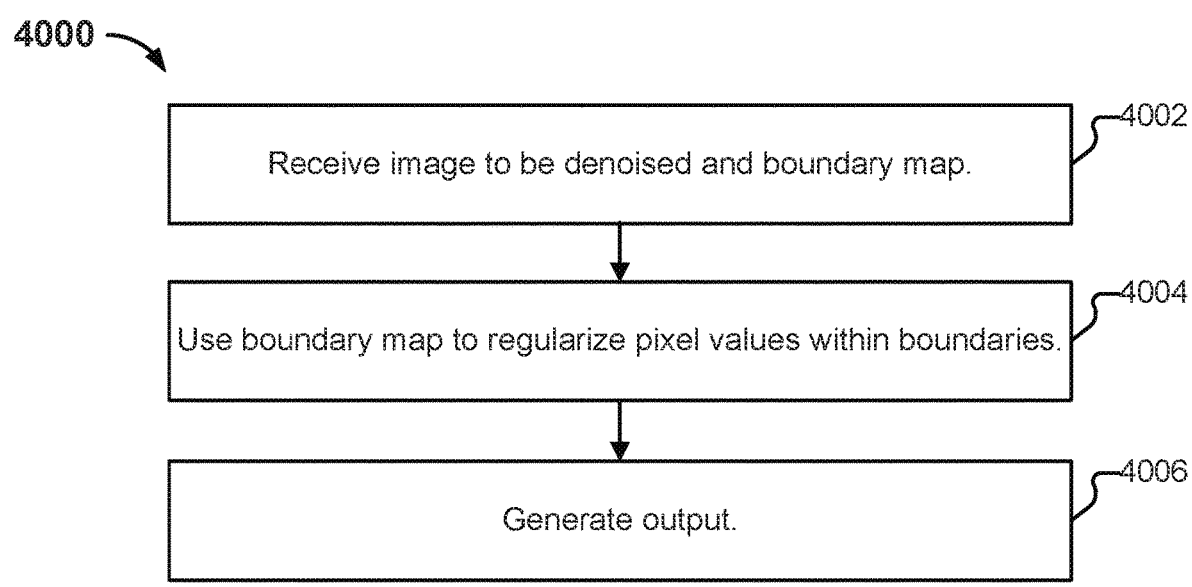
FIG. 40 illustrates an embodiment of a process for enhancing an image using a boundary map.
Figure 41B:
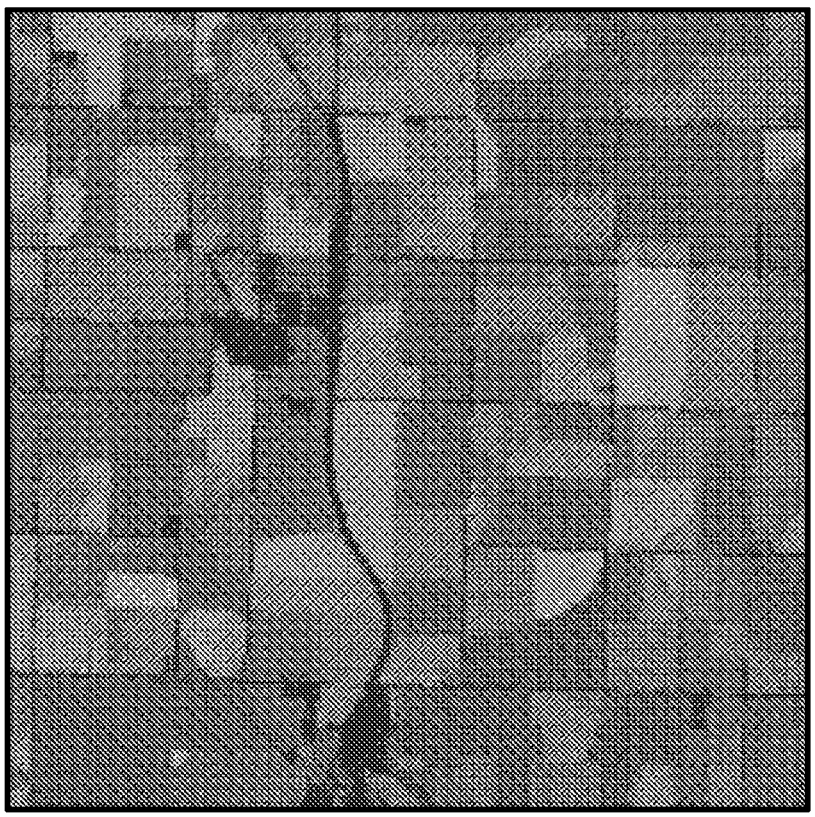
FIG. 41B depicts a result of regularizing the pixels in FIG. 38B using a field-wise mean of the logarithm of the pixel values.
Figure 41A:
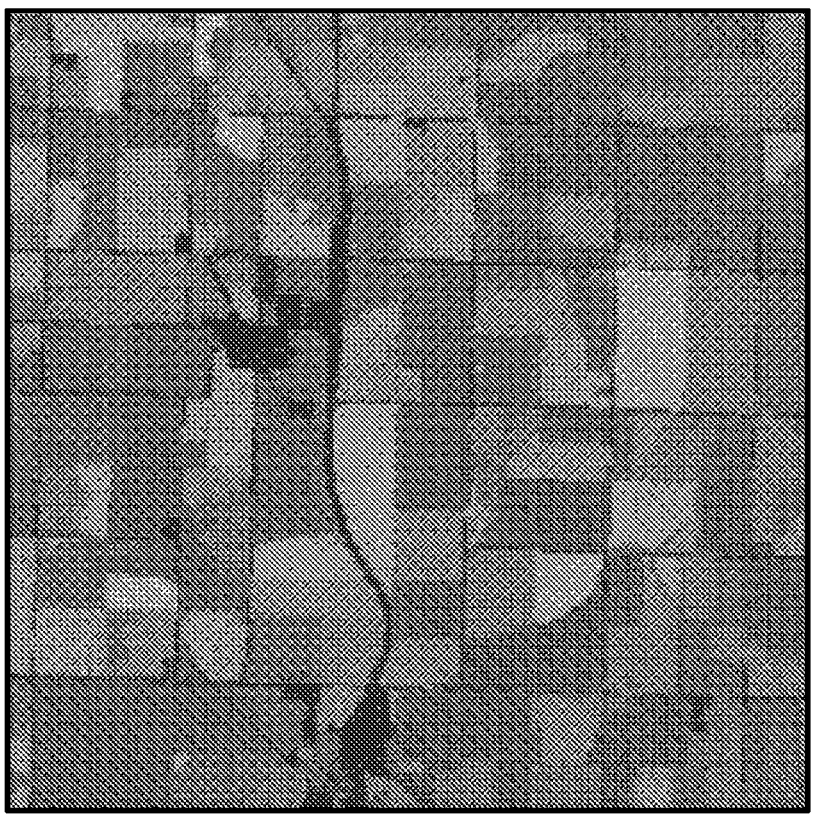
FIG. 41A depicts a result of regularizing the pixels in FIG. 38B using a field-wise median value.

One approach to using a boundary map such as boundary map 3900 to reduce noise in an image such as image 38B is shown in FIG. 40 and is an embodiment of process 3700. In various embodiments, process 4000 is performed by denoiser 1234. One example way to implement denoiser 1234 is as a set of Python scripts incorporating the open-source libraries NumPy and SciPy. The process begins at 4002 when an image to be denoised (e.g., image 3850) and a boundary map (e.g., boundary map 3900) are received. At 4004, for each field in the boundary map, a regularized value (or set of values, where data for multiple spectral bands is present at each pixel) is determined using pixels in the received image that are located within the field. An image comprising the constrained values is generated as output at 4006. As one example of the processing that can be performed at 4004, a mean value (or set of values, where the image is multi-spectral) can be determined across the pixels in the received image that correspond to a given field in the boundary map. The noise distribution of SAR often has outliers. Accordingly, instead of a mean value, a median value can also be used (e.g., to reduce the impact of outlier pixel values in the received image). FIG. 41A depicts a result of regularizing the pixels in FIG. 38B using a field-wise median value. FIG. 41B depicts a result of regularizing the pixels in FIG. 38B using the field-wise mean of the logarithm of the pixel values (per the multiplicative Gaussian model). The results shown in FIGS. 41A and 41B are not identical but are both similar and reasonable ways to reduce SAR noise.

2. Second Approach (Mumford-Shah)

One drawback to the first approach is that sometimes using a single value (or set of values in the case of multi-spectral information) for every pixel within a field may not be appropriate. Sub-field information (which might be of interest) can be lost using the first approach. Another drawback to the first approach is that problems with the boundary map can be propagated unnecessarily into the final result. In particular, an undersegmented boundary map can lead to uniform regions that should not be made uniform. One reason a boundary map may be undersegmented is due to limitations when the map was created (e.g., excessive clouds). Another reason a boundary map may be undersegmented is due to changes in land use since the boundary map was created (e.g., a field traditionally used for one crop is subsequently split in half). Accordingly, while a boundary map can be very beneficial in various applications, they do sometimes contain imperfections. Accordingly, approaches that can preserve differences (if present) within a given field can also be beneficial, for various applications.

The Mumford-Shah functional can be used as a denoising approach to image processing and seeks the simultaneously refined or denoised image estimate, and a set of edges within the image. Suppose f is a noisy image defined on $\Omega$. An image u and an edge-set $\Gamma$ are sought:

$$\min_{u,\Gamma} \int_{\Omega\backslash\Gamma} |\nabla u|^2 + \frac{\lambda}{2} \int_{\Omega} |u - f|^2 + \mu \mathcal{H}(\Gamma).$$

The regularization of u is turned off at edge-set $\Gamma$, which prevents the regularization from blurring the edges, and allows the regularization to be concentrated inside those edges, away from $\Gamma$. One drawback to using Mumford-Shah (generally) is that determining edge-set $\Gamma$ can be challenging. That drawback can be mitigated, however, where edge data is already known. A boundary map (whether generated at 1800, or otherwise obtained, such as from CLU data) can be used as an approximate source of edge-set $\Gamma$. Depending on the imagery and process that was used to produce the boundary map, the map may or may not assign pixels to edges. Where the boundary map does assign pixels to edges, the set of pixels labeled as an edge comprises the edge map that can be used to assist the denoising. In other cases (e.g., CLU rasters, which do not assign pixels to edges), adjacent fields may occupy adjacent pixels with no edge between them. An edge map can be produced (e.g., from an edgeless raster) by computing the gradient, and assigning places where the gradient is nonzero as edges. In some embodiments, an edge map is created from an edgeless raster at a 3 m resolution, the edges are dilated to 10 pixels thick, and then a downsampling is performed to a 30 m resolution. Further, gdal_rasterize can be used at a higher resolution, then downsampled to a desired resolution, resulting in better preservation of details than using gdal_rasterize at the desired resolution.

a. Penalty Functional

The pixel values of a satellite image can be regarded as samples of an underlying function $f(x, y)$, defined at every point on the ground contained within the image. Let I be the set of such points, and let E be the set of points determined to belong to an edge. Then the approach amounts to minimizing the following functional:

$$F(u) = \frac{1}{p} \int_{I\backslash E} |\nabla u|^p + \frac{\lambda}{2} \int_{I} |u - f|^2. \tag{8}$$

The scalar factors are adjusted for convenience. The first term puts a substantial penalty on u being noisy, but without penalizing changes that happen across edges. A variety of values of regularization exponent p can be used, and a value of p that is less than 2 will help prevent too much smoothing inside of fields. The smaller the value of the exponent p, the more tolerant the approach becomes of having large contrast changes. Using a p that is less than or equal to 1 will help preserve edges that are missing from the boundary map. Where p is set to 1, this is a total-variation regularization, but with the total-variation diffusion turned off at edges. Using a p less than 1 will result in sharper non-field edges and better contrast preservation.

The second term enforces fidelity between the result and the input noisy image $f$. The degree that it does so is governed by the value of the parameter $\lambda$.

b. Discretized Version

For images, the points (x, y) are only defined at discrete points $\{x_1, x_2, \ldots, x_M\}$ and $\{y_1, y_2, \ldots, y_N\}$. An approximation $$\nabla f(x, y) = \left(\frac{\partial f}{\partial x}(x, y), \frac{\partial f}{\partial y}(x, y)\right)$$

can be made using finite differences:

$$\frac{\partial f}{\partial x}(x_i, y_j) \approx f(x_{i+1}, y_j) - f(x_i, y_j) = D_x f(x_i, y_j), \quad (9)$$

$$\frac{\partial f}{\partial y}(x_i, y_j) \approx f(x_i, y_{j+1}) - f(x_i, y_j) = D_y f(x_i, y_j). \quad (10)$$

For i=M or j=N, Neumann boundary conditions can be used, assigning $D_x f(x_M, y_j) = 0 = D_y f(x_i, y_N)$. A construction of $D_x, D_y$ as matrices can be made, so that when an image's pixel values are stored in a vector, the matrix-vector product gives the desired finite difference. The edge masking process can be incorporated by zeroing out the rows of $D_x$ and $D_y$ that contain an edge-pixel term.

The finite difference operators $D_x$, $D_y$ are implemented using sparse matrices, so that the "differentiation" process consists of reshaping an image $f$ into a vector, multiplying by the appropriate matrix, then reshaping back into an image. The construction of the sparse matrices is as follows. First, one-dimensional finite differencing (with Neumann boundary conditions) of a vector with K components is obtained with the following matrix:

$$B_K = \begin{pmatrix} -1 & 1 & 0 & 0 & \ldots & 0 \\ 0 & -1 & 1 & 0 & \ldots & 0 \\ \vdots & & \ddots & \ddots & & \vdots \\ 0 & \ldots & 0 & -1 & 1 & 0 \\ 0 & \ldots & 0 & 0 & -1 & 1 \\ 0 & \ldots & 0 & 0 & 0 & 0 \end{pmatrix}.$$

Accounting for the location of indices to correspond to differentiation with respect to x or y is accomplished using Kronecker products (cf. numpy.kron). If $I_L$ denotes the L×L identity matrix, then for use with M×N×L images, $$D_x = (I_M \otimes B_N) \otimes I_L,$$

$$D_y = (B_M \otimes I_N) \otimes I_L.$$

This produces matrices that are (MNL)×(MNL) in size. They are constructed so that if $f$ is an M×N×L image, unwinding the pixel values of $f$ into a vector, multiplying this vector by the matrix, and then reshaping the product back into an image will give the desired finite-difference derivative.

The discretized form of (8) can be stated as follows:

$$F(u) = \frac{1}{p}\sum_i [(D_x u)_i^2 + (D_x u)_i^2]^{p/2} + \frac{\lambda}{2}\sum_i (u_i - f_i)^2. \quad (11)$$

Here u and $f$ are vectors with M×N components.

c. Solution Criterion

Following standard calculus practice, (11) can be differentiated and set equal to zero. For any given u, define the diagonal matrix Q(u) as follows:

$$Q(u)_{ii} = [(D_x u)_i^2 + (D_x u)_i^2]^{p-2}. \quad (12)$$

Then the derivative equation becomes:

$$D_x^T Q(u) D_x u + D_y^T Q(u) D_y u + \lambda(u - f) = 0. \quad (13)$$

d. Lagged Diffusivity

The dependence of Q(u) on u makes (13) highly nonlinear and difficult to solve. One approach is to instead solve an iteration of successively more accurate linear approximations. Given a solution estimate $u^n$, use it to fix Q, and then solve for the following iterate:

$$[D_x^T Q(u^n) D_x + D_y^T Q(u^n) D_y + \lambda I] u^{n+1} = \lambda f. \quad (14)$$

Once the values of $u^n$ stop changing much (typically after 5 or 10 iterations), the obtained u can be treated as the minimizer of (11). Reshaping from a vector back into an image gives a resultant denoised image.

Figure 42B:
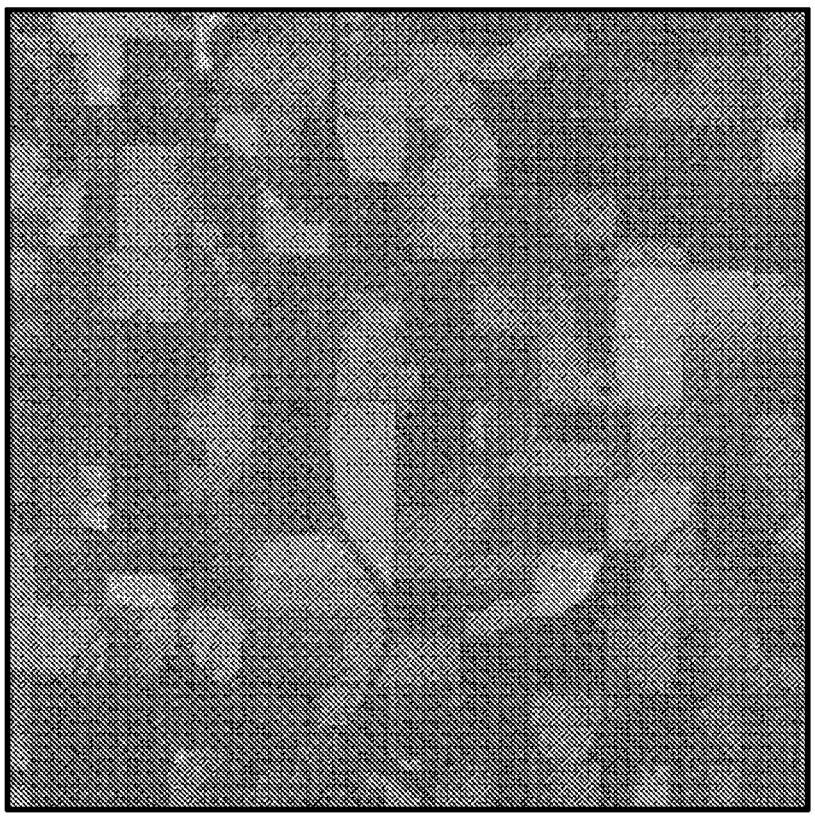
FIG. 42B illustrates an example result of denoising FIG. 38B.
Figure 42A:
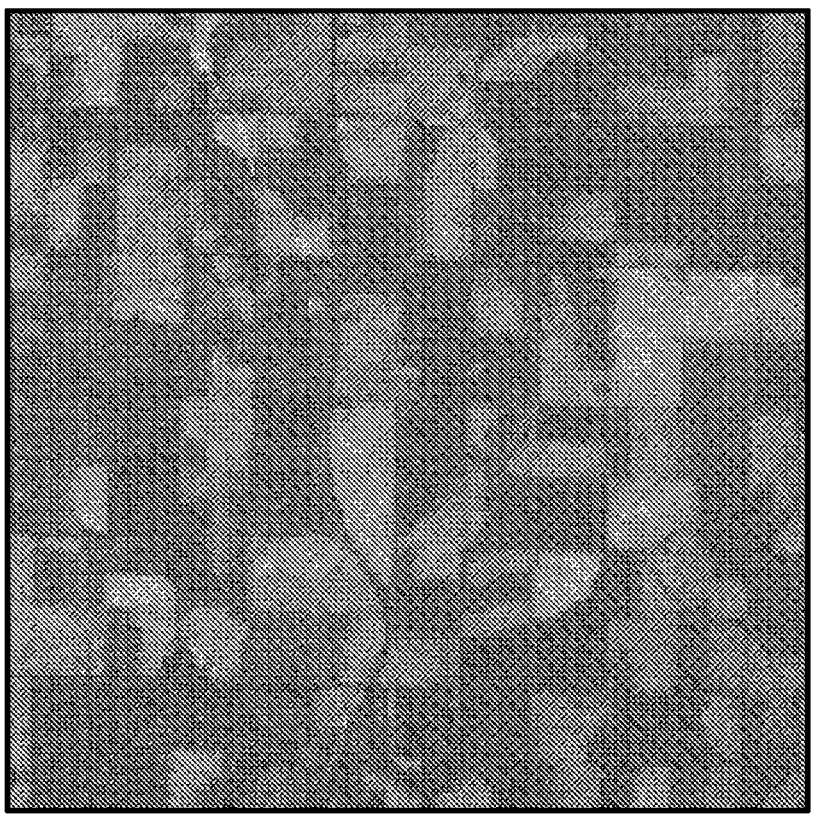
FIG. 42A illustrates an example result of denoising FIG. 38B.

FIGS. 42A and 42B illustrate example results of denoising FIG. 38B in accordance with techniques described herein. In the example depicted in FIG. 42A, the values of regularization exponent p=1 and regularization parameter $\lambda$=1.0 were used. In the example depicted in FIG. 42B, the values of p=1 and $\lambda$=0.1 were used. Weaker regularization gives a realistic-looking result (e.g., preserving textures within fields). Stronger regularization approximates the uniform-field result, while allowing non-field edges.

Figure 43B:
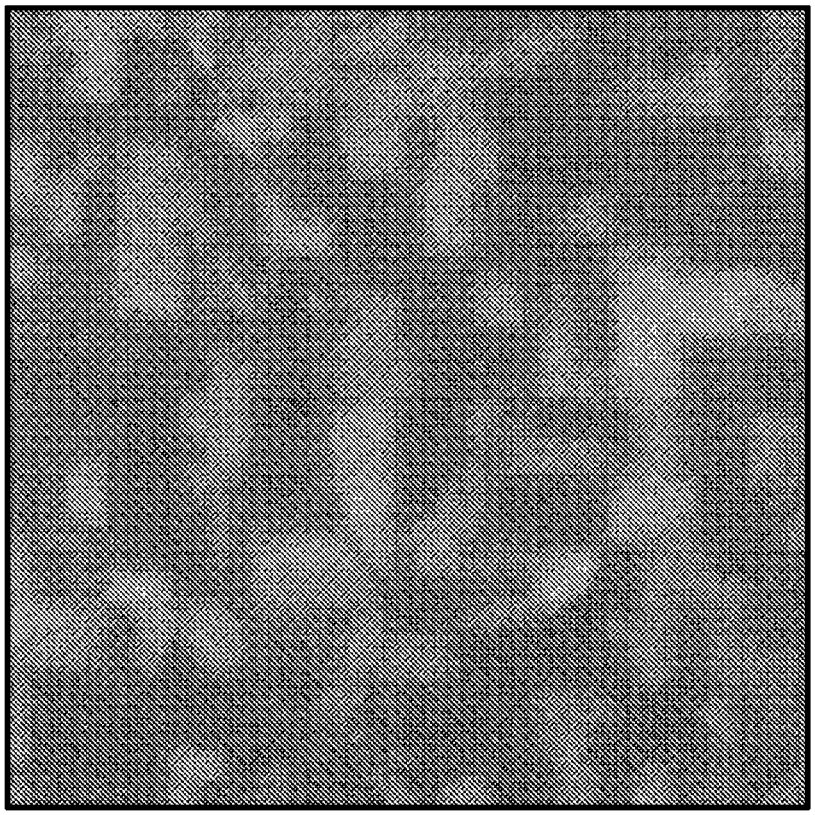
FIG. 43B illustrates an example result of denoising FIG. 38B.
Figure 43A:
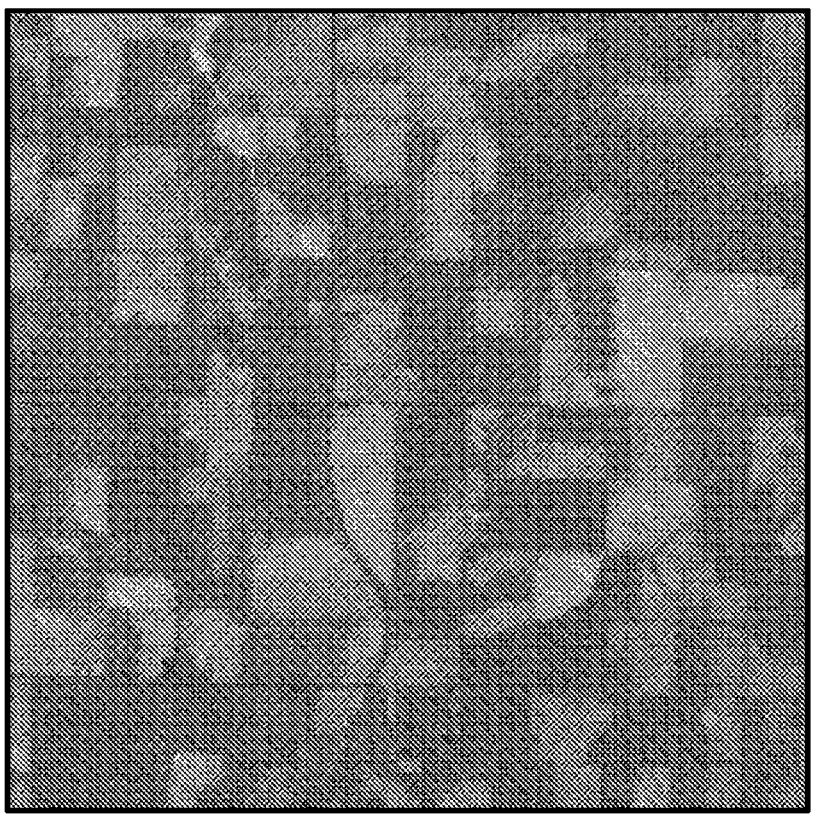
FIG. 43A illustrates an example result of denoising FIG. 38B.

FIGS. 43A and 43B illustrate example results of denoising FIG. 38B in accordance with techniques described herein. FIGS. 43A and 43B allow for the direct comparison of results when edge assistance is used or not. In FIG. 43A, regularization parameter $\lambda$=1.0 was used, with an edge set. In FIG. 43B, regularization parameter $\lambda$=1.0 was also used, but without an edge set (resulting in blurred features).

Figure 44B:
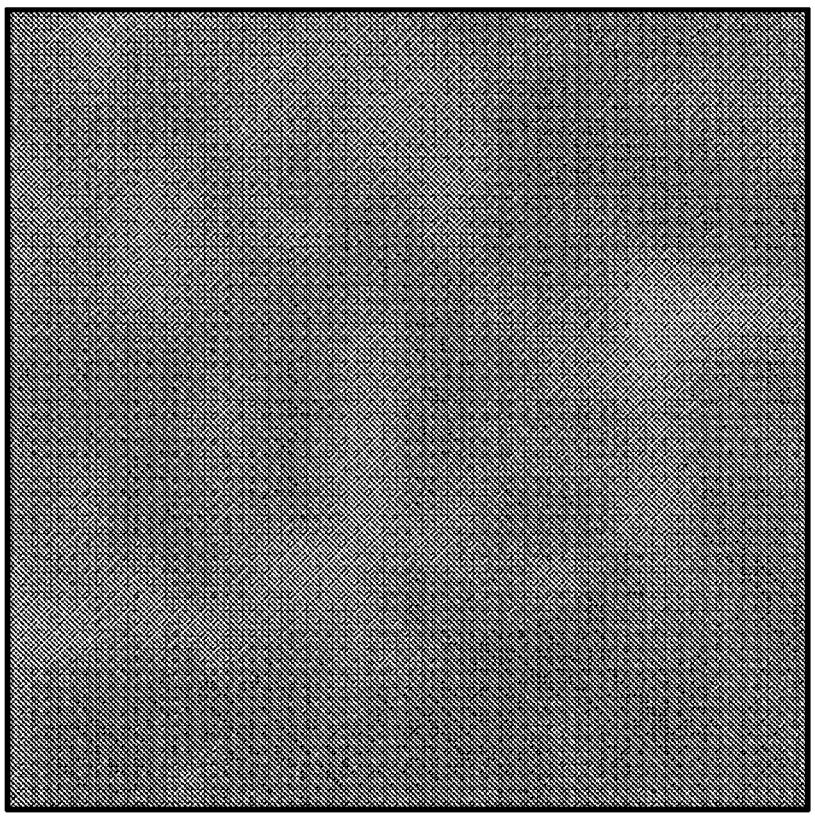
FIG. 44B illustrates an example result of denoising FIG. 38B.
Figure 44A:
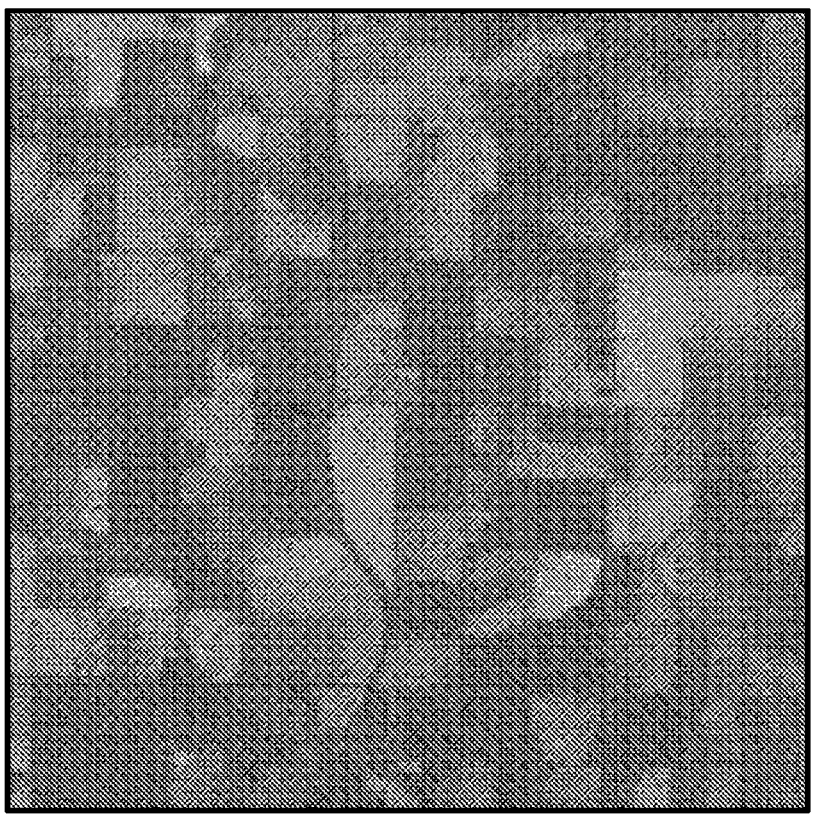
FIG. 44A illustrates an example result of denoising FIG. 38B.

FIGS. 44A and 44B illustrate example results of denoising FIG. 38B in accordance with techniques described herein. FIGS. 44A and 44B allow for the direct comparison of results when edge assistance is used or not. In FIG. 44A, regularization parameter $\lambda$=0.1 was used, with an edge set. In FIG. 44B, regularization parameter $\lambda$=0.1 was also used, but without an edge set (resulting in blurred features).

Figure 45B:
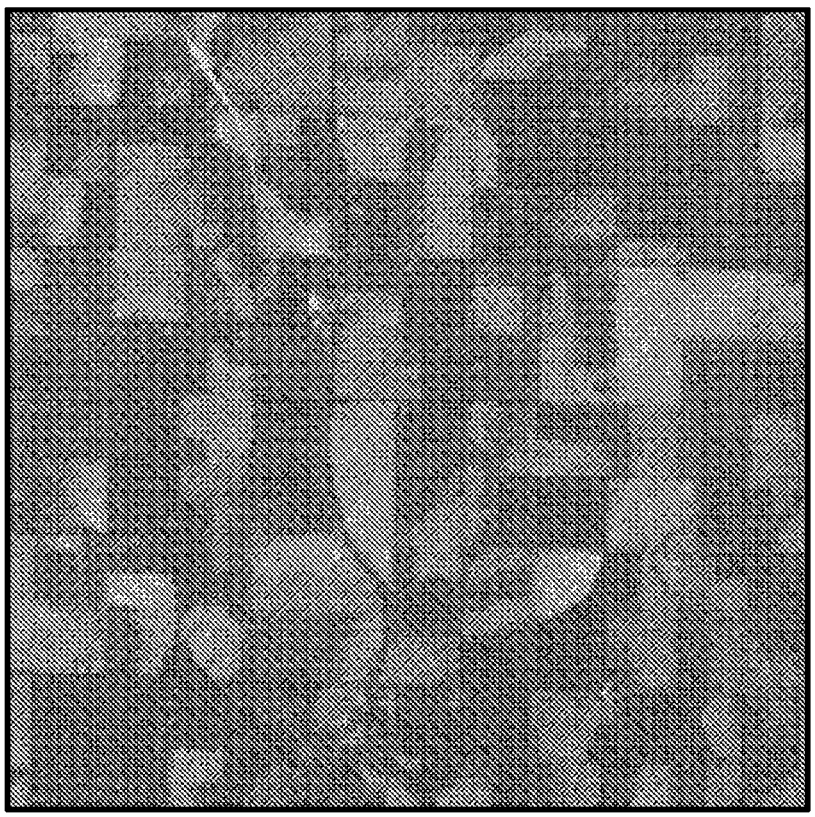
FIG. 45B illustrates an example result of denoising FIG. 38B.
Figure 45A:
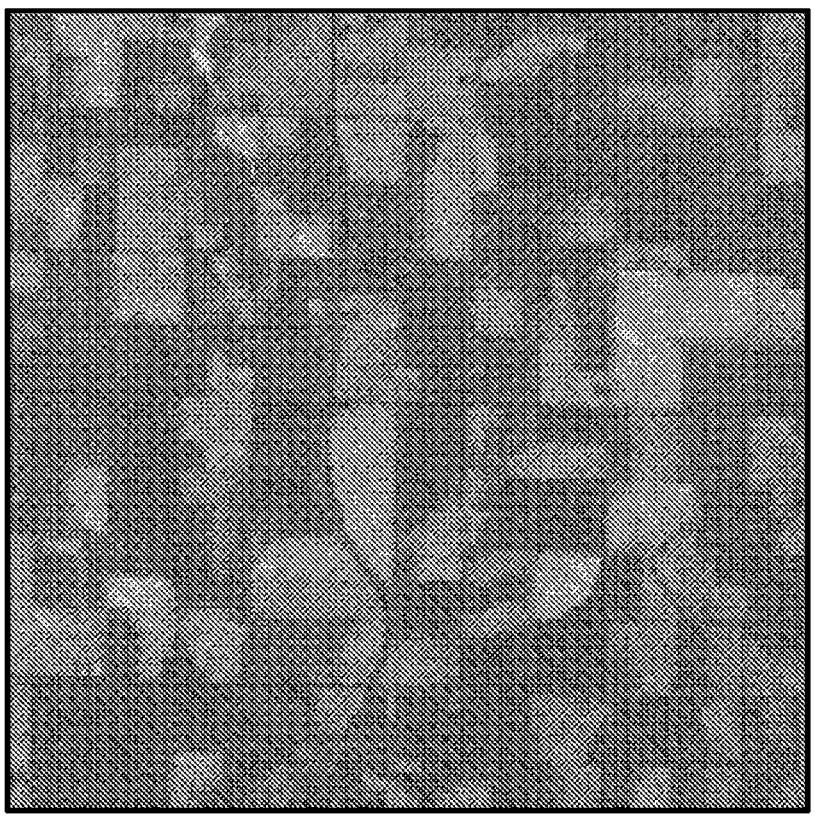
FIG. 45A illustrates an example result of denoising FIG. 38B.

FIGS. 45A and 45B illustrate example results of denoising FIG. 38B in accordance with techniques described herein. In the example depicted in FIG. 45A, the value of regularization exponent p=1 was used. In the example depicted in FIG. 45B, the value of p=0.25 was used. Using a p<1 gives sharper non-field edges, and preserves contrast better.

VII. Sparse Phase Unwrapping

A. Introduction

A variety of applications use the phase of a wave or a complex-valued image to derive useful information. One example is interferometric synthetic aperture radar (InSAR), where the interferometric phase measures deformations of the Earth's surface (e.g., due to mining or natural phenomena). Other examples of applications include magnetic resonance imaging where the phase of the reconstructed image can provide a measurement of blood flow velocity, and laser interferometry of thin films where the interferometric phase gives a measurement of surface velocity and changes in the refractive index. As will be described in more detail below, techniques described herein can be used in these and other applications to unwrap associated phase images.

One definition of "resolution" as it relates to satellite-based imagery is approximately wavelength divided by aperture. For optical systems, a typical value of the wavelength is a few hundred nanometers, and a typical aperture value is approximately one meter. This gives a resolution of approximately one meter at 1000 kilometers. Radar has the benefit that it is emitted from the satellite, and (in contrast with optical systems) does not require sunshine or clear skies to make observations of the earth. In radar-based systems, the wavelength is hundreds of thousands of times longer than for optical-based systems, and a conventionally defined resolution would be unusable. With synthetic aperture radar (SAR), the motion of the satellite is used to synthesize a larger aperture and thus achieve a much higher resolution. SAR images include phase per pixel, and interferometric SAR (InSAR) looks at the interferometric phase, or pixel-by-pixel phase difference, of two SAR images that have been co-registered.

One example use of InSAR is in detecting deformations of the Earth's surface. As an example, volcanic activity often leads to displacements of the Earth's surface. Such displacements are often too small to be seen with optical imagery, but, under the right conditions, can be measured using InSAR. To begin, a satellite makes a pass over an area while emitting microwaves. A SAR image is formed by assigning to each pixel the strength of the reflected signal from the corresponding patch of ground. In addition, each pixel has the phase of the reflected signal, which provides partial information about the distance between the satellite and the pixel during the collection. A second SAR image is collected at a later time. By overlaying, or co-registering, the two images and plotting the per-pixel phase difference, the surface deformation occurring between the collections of the two images can be observed. In this context, "phase" is the fractional part of a whole wavelength in the change in roundtrip distance between the radar and the scatters in a pixel and is measured in radians from $-\pi$ to $\pi$.

Figure 46A:
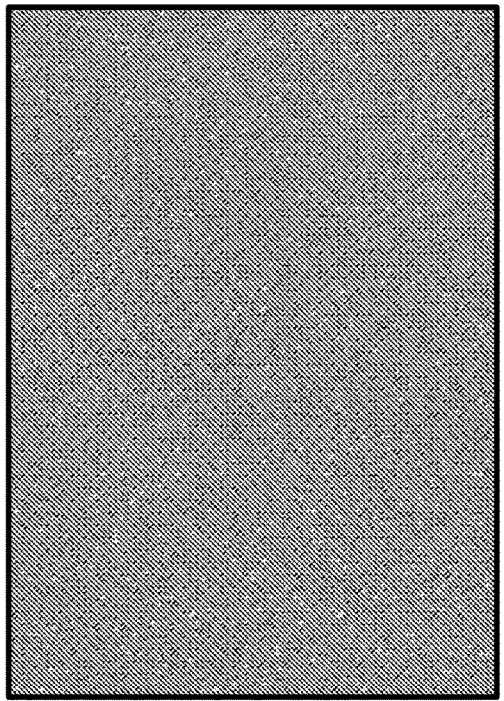
FIG. 46A illustrates an example of phase from a single SAR collection.

FIG. 46A illustrates an example of phase from a single SAR collection. The data appear to be nearly random, and there are several reasons for this. Distances between the satellite and adjacent pixels differ by hundreds of wavelengths, and the fractional piece of that difference is nearly random. In addition, the phase also reflects the way microwaves bounced off of the particular objects and surfaces in he pixel. Finally, there are atmospheric effects that vary slowly from pixel to pixel, but are uncorrelated from one collection to the next.

Figure 46B:
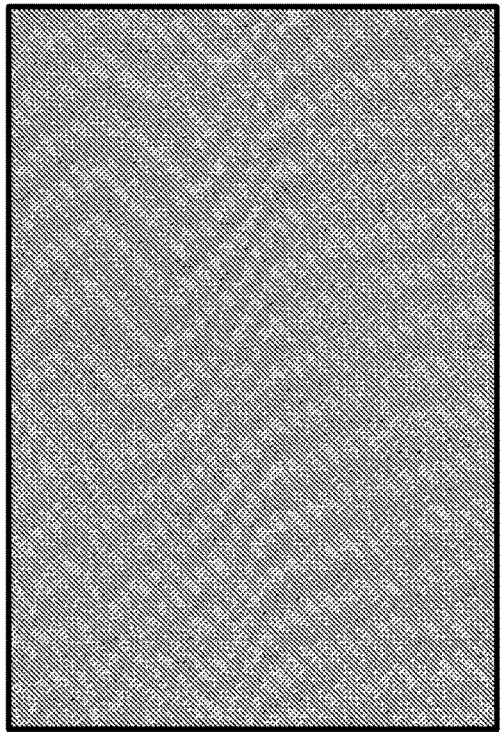
FIG. 46B illustrates the difference in phase from two SAR collections.
Figure 46C:
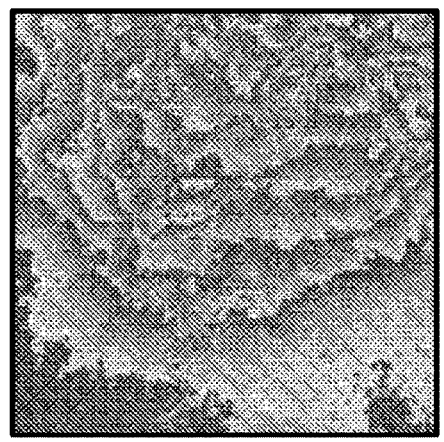
FIG. 46C illustrates relative phase after correcting for orbital offset.
Figure 46D:
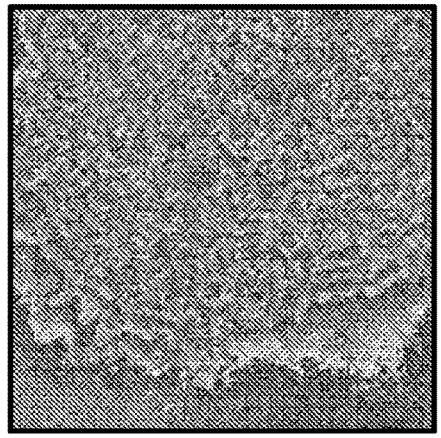
FIG. 46D illustrates relative phase after correcting for orbital offset.

If FIG. 46B illustrates the difference in phase from two SAR collections. The scattering process within each pixel is largely the same between collects, and this nearly random effect is removed in the difference. What remains are phase fringes that largely reflect the differences in distance due to slight offsets between the orbits for the two collections. This difference in orbit between the two collections can be corrected for if sufficient detailed knowledge of the terrain (e.g., via a digital elevation model) and orbits is known. Atmospheric moisture's impact on phase can be corrected for with appropriate spatial and temporal filtering. After correcting for orbital offset and applicable atmospheric moisture, the relative phase shows deformation. FIG. 46C illustrates relative phase after correcting for orbital offset. In particular, FIG. 46C depicts a 15 km by 15 km look at a part of Mexico City between November 2017 and August 2018. Each fringe shows where the round trip distance increased by a whole wavelength, i.e., where the ground sank by approximately 2.5 cm. Counting phase fringes is also referred to as "unwrapping" and is described in more detail below. FIG. 46D depicts the same 15 km by 15 km look at Mexico City, but between September 2015 and August 2018. The phase fringes are much closer together than those shown in FIG. 46C and will make an effective unwrapping difficult. Known subsidence rates suggest that the depicted area sank by roughly two feet between September 2015 and August 2018.

In interferometric SAR, an interferogram comprises multiple parts. The first part of an interferogram is the coherence, also referred to as correlation. Coherence is the per-pixel measurement of how similar two SAR collections are in a region around a given pixel. Coherence is also a good indicator for where phase is stable enough to be unwrapped. Phase is the fractional difference in wavelength per pixel between two collections. The difference is reported from $-\pi$ to $\pi$. When the phase exceeds $\pi$, it wraps around to $-\pi$. When the phase reduces below $-\pi$, it wraps around to $\pi$.

Figure 47A:
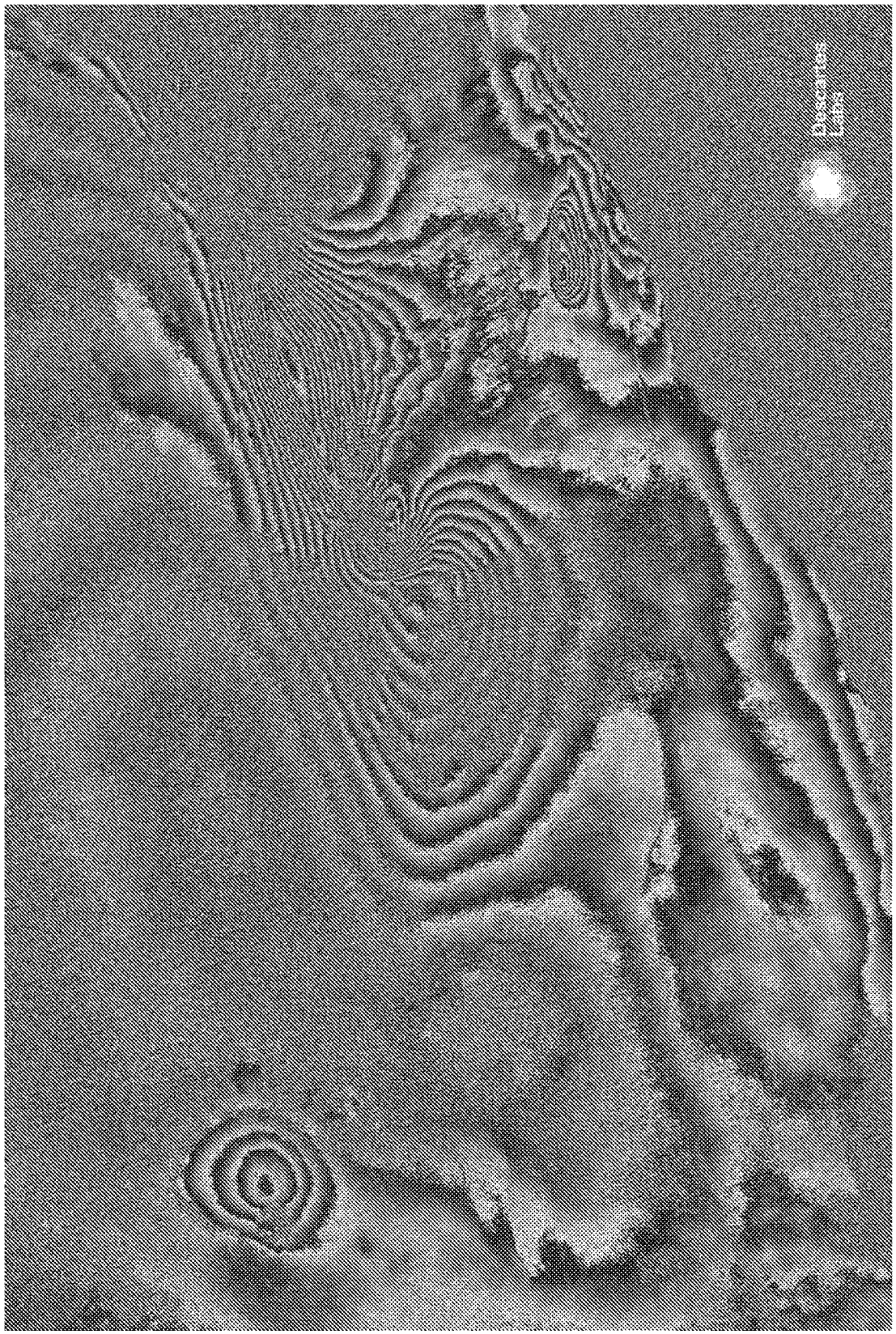
FIG. 47A illustrates an example interferogram from a pair of collections made during descending passes over the Kilauea volcano.

FIG. 47A illustrates phase from an example interferogram from a pair of collections made during descending passes over the Kilauea volcano. The fringes indicate large areas shifting along the satellite's line of sight between the two collections. The first collection occurred on Apr. 23, 2018, and the second collection occurred 12 days later on May 5, 2018. The wavelength of SENTINEL-1, which was used to make these collections, is roughly 5 cm, and so a change in roundtrip distance of 5 cm between the collections, or a surface deformation of half that, will correspond to a phase shift of a whole wavelength, which appears as a single fringe in this image. There are four fringes in the left feature, suggesting that the deformation is 10 cm at the middle of the fringes.

Figure 47B:
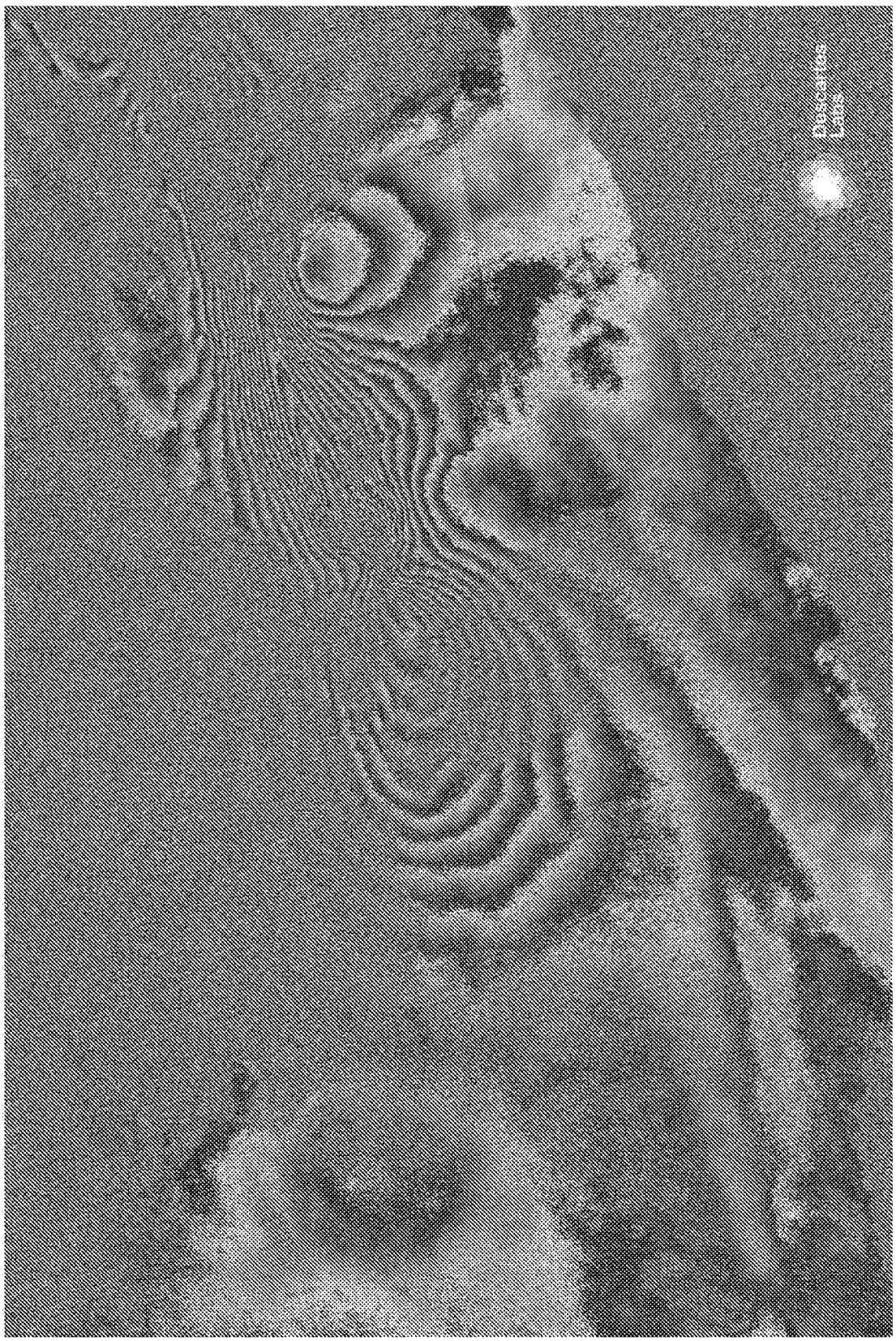
FIG. 47B illustrates an example interferogram from a pair of collections made during ascending passes over the Kilauea volcano.

While InSAR is a powerful technique, it also has certain subtleties. First, SAR systems cannot image the ground by looking directly downward and, instead, view the ground at a slant that is largely perpendicular to the direction of flight. In FIG. 47A, the collections were taken while the satellite was looking West at the island. In FIG. 47B, the collections were taken during roughly the same time period while the satellite was looking East at the island. Note that the fringes near the volcano (in the upper left corner of FIG. 47A) vanish and the remaining fringes have shifted in location. By combining the multiple InSAR images from different look angles, a more complete understanding of surface deformation can be exposed.

Figure 48:
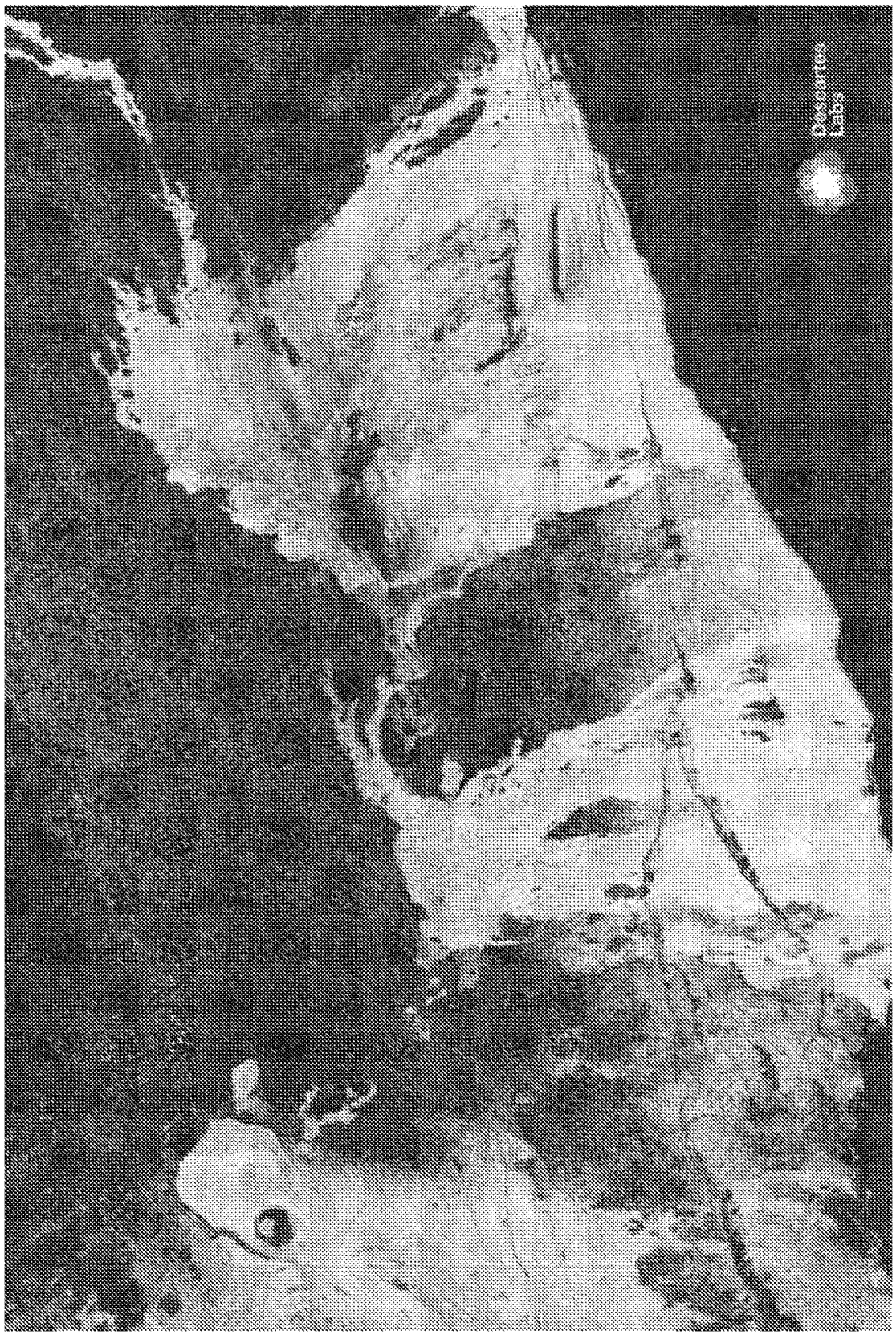
FIG. 48 illustrates coherence for the collections used to form the interferogram depicted in FIG. 47A.

Another important issue regarding InSAR is that phase shift measurements require a fairly uniform deformation over several hundred meters. Leaves on vegetation introduce wavelength sized changes within each pixel resulting in a phase measurement that can be too noisy to be of use. FIG. 48 shows a measure of the coherence between the collections used to form the interferogram in FIG. 47A. The areas that are light are those where the phase measurement is trustworthy. Outside of the high coherence areas the phase in FIG. 47A becomes noisy, but it is important to bear in mind that deformations could occur there as well even though a phase measurement can't be made.

In InSAR and other applications, one quantity of interest can be termed an "absolute" phase, which can be given in terms of a number of wavelengths as a measure of change in distance from the observed object. Phase is often specified as an angle in radians, making $2\pi$ equivalent to one wavelength. This "relative" phase is the fractional part of the number of wavelengths. Relative phase corresponds to the measurement not being able to distinguish between a phase of $2\pi$ and a phase of 0 (or between a phase of $\theta$ and $\theta-2\pi$, for any angle 0); the phase wraps, just as adding $2\pi$ to an angle of the unit circle wraps around the circle to the same point. The measurement identifies a point on the circle, without indicating how many times the phase has gone around the circle. Accordingly, without unwrapping the phase, any two significantly different elevation changes (e.g., due to a sinkhole or eruption) could share the same relative phase and otherwise be indistinguishable. In order to determine values that are not limited to an interval of length $2\pi$, the phase needs to be unwrapped.

B. Phase Unwrapping

1. Gradient Adjustment

A variety of approaches can be used to unwrap phase images. One approach is to make use of gradient information from the wrapped phase; this gradient should differ from the gradient of the unwrapped phase only at pixels where wrapping has occurred. Moreover, the gradient itself can be an indicator of wrapping, as the discontinuity created by wrapping will tend to result in gradients of large magnitude.

To formalize this notion, consider differences between adjacent pixels, which can be modeled as discrete approximations of partial derivatives. Assuming that the wrapped phase image is $\theta=\theta(i,j)$, then define:

$$D_x\theta(i,j)=\theta(i,j+1)-\theta(i,j),$$

$$D_y\theta(i,j)=\theta(i+1,j)-\theta(i,j); \quad (15)$$

i.e., the value at the next pixel minus the value at the current pixel is used. $D_x\theta$ can be defined to be zero on the last column, and $D_y\theta$ to be zero on the last row. If the wrapped phase values are assumed to lie in the interval $(-\pi, \pi]$, then the partial derivatives lie in $(-2\pi, 2\pi)$.

Consider a pair of adjacent pixels (i.e., side by side) lying on opposite sides of a wrapping boundary. Since phase values jump $2\pi$ at a wrapping boundary, $D_x\theta$ can be expected to be larger in magnitude in such a scenario as compared to where both pixels are on the same side of the wrapping boundary. If it is not known a priori where the wrapping boundary lies, $|D_x\theta|>\pi$ (or $|D_y\theta|>\pi$) can be used as heuristics for identifying wrapping, as this characterizes the property that $|D_x\theta|$ (or $|D_y\theta|$) can be made smaller by adding $2\pi$ to or subtracting $2\pi$ from one of the phase values. This motivates the following adjustment to the derivatives:

$$\varphi_x = \begin{cases} D_x\theta & \text{if } |D_x\theta| \leq \pi, \\ D_x\theta - 2\pi\text{sign}(D_x\theta) & \text{if } |D_x\theta| > \pi; \end{cases} \quad (16)$$

$$\varphi_y = \begin{cases} D_y\theta & \text{if } |D_y\theta| \leq \pi, \\ D_y\theta - 2\pi\text{sign}(D_y\theta) & \text{if } |D_y\theta| > \pi. \end{cases} \quad (17)$$

The result of this is to replace the gradient $$D\theta = \begin{pmatrix} D_x\theta \\ D_y\theta \end{pmatrix}$$

with a vector field $$\vec{\varphi} = \begin{pmatrix} \varphi_x \\ \varphi_y \end{pmatrix},$$

with the property that $|\varphi_x|$ and $|\varphi_y|$ are both at most $\pi$ everywhere, with the expectation that $\vec{\varphi}$ will more closely match the gradient of the unwrapped phase.

2. Integration

Though it can be desirable to have a phase image $\Phi$ having $\vec{\varphi}$ as a gradient, it will often be the case that $\vec{\varphi}$ is not the gradient of any image. For a vector field to be a gradient is characterized by the property that the curl is everywhere zero, where the curl of a two-dimensional vector field $$\vec{u} = \begin{pmatrix} u_x \\ u_y \end{pmatrix}$$

is defined by $$\text{curl } \vec{u} = D_x u_y - D_y u_x. \quad (18)$$

In the case of InSAR, it is common that $\vec{\varphi}$ will have nonzero curl at many pixels, often occurring in pairs of nearby pixels with curls of opposite sign, also referred to as "residues."

One approach is to find the image whose gradient is as close as possible to $\vec{\varphi}$. This raises the issue of how to measure closeness. One way is to use a Euclidean (or $l^2$) distance, resulting in the following optimization problem:

$$\min_\Phi \|D\Phi - \vec{\varphi}\|_2^2. \quad (19)$$

Solving (19) is equivalent to solving the following linear equation:

$$(D_x^T D_x + D_y^T D_y)\Phi = D_x^T \varphi_x + D_y^T \varphi_y. \quad (20)$$

If is curl free, then the solution of (20) will have a gradient that is exactly $\vec{\varphi}$. However, in the more realistic case of $\vec{\varphi}$ having nonzero curl at some if not many pixels, the solution of (20) will typically have less dynamic range than the true, unwrapped phase, with the influence of residues having a global effect on the solution.

3. Sparse Integration

An alternative approach is to find $\Phi$ whose gradient differs from $\vec{\varphi}$ at as few pixels as possible. This amounts to solving:

$$\min_\Phi \|D\Phi - \vec{\varphi}\|_0, \quad (21)$$

where the $l^0$ norm $\|\cdot\|_0$ counts the number of nonzero pixels. Solving this problem directly is intractable, being NP-hard. However, it is similar to the type of problem considered in compressive sensing. This is because as $\Phi$ ranges over all scalar fields, $D\Phi$ ranges over all vector fields $\vec{\psi}$ whose curl is zero. By the substitution $\vec{\psi}=D\Phi-\vec{\varphi}$, (21) becomes:

$$\min_{\vec{\psi}}\|\vec{\psi}\|_0 \text{ subject to curl } \vec{\psi} = -\text{curl } \vec{\varphi} \qquad (22)$$

Approaches used in compressive sensing (e.g., of finding the sparsest solution to a measurement problem) can be useful in solving (21). One solution approach is to replace the $l^0$ norm with one that is easier to minimize, yet often gives the same solutions. The $-l^1$ norm can also be used, due to its convexity. However, the use of nonconvex penalty functions can be more effective in various applications.

4. Splitting

An alternating directions method of multipliers (ADMM) approach, modified for the current problem, can be used in various embodiments. In particular, a penalty function $G_0$ can be used which is constructed to both promote sparsity and be efficient to minimize. A new variable, $\vec{w}$, is introduced, and the difference between it and $D\Phi-\vec{\varphi}$ is penalized, also introducing a Lagrange multiplier $\vec{\Lambda}$:

$$\min_{\Phi,\vec{w}} G_0(\vec{w}) + \frac{1}{2}\|\vec{w} - D\Phi + \vec{\varphi} - \vec{\Lambda}\|_2^2. \qquad (23)$$

Now, $\Phi$ and $\vec{w}$ are alternately solved for. At each iteration:

Fix $\vec{w}$ and solve for $\Phi$. This entails solving the following:

$$(D_x^T D_x + D_y^T D_y)\Phi = D_x^T(w_x + \varphi_x - \Lambda_x) + D_y^T(w_y + \varphi_y - \Lambda_y). \qquad (24)$$

The derivative operators $D_x$, $D_y$ are diagonalized by the discrete cosine transform, which allows for the solving of (23) using fast cosine transforms.

Fix $\varphi$ and solve for $\vec{w}$, which by construction of $G_0$ is given by the formula:

$$\vec{w} = \max\{|\vec{x}| - 1/|\vec{x}|, 0\}\text{sign}(\vec{x}), \qquad (25)$$

with $\vec{x} = D\Phi - \vec{\varphi} + \vec{\Lambda}$, and where operations are done pixelwise, with the result taken to be 0 where $\vec{x} = 0$.

The Lagrange multiplier $\vec{\Lambda}$ is updated by adding the residual $D\Phi - \vec{\varphi} - \vec{w}$. This uses the method of multipliers to force $\vec{w}$ and $D\varphi - \vec{\varphi}$ to converge together.

The approach described in this section is computationally very efficient, with the fast cosine transforms dominating the computational cost.

5. Code Example

FIG. 49 illustrates example code for implementing phase unwrapping. The inputs include an estimated phase gradient image (fx, fy), a regularization parameter lambda (e.g., value 1), a penalty function parameter p (e.g., value 0), a maximum number of iterations max_iter (e.g., value 100), a convergence tolerance tol (e.g., value π/5), an acceleration parameter c (e.g., value 1.6), differentiation operators $D_x$ and $D_y$, and a Fourier-domain Laplacian kernel K.

C. InSAR Examples and SNAPHU Comparison

The European Space Agency (ESA)'s SENTINEL-1 SAR satellites collect single-look-complex (SLC) images, which are distributed by ESA's SciHub and by the Alaska Satellite Facility. Using techniques described herein, such images can be collected, stored (e.g., in storage 1212), and organized into stacks where every image within a stack views roughly the same area from roughly the same view angle. GMT5SAR, or other appropriate tools, can be used to co-register all of the complex collections into a common range-azimuth coordinate system. In various embodiments, the GMT5SAR tools are executed within instance groups of virtual machines (VMs) on the Google Compute Engine (GCE). The techniques described herein can also be applied to complex images from other SAR systems, such as TerraSAR-X, and also adapted for use in other imaging problems as well.

Pairs of collections that are separated by sufficiently small time intervals and have sufficiently close collection tracks can be formed into interferograms. In various embodiments, the approach described in Section VII.B above, e.g., as implemented in Python, is used to unwrap the phase within each such interferogram. These unwrapped phases can be used as input to the GMT5SAR SBAS program, which provides time-resolved surface deformations as output. The SBAS program is also run on an instance group of VMs within GCE. The time-resolved surface deformation data can then be projected into latitude/longitude coordinates, and made available for use in a variety of applications.

Figure 50B:
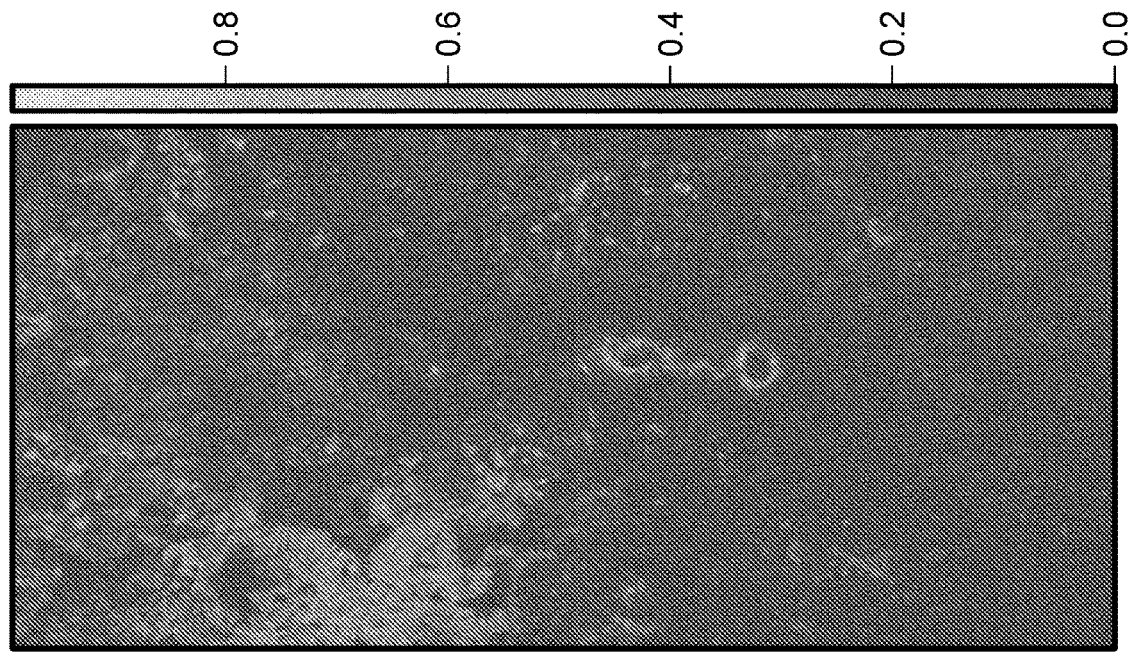
FIG. 50B illustrates interferogram coherence.
Figure 50A:
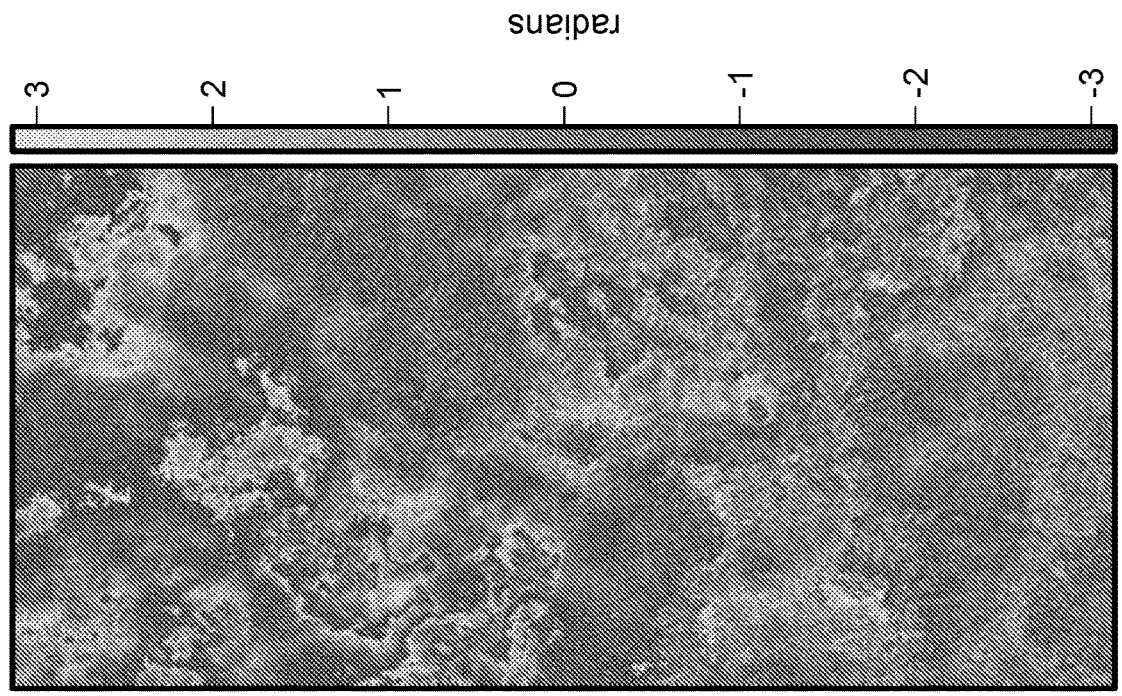
FIG. 50A illustrates a wrapped interferogram phase.

FIG. 50A depicts a wrapped interferogram phase for an interferogram computed from a pair of SLC images from the ESA SAR satellite SENTINEL 1-A, of a region including a portion of Mexico City, taken on September 25 and Nov. 12, 2016. The interferogram coherence is depicted in FIG. 50B. Both images are 12188×5287 pixels (in range-azimuth coordinates).

One approach to unwrapping phase is to use SNAPHU, a project distributed by ESA for use with their SENTINEL Application Platform (SNAP), for use in processing InSAR imagery from SENTINEL-1. The SNAPHU approach is based upon a network-optimization approach to solving (21), with additional application-specific customizations.

Figure 51:
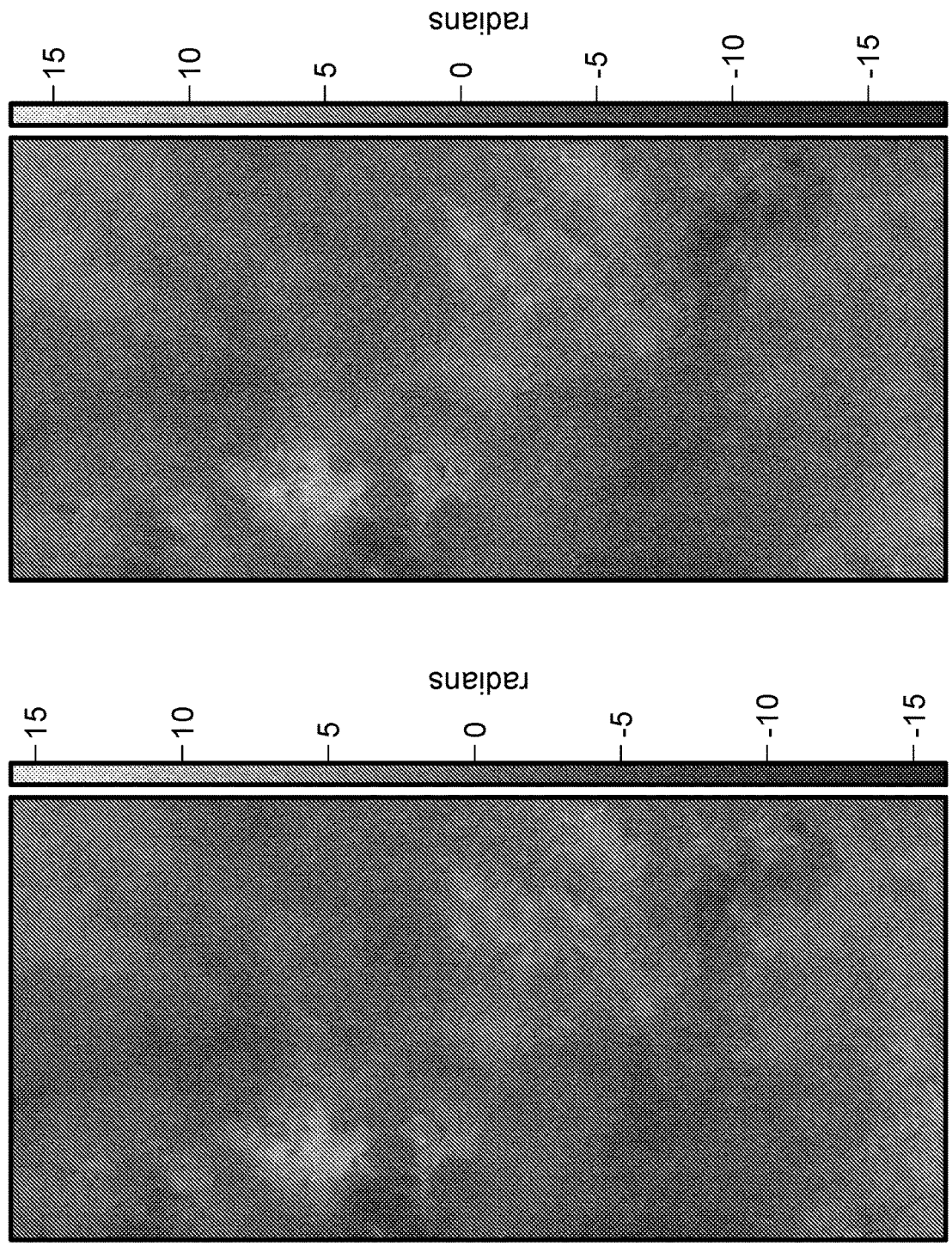
FIG. 51 illustrates two phase unwrapping results.

In an example process, the image data corresponding to that depicted in FIGS. 50A and 50B was provided as input to a Python implementation of the approach described in Section VII.B.4 and run for 10 iterations on a Google Cloud Platform virtual machine with 32 virtual CPUs and 120 GB of RAM, taking 565 seconds to complete. The SNAPHU approach was also used (implemented in C in the GMT5SAR library), and run on the same virtual machine, taking 4558 seconds (with parameters heavily optimized for computational efficiency). Results of the two respective processing are shown in FIGS. 51 and 52. In FIG. 51, the left image is a result of phase unwrapping using techniques described herein (e.g., in Section VII.B.4), and the right image is a result of phase unwrapping using SNAPHU. FIG. 52 illustrates the difference between the unwrapped and wrapped phase, using the techniques described herein (e.g., in Section VII.B.4) (left) and SNAPHU (right). The step-function nature of the (nearly identical) residuals, particularly in regions of high coherence, is as desired. The results are nearly identical, meaning that the result using the approach described herein (e.g., in Section VII.B.4) is of the same quality, but obtained in a small fraction of the time.

Further, the techniques described herein (e.g., in Section VII.B.4) give more reliable results over approaches such as SNAPHU. When 100 interferograms of the same region, but using pairs of SLC images collected at various times and with the timespans between the two images varying between 12 and 744 days, it was found that in 73 of the 100 cases, SNAPHU failed to converge in an allotted time period of four hours. In contrast, using techniques described herein (e.g., in Section VII.B.4) all unwrappings took between 475 and 581 seconds and produced meaningful output. An example of a difficult case can been seen in FIG. 53. The left image of FIG. 53 is a wrapped phase of an interferogram using a pair of SLC images collected 744 days apart (on Nov. 18, 2015 and Dec. 1, 2017). The right image of FIG. 53 is an unwrapped phase using techniques described herein (e.g., in Section VII.B.4), with computation time under 10 minutes. SNAPHU failed to return a result after twelve hours.

Additional examples of where SNAPHU struggles or fails to unwrap, but the approach described herein (e.g., in Section VII.B.4) succeeds follow. Each example contains output from comparing two SAR collections and comprises parts of an interferogram.

Figure 54A:
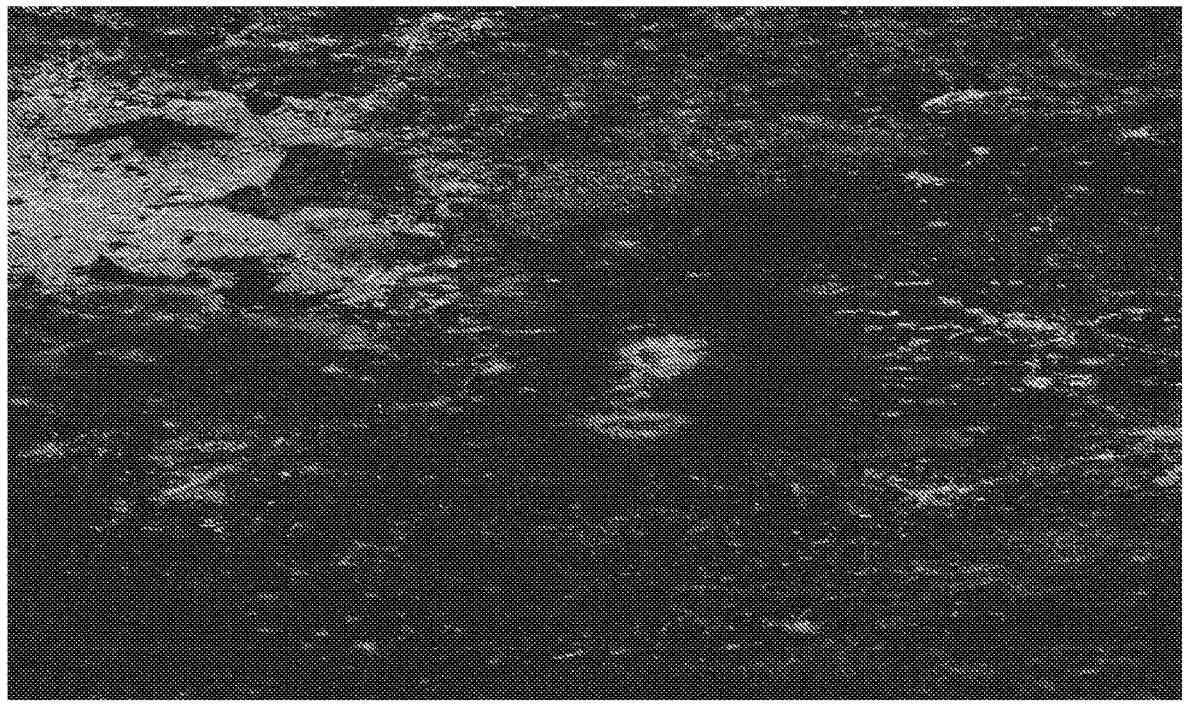
FIGS. 54A and 54B depict a measure of the coherence and phase of an interferogram, respectively.
Figure 54B:
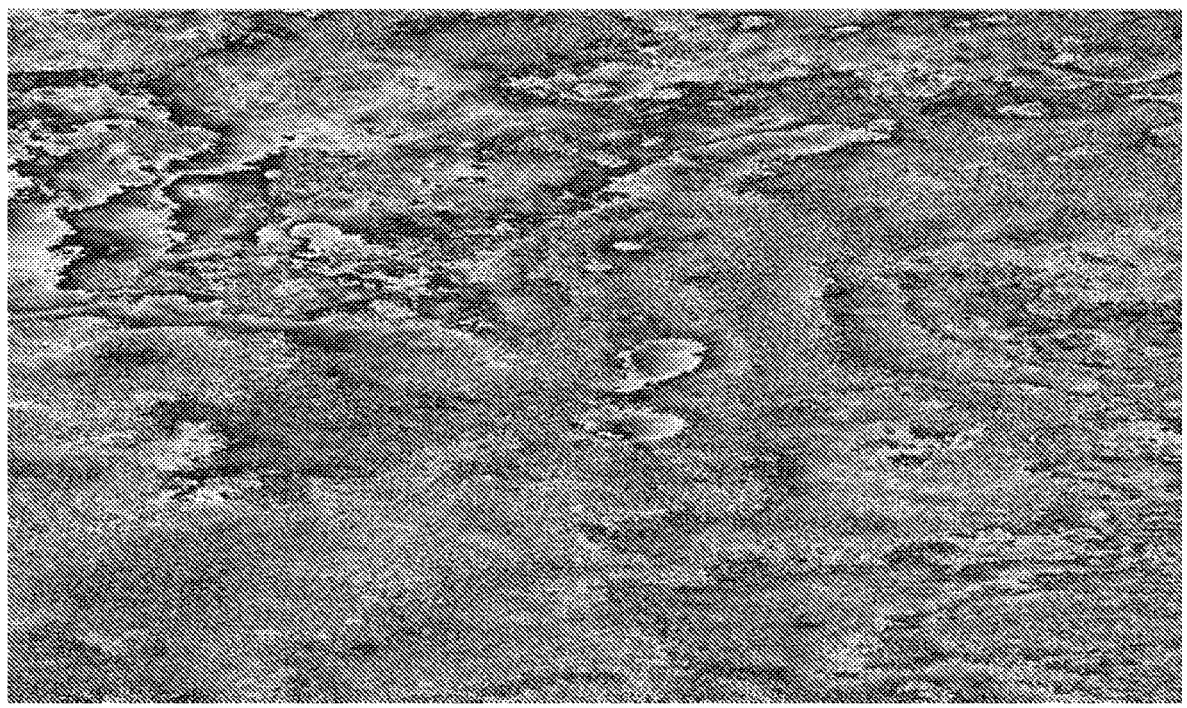
Figure 55A:
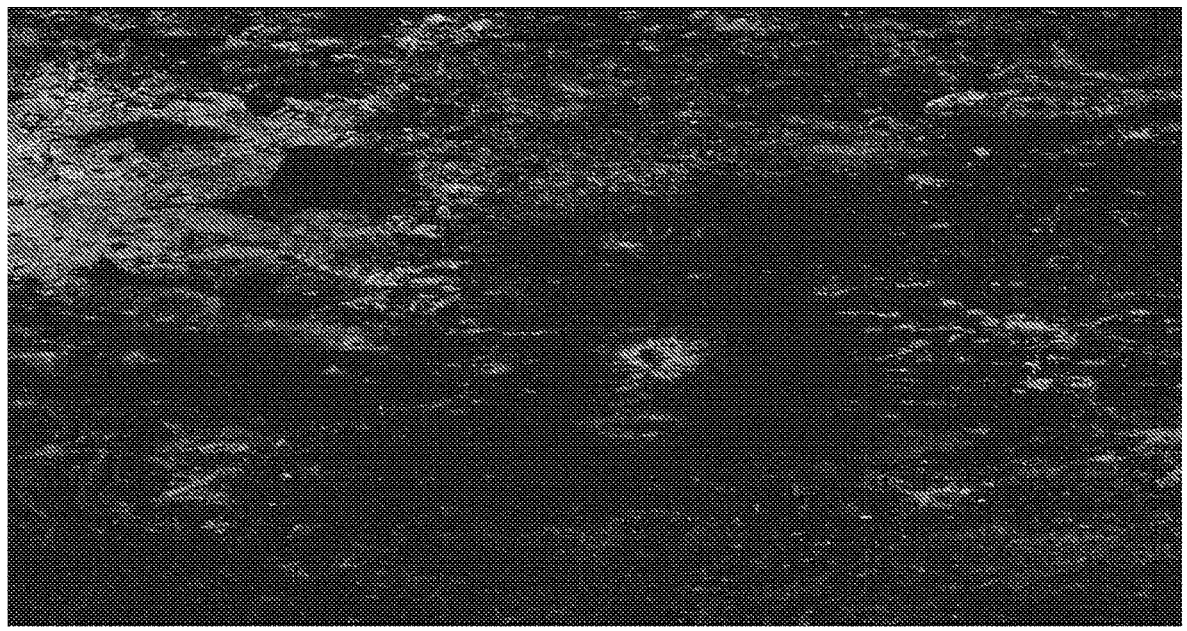
FIGS. 55A and 55B depict a measure of the coherence and phase of an interferogram, respectively.
Figure 55B:
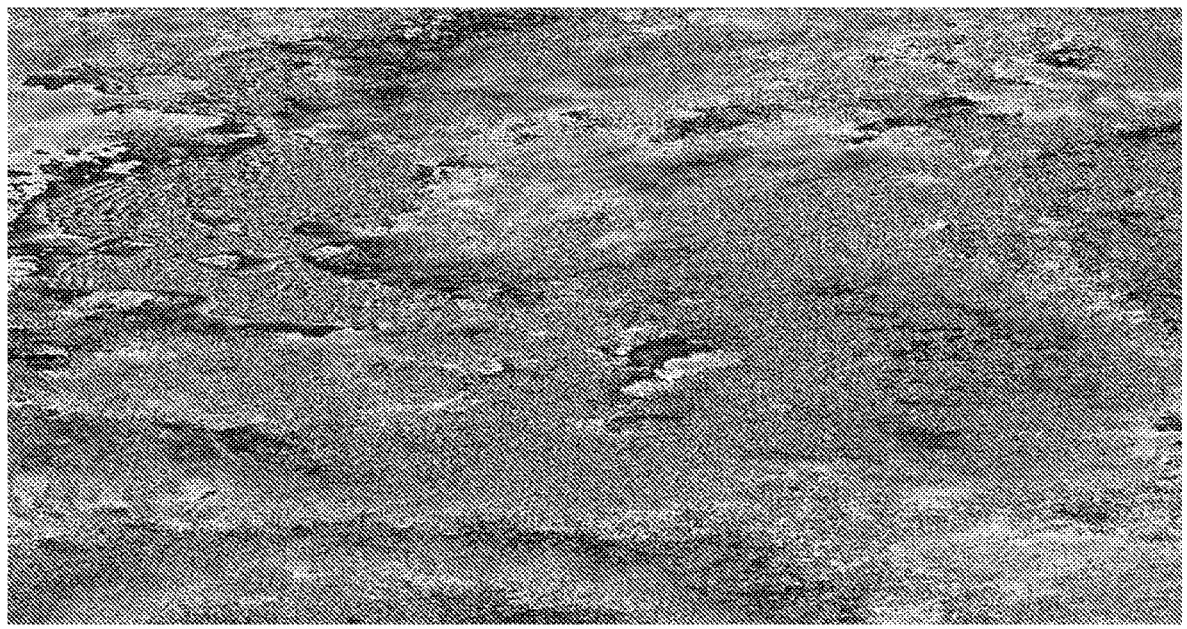
Figure 56A:
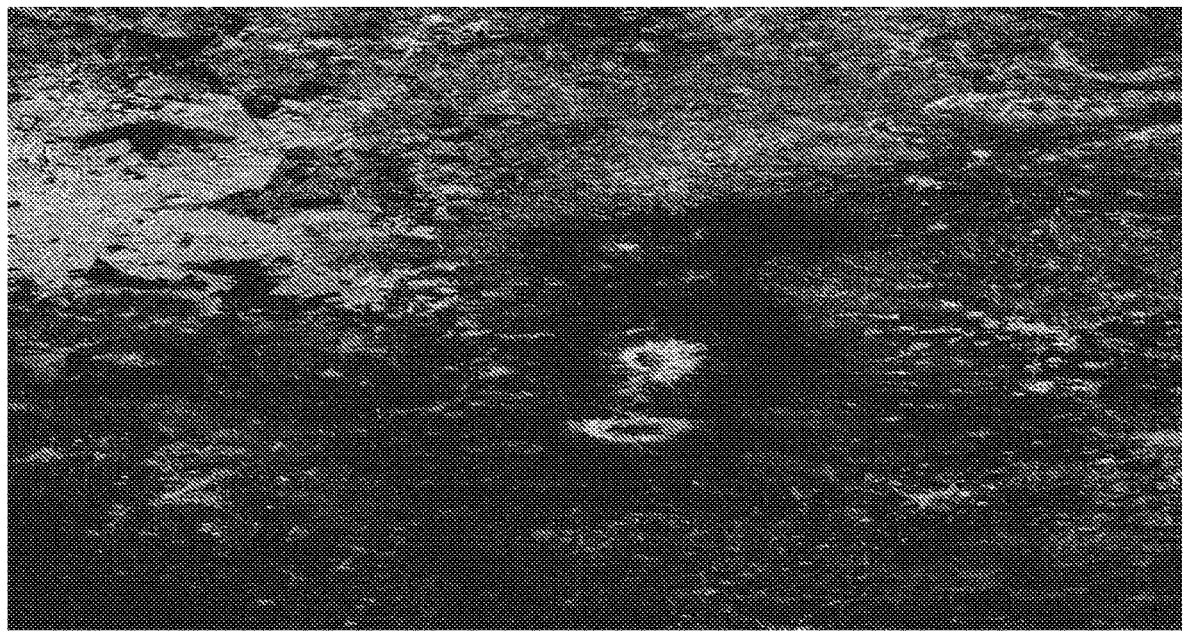
FIGS. 56A and 56B depict a measure of the coherence and phase of an interferogram, respectively.
Figure 56B:
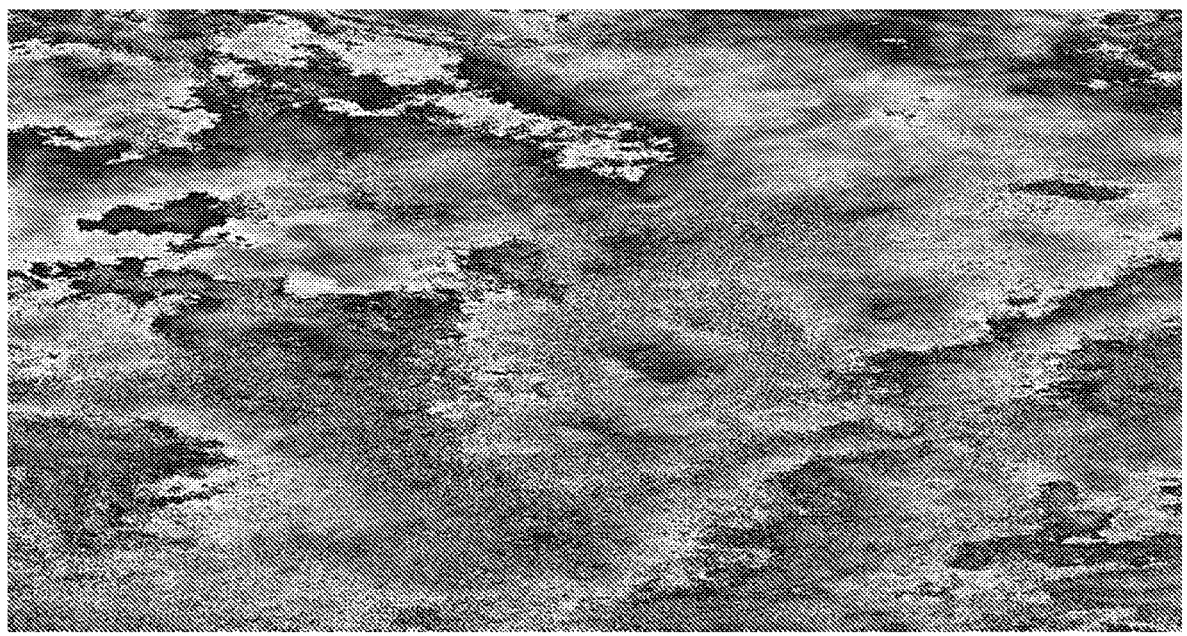

FIGS. 54A and 54B, FIGS. 55A and 55B, and FIGS. 56A and 56B, respectively, are pairs of images depicting a measure of the coherence, and phase, of an interferogram. A small amount of deformation, and a moderate amount of noise is represented in the data of FIGS. 54A and 54B. A large amount of deformation and a fair amount of noise is represented in the data of FIGS. 55A and 55B. A modest amount of deformation and moderate amount of noise is represented in the data of FIGS. 56A and 56B. Each pair of images corresponds to a view of Mexico city, from the satellite's perspective. The satellite is traveling upward slightly to the left in each image, while looking down and to the right. One can see continuous edges in the phase in the upper left of the scene depicted in FIGS. 54A and 54B, where phase wrapping discontinuities are present—edges where one side is white and the other side is black. One can think of the task of unwrapping as treating these discontinuities as contour lines for a topographic map, and the job of unwrapping is to reconstruct the topography. Of particular interest is the highly coherent area in the upper left in the image.

Unfortunately, SNAPHU can fail to produce output for a whole image if it encounters errors in any part(s) of the image. SNAPHU fails to unwrap the interferogram represented in FIGS. 54A and 54B. SNAPHU fails to converge on the interferogram represented in FIGS. 55A and 55B. SNAPHU is able to unwrap the interferogram represented in FIGS. 56A and 56B, but takes a long time to do so. One potential solution to situations where SNAPHU has problems is to crop the coherence and phase to a particular area of interest. However, doing so would not be helpful in a global computation where it is not known a priori what is being looked for, and consequently it is desired to unwrap the entire scene.

D. InSAR Pipeline Example

In various embodiments, platform 1202 provides an InSAR pipeline 1236. In an example implementation of InSAR pipeline 1236, two types of compute nodes are used. The first, also referred to herein as a "medium" compute node, is a Google Cloud Platform (GCP) n1-standard-32 (32 vCPUs, 120 GB of memory). The second, also referred to herein as a "large" compute node, is an n1-highmem-64 (64 vCPUs, 416 GB of memory). InSAR pipeline 1236 uses a pool of medium nodes and a pool of large nodes. When CPU usage within a pool grows or shrinks beyond certain levels, Google's automatic scaling features can be used to add or remove, respectively, compute nodes of the appropriate type to/from the pool. Processing described as being performed by InSAR pipeline 1236 can be implemented in a variety of ways, including through use of various open source packages and scripts written in appropriate scripting or other languages (e.g., bash and Python).

1. Input

InSAR pipeline 1236 makes use of a variety of sources of data. The first is a set of single look complex (SLC) images organized into stacks. As previously mentioned, SENTINEL-1 is an example source of SAR imagery. SENTINEL-1 makes use of two satellites (SENTINEL-1A and SENTINEL-1B) in a near-polar, sun-synchronous orbit, with a 12-day repeat cycle and 175 orbits per cycle. Both SENTINEL-1A and SENTINEL-1B share the same orbit with a 180° orbital phasing difference. SENTINEL-1 produces SLC images in the slant range by azimuth imaging plane, in the image plane of satellite data acquisition. Each image pixel is represented by a complex (I and Q) magnitude value and contains both amplitude and phase information. The imagery is geo-referenced using orbit and attitude data from the satellite. Platform 1202 is configured to collect SLCs (e.g., in accordance with image ingestion techniques described above) and organize them into stacks, where images in a given stack of SLCs correspond to observations of a particular portion of the Earth, over time (e.g., in 12 day observational increments). Each stack has a designated reference SLC which defines a coordinate system for the stack. Other SLCs included in the stack are co-registered to the reference SLC for the stack. Which SLC in a given stack should be selected as the reference SLC for that stack can be performed arbitrarily (e.g., by selecting the earliest known SLC for the stack to serve as the reference SLC for the stack, by selecting an arbitrary twelve day period and designating each SLC observed during that period as the reference for its respective stack, etc.). Two additional types of information used by the InSAR pipeline include SENTINEL-1 orbit data (e.g., XML files provided by ESA that indicate velocity/ positional information for the SENTINEL satellites over three days), and a digital elevation map (e.g., the Shuttle RADAR Tomography Map).

2. Processing

InSAR pipeline 1236 leverages a GCP messaging tool called Pub Sub (for publish/subscribe). One can publish a message from a compute node to a topic, and that message will persist even if the compute node goes offline. Subscribers can request outstanding messages for a topic. When a subscriber receives a message, the subscriber can assess the message and "acknowledge" it, thereby deleting the message, or not, leaving the message for other subscribers to process. InSAR pipeline 1236 uses one topic for its pool of medium sized nodes and one topic for its pool of large nodes. On startup, each compute node begins polling the topic associated with the pool it is a member of for messages. Intermediate data products are stored in storage 1212.

Processing performed by InSAR pipeline 1236 can be broken down into tasks. The life cycle of a task is as follows:

1. A message is published that describes a task to be performed, the prerequisite data products for the task, and the amount of vCPUs and memory that will be required for the task.

2. A compute node requests an outstanding message and, upon reading the message, determines if the prerequisite data is available in storage 1212, and if that node has enough vCPUs and memory free for the task. If not, the message is left unacknowledged and will be picked up by another compute node later.

3. If the compute node can run the task, it does so. When the task has completed, any intermediate data is written back to storage 1212.

4. The node acknowledges the message, thereby removing it.

Figure 57:
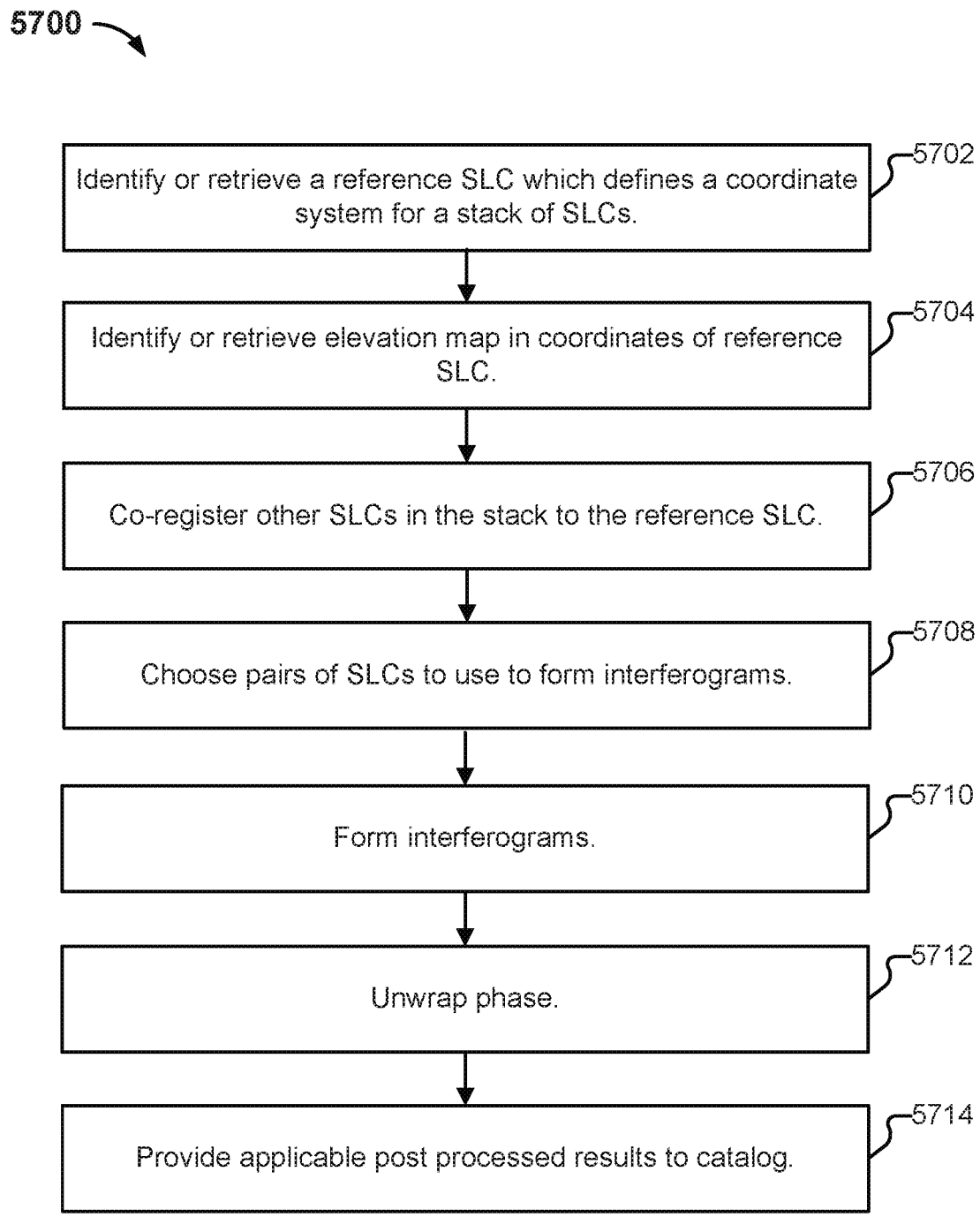
FIG. 57 illustrates an example of a process for generating an unwrapped interferogram.

FIG. 57 illustrates an example of a process for generating an unwrapped interferogram. In various embodiments, process 5700 is performed by InSAR pipeline 1236. Process 5700 can be initiated in response to a variety of triggers, including a user input (e.g., a user indicates an area of interest or otherwise initiates process 5700 directly or indirectly, such as via an interface). Process 5700 can also be initiated in response to receipt of one or more new SLC files (e.g., receipt by platform 1202 as part of a routine/scheduled collection of new SLC files) or in any other appropriate manner. Further, in various embodiments, various portions of process 5700 are omitted, and in various embodiments, various portions of process 5700 are performed multiple times without repeating other portions of process 5700.

The process begins at 5702 when a reference SLC which defines a coordinate system is retrieved. As one example, in response to receiving an indication that a user would like to compare observations of the stack including the 15×15 portion of Mexico City discussed in conjunction with FIGS. 46C and 46D, the reference SLC for the stack is retrieved at 5702. If no reference SLC for the stack was previously selected, an arbitrary SLC can be selected to serve as the reference SLC for the stack going forward (or other appropriate selection criteria can be used as applicable). As another example of processing performed at 5702, whenever a new SLC is received by platform 1202 (or, as part of a batch processing operation), at 5702, the reference SLC for the stack of which the newly received SLC is a member can be retrieved at 5702.

At 5704, a digital elevation model (DEM) corresponding to the reference SLC's coordinate system is retrieved or generated as applicable. Digital elevation data can be obtained from a variety of sources, an example of which is the U.S. Geological Survey's National Elevation Dataset. The first time process 5700 is performed with respect to a given reference SLC, a DEM corresponding to the coordinates of the reference SLC is generated (e.g., using the open source tool, GMT5SAR) and stored. During subsequent executions of process 5700 that make use of the reference SLC, the DEM for the reference SLC can be retrieved (e.g., from storage 1212). If at some point the reference SLC for a given stack is changed, a new DEM for the new reference SLC is created at 5704 as applicable.

At 5706, one or more SLCs in the stack are co-registered to the reference SLC (e.g., using GMT5SAR) so that all co-registered SLCs share a common coordinate system. Such co-registration can be performed for all SLCs in the stack at 5706, or as applicable, performed only with respect to certain of the SLCs (e.g., newly received SLCs, SLCs designated of interest by a user, SLCs designated of interest by a process, etc.).

At 5708, pairs of SLCs are chosen to use in forming interferograms. The offset between the orbits of any two SLC observations in a stack is also referred to as the "baseline." As baseline increases, phase information degrades. Baseline analysis (e.g., using GMT5SAR) can be used to pair SLCs having the smallest baseline (subject to any additional applicable criteria, such as date constraints). As one example of processing performed at 5708, baseline analysis can be performed to pair SLCs observed before a particular date of interest with SLCs observed after a particular date. In various embodiments, baseline analysis is performed for each SLC (e.g., relative to the reference SLC's orbit) and stored (e.g., in storage 1212, at the time the SLC is first processed by process 5700). The stored baseline analysis can be retrieved and used in subsequent executions of process 5700 (or portions thereof), e.g., to choose pairs of SLCs meeting different criteria (e.g., different dates of interest) without needing to perform baseline analysis again.

At 5710, an interferogram is formed for each of the pairs chosen at 5708. An example way of generating an interferogram is to use GMT5SAR. At 5712, the phase of each interferogram generated at 5710 is unwrapped. Techniques for efficiently and reliably unwrapping interferograms are described above (e.g., in Section VII.B).

Various results of process 5700 can be used in various ways. As one example, due to the efficiency and reliability of unwrapping techniques described herein, interferograms can be globally generated (i.e., across all SLC stacks) and stored in a catalog (e.g., catalog 5714 in storage 1212) or other appropriate locations, in various formats (e.g., in the SLC's coordinate system, in a geographic coordinate system such as UTM, or both). Global monitoring for surface changes can be implemented, e.g., by comparing historic information stored in the catalog to newly received SLC information on a periodic basis (including for every newly received SLC). Queries and alerting for particular deformations can be set up within platform 1202 using the catalog (e.g., to generate an alert when a particular location has subsided more than five meters from a previous observation). Detection of surface deformation can be valuable in a variety of contexts, including initial discovery of depleted aquifers, initial discovery of building structures on areas that are subsiding, and locating particular types of human activity (e.g., mining activities and plowing activities). Platform 1202 can be configured to generate alerts whenever results of process 5700 indicate, e.g., previously unknown surface deformation has been detected.

Another use of results of process 5700 is in estimating errors in digital elevation models. As discussed above, analytic techniques used to identify the contribution to the unwrapped phase from offset satellite positions use elevation information to make this correction (e.g., from a DEM). If consistency checks performed during process 5700 fail, inferences can be made about where and how the elevation information is incorrect. Further, as with phase contribution from orbital offsets, phase change due to tropospheric moisture has a signature. If one can unwrap effectively, one can use InSAR to estimate tropospheric moisture, which can be useful for vetting weather models and more generally understanding climate.

An example control script for managing portions of process 5700 is depicted in FIG. 58. A prerequisite for script 5800 is that all of the SLCs have been organized into stacks. Unless where otherwise specified, messages are published to the topic associated with the pool of medium nodes. Various elements of script 5800 are discussed as follows.

A message is published to create a DEM in the satellite's frame of reference for the stack in question. When this task completes, the DEM is written back to storage 1212. For each of the three swaths in the stack, a message is published to perform an analysis of the stack of collections. This analysis includes looking at orbit files to record the spatial offset of the satellites, as well as gathering parameters on the collection. Some data is per collection, and some is per interferogram (pair of collections). When the task completes, the output of these analyses (baseline_table.dat, baseline_select.dat, intf.in, data_sm_swath.in) is written to storage 1212. Next, for each of the three swaths in the stack, a message is published for a task that depends on there being a DEM in storage 1212, and when run, will generate a new DEM in the satellites range/azimuth coordinate system. A script called register_slc.sh is run locally. The script creates a long list of Pub Sub messages (as it is faster to submit a group of Pub Sub messages all at once rather than submitting them one at a time) corresponding to registration tasks. Registration is the process of making sure that all the collections within a swath for a certain stack line up with a specified collection called a master. Then, for each swath in the stack, wait until intf.in (the list of interferograms to be created) and topo_ra.grd (the topographic data in range/azimuth coordinates have been written to storage 1212. Next, intf.sh is run locally. This script will, for every interferogram to be created, dispatch Pub Sub messages with the following tasks:

a. Create the desired interferogram. This requires that the two registered collections be available as well as the topographic data in range/azimuth coordinates. This writes phase and coherence for the interferogram back to storage 1212.

b. Unwrap the phase that is produced by the above process. This task depends on the phase and coherence data being in storage 1212.

c. Convert phase, coherence, and unwrapped phase from range/azimuth coordinates to lat/lon.

Next, status.py is called, which indicates that the creation of the phase for all the interferograms has been completed. Then, a message is dispatched to the pool of large nodes that runs a time series analysis called SBAS. SBAS is a program that uses the unwrapped phases from the interferograms in the stack to create a time resolved measure of deformation, tropospheric water moisture, and a one time correction to the DEM which gets uploaded to storage 1212.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
     receive a first image and a second image, wherein the first image and the second image are coregistered and wherein the first image and the second image comprise respective phase data; and
     generate an unwrapped interferogram including by solving an optimization problem using a nonconvex penalty function, wherein minimizing the penalty function produces sparse minimizers; and
   a memory coupled to the processor and configured to provide the processor with instructions.

2. The system of claim 1 wherein application of the penalty function results in a sparse difference between an estimated gradient and a gradient of an estimated unwrapped phase.

3. The system of claim 1 wherein the processor is further configured to generate a wrapped differential interferogram that includes per pixel phase differences between pixels appearing in both the first image and the second image.

4. The system of claim 1 wherein the processor is further configured to detect a subsidence at least in part by using the unwrapped interferogram.

5. The system of claim 1 wherein the processor is further configured to detect mining activity at least in part by using the unwrapped interferogram.

6. The system of claim 1 wherein the processor is further configured to detect plowing activity at least in part by using the unwrapped interferogram.

7. The system of claim 1 wherein the processor is further configured to perform a coregistration the first and the second image.

8. A method, comprising:
   receiving a first image and a second image, wherein the first image and the second image are coregistered and wherein the first image and the second image comprise respective phase data; and
   generating an unwrapped interferogram including by solving an optimization problem using a nonconvex penalty function, wherein minimizing the penalty function produces sparse minimizers.

9. The method of claim 8 wherein application of the penalty function results in a sparse difference between an estimated gradient and a gradient of an estimated unwrapped phase.

10. The method of claim 8 further comprising generating a wrapped differential interferogram that includes per pixel phase differences between pixels appearing in both the first image and the second image.

11. The method of claim 8 further comprising detecting a subsidence at least in part by using the unwrapped interferogram.

12. The method of claim 8 further comprising detecting mining activity at least in part by using the unwrapped interferogram.

13. The method of claim 8 further comprising detecting plowing activity at least in part by using the unwrapped interferogram.

14. The method of claim 8 further comprising performing a coregistration of the first and the second image.

15. A computer program product embodied in a non-transitory computer readable storage medium and comprising instructions which, when executed, cause a computer to:
   receive a first image and a second image, wherein the first image and the second image are coregistered and wherein the first image and the second image comprise respective phase data; and
   generate an unwrapped interferogram including by solving an optimization problem using a nonconvex penalty function, wherein minimizing the penalty function produces sparse minimizers.

16. The computer program product of claim 15 wherein application of the penalty function results in a sparse difference between an estimated gradient and a gradient of an estimated unwrapped phase.

17. The computer program product of claim 15 wherein the instructions, when executed, further cause a computer to generate a wrapped differential interferogram that includes per pixel phase differences between pixels appearing in both the first image and the second image.

18. The computer program product of claim 15 wherein the instructions, when executed, further cause a computer to detect a subsidence at least in part by using the unwrapped interferogram.

19. The computer program product of claim 15 wherein the instructions, when executed, further cause a computer to detect mining activity at least in part by using the unwrapped interferogram.

20. The computer program product of claim 15 wherein the instructions, when executed, further cause a computer to detect plowing activity at least in part by using the unwrapped interferogram.

21. The computer program product of claim 15 wherein the instructions, when executed, further cause a computer to perform a coregistration of the first and the second image.

* * * * *

UNITED STATES PATENT AND TRADEMARK OFFICE
CERTIFICATE OF CORRECTION

PATENT NO. : 10,852,421 B1
APPLICATION NO. : 16/751161
DATED : December 1, 2020
INVENTOR(S) : Rick S. Chartrand and Matthew T. Calef It is certified that error appears in the above-identified patent and that said Letters Patent is hereby corrected as shown below:

In the Specification

In Column 1, Line(s) 22, after "making", delete "a" and insert --$2\pi$--, therefor.
In Column 1, Line(s) 25, after "of", delete "a" and insert --$2\pi$--, therefor.
In Column 11, Line(s) 63, delete "hi ghcpu" and insert --highcpu--, therefor.
In Column 14, Line(s) 59, after "$g_ig_j$", insert --,--.
In Column 16, Line(s) 15, delete "$t_j=7$" and insert --$t_i=7$--, therefor.
In Column 24, Line(s) 52, after "$\{y_1, y_2, ..., y_N\}$", insert --.--.
In Column 24, Line(s) 57, delete "$\Delta f(x, y)$" and insert --$\nabla f(x,y)$--, therefor
In Column 25, Line(s) 5, eq. 3, delete "$|Df(x_i, y_j|$" and insert --$|Df(x_i, y_j)|$--, therefor.
In Column 25, Line(s) 5, eq. 3, delete "$|D_xf(x_i, y_j)|_2$" and insert --$|D_xf(x_i, y_j)|^2$--, therefor.
In Column 25, Line(s) 28 - 33, delete "$B_K = \begin{pmatrix} -1 & 1 & 0 & 0 & \cdots & 0 \\ 0 & -1 & 1 & 0 & \cdots & 0 \\ \vdots & & \ddots & \ddots & & \vdots \\ 0 & \cdots & 0 & -1 & 1 & 0 \\ 0 & \cdots & 0 & 0 & -1 & 1 \\ 0 & \cdots & 0 & 0 & 0 & 0 \end{pmatrix}$" and insert --$B^K = \begin{pmatrix} 0 & \cdots & 0 & 0 & 0 & 0 \\ 0 & \cdots & 0 & 0 & -1 & 1 \\ 0 & \cdots & 0 & -1 & 1 & 0 \\ \vdots & & \ddots & \ddots & & \vdots \\ 0 & -1 & 1 & 0 & \cdots & 0 \\ -1 & 1 & 0 & 0 & \cdots & 0 \end{pmatrix}$--, therefor.
In Column 37, Line(s) 11, delete "15N 004 075" and insert --15N_004_075--, therefor.
In Column 39, Line(s) 32, delete "$D_xf(x_M, y_i)$" and insert --$D_xf(x_M, y_j)$--, therefor.
In Column 40, Line(s) 17, eq. 12, delete "$Q(u)_u$" and insert --$Q(u)_{ii}$--, therefor.
In Column 43, Line(s) 5, delete "27r" and insert --$2\pi$--, therefor.
In Column 43, Line(s) 10, after "angle", delete "0" and insert --$\theta$--, therefor.
In Column 44, Line(s) 47, after "If", insert --$\vec{\varphi}$--.
In Column 44, Line(s) 63, delete "$1^0$" and insert --$\ell^0$--, therefor.
In Column 45, Line(s) 12, delete "$1^0$" and insert --$\ell^0$--, therefor.
In Column 45, Line(s) 13, after "The", delete "-$1^1$" and insert --$\ell^1$--, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*